(12) United States Patent
Tola, Jr.

(10) Patent No.: US 10,382,595 B2
(45) Date of Patent: Aug. 13, 2019

(54) SYSTEMS AND METHODS FOR PROTECTING COMMUNICATIONS

(71) Applicant: SMART SECURITY SYSTEMS LLC, Boulder, CO (US)

(72) Inventor: Kenneth C. Tola, Jr., Boulder, CO (US)

(73) Assignee: SMART SECURITY SYSTEMS LLC, Boulder, CO (US)

( * ) Notice: Subject to any disclaimer, the term of this patent is extended or adjusted under 35 U.S.C. 154(b) by 110 days.

(21) Appl. No.: 15/115,209

(22) PCT Filed: Jan. 29, 2015

(86) PCT No.: PCT/US2015/013433
§ 371 (c)(1),
(2) Date: Jul. 28, 2016

(87) PCT Pub. No.: WO2015/116768
PCT Pub. Date: Aug. 6, 2015

(65) Prior Publication Data
US 2016/0337484 A1 Nov. 17, 2016

Related U.S. Application Data

(60) Provisional application No. 61/932,936, filed on Jan. 29, 2014, provisional application No. 62/022,540, filed on Jul. 9, 2014.

(51) Int. Cl.
*H04L 29/06* (2006.01)
*H04L 12/64* (2006.01)

(52) U.S. Cl.
CPC .......... *H04L 69/22* (2013.01); *H04L 12/6418* (2013.01); *H04L 63/0428* (2013.01); *H04L 63/08* (2013.01)

(58) Field of Classification Search
CPC . H04L 69/22; H04L 12/6418; H04L 63/0428; H04L 63/08
See application file for complete search history.

(56) References Cited

U.S. PATENT DOCUMENTS

| 6,131,163 A | 10/2000 | Wiegel |
| 6,212,574 B1 | 4/2001 | O'Rourke et al. |

(Continued)

FOREIGN PATENT DOCUMENTS

| CA | 2697965 | 3/2009 |
| CN | 101778486 | 7/2010 |

(Continued)

OTHER PUBLICATIONS

Jung et al., Securing RTP Packets Using Per-Packet Selective Encryption Scheme for Real-Time Multimedia Applications, 2013 12th IEEE International Conference on Trust, Security and Privacy in Computing and Privacy in Computing and Communications, pp. 659-666 (Year: 2013).*

(Continued)

*Primary Examiner* — Luu T Pham
*Assistant Examiner* — Harvey I Cohen
(74) *Attorney, Agent, or Firm* — Lewis Brisbois Bisgaard & Smith LLP

(57) ABSTRACT

A method includes receiving a data packet including a header having a structure from an operating system at a virtualization layer, where the virtualization layer is above a physical layer and below all other layers. The method also includes performing an operation on a portion of the data packet other than the header, thereby creating a modified data packet and maintaining the original header structure. The method further includes transmitting the modified data packet, including the original header structure, to the physical layer.

9 Claims, 44 Drawing Sheets

(56) References Cited

U.S. PATENT DOCUMENTS

| | | |
|---|---|---|
| 6,408,061 B1 | 6/2002 | Donak et al. |
| H2065 H | 5/2003 | Hong et al. |
| 6,690,678 B1 | 2/2004 | Basso |
| 6,701,437 B1* | 3/2004 | Hoke ............... H04L 12/4641 709/245 |
| 6,850,986 B1 | 2/2005 | Peacock |
| 7,293,095 B2 | 11/2007 | Gbadegesin |
| 7,398,503 B2 | 7/2008 | Teig |
| 7,467,399 B2 | 12/2008 | Nadalin |
| 7,545,753 B2 | 6/2009 | Stirbu |
| RE41,168 E | 3/2010 | Shannon |
| 7,777,651 B2 | 8/2010 | Fallon et al. |
| RE41,811 E | 10/2010 | Gutman et al. |
| 7,856,012 B2 | 12/2010 | Smith |
| 7,865,717 B2 | 1/2011 | Calcev |
| RE42,212 E | 3/2011 | Hoffman |
| 8,019,884 B2 | 9/2011 | Manning et al. |
| 8,020,201 B2 | 9/2011 | Adusumilli et al. |
| 8,352,729 B2 | 1/2013 | Manning |
| 8,683,572 B1 | 3/2014 | Mahalingaiah |
| 8,738,656 B2 | 5/2014 | Kirshenbaum |
| 8,793,679 B2 | 7/2014 | Hillier |
| 9,130,960 B2 | 9/2015 | Österling et al. |
| 9,325,676 B2 | 4/2016 | Tola |
| 9,348,927 B2 | 5/2016 | Tola |
| 9,391,832 B1 | 7/2016 | Song |
| 2002/0024931 A1 | 2/2002 | Chikazawa |
| 2003/0101253 A1 | 5/2003 | Saito |
| 2003/0154448 A1 | 8/2003 | Teig |
| 2003/0204717 A1 | 10/2003 | Kuehnel |
| 2004/0103205 A1 | 5/2004 | Larson et al. |
| 2006/0029062 A1* | 2/2006 | Rao ............... H04L 12/2856 370/389 |
| 2006/0037072 A1 | 2/2006 | Rao et al. |
| 2006/0093135 A1 | 5/2006 | Fiatal et al. |
| 2006/0101262 A1* | 5/2006 | Haney ............... H04L 12/4633 713/153 |
| 2006/0123226 A1 | 6/2006 | Kumar et al. |
| 2006/0200660 A1 | 9/2006 | Woods |
| 2006/0227773 A1* | 10/2006 | Grewal ............... H04L 63/123 370/389 |
| 2006/0293969 A1 | 12/2006 | Barger |
| 2007/0011146 A1 | 1/2007 | Holbrook |
| 2007/0011272 A1 | 1/2007 | Bakke et al. |
| 2007/0150075 A1 | 6/2007 | Dumas |
| 2007/0165625 A1 | 7/2007 | Eisner |
| 2007/0253427 A1 | 11/2007 | Stirbu |
| 2007/0291780 A1 | 12/2007 | Smith |
| 2007/0300290 A1 | 12/2007 | Shay |
| 2008/0034416 A1 | 2/2008 | Kumar et al. |
| 2008/0270417 A1 | 10/2008 | Roker |
| 2008/0279198 A1 | 11/2008 | Gruber |
| 2008/0281900 A1 | 11/2008 | Boulia |
| 2009/0006612 A1 | 1/2009 | Asai |
| 2009/0063665 A1* | 3/2009 | Bagepalli ............... H04L 63/166 709/222 |
| 2009/0070771 A1 | 3/2009 | Yuyitung |
| 2009/0119752 A1 | 5/2009 | Chandrashekhar et al. |
| 2009/0157883 A1 | 6/2009 | Maffeis |
| 2009/0172802 A1 | 7/2009 | Mosek et al. |
| 2009/0177761 A1 | 7/2009 | Meyer et al. |
| 2009/0182803 A1 | 7/2009 | Barton et al. |
| 2009/0249467 A1 | 10/2009 | Webb-Johnson |
| 2009/0296685 A1 | 12/2009 | O'Shea et al. |
| 2009/0313290 A1 | 12/2009 | Narayanan et al. |
| 2009/0319661 A1 | 12/2009 | Shiozawa |
| 2010/0005194 A1 | 1/2010 | Perkins et al. |
| 2010/0031019 A1 | 2/2010 | Manning et al. |
| 2010/0057932 A1* | 3/2010 | Pope ............... H04L 69/16 709/236 |
| 2010/0064234 A1 | 3/2010 | Schreiber et al. |
| 2010/0064340 A1 | 3/2010 | McCorkendale et al. |
| 2010/0103837 A1 | 4/2010 | Jungck et al. |
| 2010/0153568 A1 | 6/2010 | Uola et al. |
| 2010/0162235 A1 | 6/2010 | Ginzton et al. |
| 2010/0169508 A1* | 7/2010 | Jung ............... H04L 69/22 709/250 |
| 2010/0174817 A1 | 7/2010 | Chetuparambil et al. |
| 2010/0175122 A1 | 7/2010 | Ballard |
| 2010/0192197 A1 | 7/2010 | Nadalin et al. |
| 2010/0205215 A1 | 8/2010 | Cook et al. |
| 2010/0226256 A1 | 9/2010 | Kato et al. |
| 2010/0268782 A1 | 10/2010 | Zombek et al. |
| 2011/0016197 A1 | 1/2011 | Shiimori et al. |
| 2011/0075845 A1 | 3/2011 | Calcev et al. |
| 2011/0106518 A1 | 5/2011 | Shin |
| 2011/0119376 A1 | 5/2011 | Bardsley et al. |
| 2011/0138069 A1 | 6/2011 | Momchilov et al. |
| 2011/0154018 A1 | 6/2011 | Edstrom |
| 2011/0154026 A1 | 6/2011 | Edstrom et al. |
| 2011/0209199 A1 | 8/2011 | Fenton et al. |
| 2011/0214131 A1 | 9/2011 | Luna |
| 2011/0216680 A1 | 9/2011 | Vogt et al. |
| 2011/0219057 A1 | 9/2011 | Scoda |
| 2011/0225646 A1 | 9/2011 | Crawford |
| 2011/0231479 A1 | 9/2011 | Boydstun et al. |
| 2011/0231555 A1 | 9/2011 | Ebrahimi et al. |
| 2011/0231652 A1 | 9/2011 | Bollay et al. |
| 2011/0231923 A1 | 9/2011 | Bollay et al. |
| 2011/0243024 A1 | 10/2011 | Österling |
| 2011/0282997 A1 | 11/2011 | Prince et al. |
| 2011/0296196 A1 | 12/2011 | Konetski et al. |
| 2012/0011098 A1 | 1/2012 | Yamada |
| 2012/0047180 A1 | 2/2012 | Kirshenbaum |
| 2012/0084487 A1 | 4/2012 | Barde |
| 2012/0124641 A1 | 5/2012 | Hegge et al. |
| 2012/0246126 A1 | 9/2012 | Rodriguez |
| 2012/0284712 A1 | 11/2012 | Nimmagadda et al. |
| 2013/0058250 A1* | 3/2013 | Casado ............... H04L 12/4633 370/254 |
| 2013/0133043 A1* | 5/2013 | Barkie ............... H04L 63/10 726/4 |
| 2013/0232263 A1 | 9/2013 | Kelly |
| 2013/0297703 A1 | 11/2013 | Van Ackere |
| 2013/0298235 A1 | 11/2013 | Smith |
| 2013/0298236 A1 | 11/2013 | Smith et al. |
| 2013/0318339 A1 | 11/2013 | Tola et al. |
| 2013/0322446 A1* | 12/2013 | Biswas ............... H04L 12/4633 370/392 |
| 2014/0003434 A1 | 1/2014 | Assarpour et al. |
| 2015/0081868 A1 | 3/2015 | Hillier |
| 2015/0135178 A1* | 5/2015 | Fischer ............... H04L 67/10 718/1 |
| 2015/0172108 A1 | 6/2015 | Song |
| 2016/0241526 A1 | 8/2016 | Tola |
| 2016/0269248 A1 | 9/2016 | Tola |

FOREIGN PATENT DOCUMENTS

| | | |
|---|---|---|
| JP | 2009-284448 | 12/2009 |
| WO | WO2007002848 | 1/2007 |
| WO | WO2007064879 | 6/2007 |

OTHER PUBLICATIONS

Suresh et al., Security Issues and Security Algorithms in Cloud Computing, International Journal of Advanced Research in Computer Science and Software Engineering, Oct. 10, 2012, vol. 2, Issue 10, ISSN: 2277 128X, pp. 110-114 (Year: 2012).*

Kaur et al., Implementing Encryption Algorithms to Enhance Data Security of Cloud in Cloud Computing, International Journal of Computer Applications (0975-8887) vol. 70—No. 18, May 2013, pp. 16-21 (Year: 2013).*

Natarajan et al., Encrypted Packet Forwarding in Virtualized Networks, Proceedings of the 2011 ACM/IEEE Seventh Symposium on Architectures for Networking and Communications Systems, Oct. 3-4, 2011, pp. 213-214 (Year: 2011).*

Varma et al. "Node Categorization Scheme (NCS) for Throughput Efficiency in Multi-rate Mobile Ad hoc Networks," International Journal of Computer Applications (0975-8887), Feb. 2010, vol. 1, No. 1, pp. 34-37.

(56) References Cited

OTHER PUBLICATIONS

International Search Report and Written Opinion for International (PCT) Patent Application No. PCT/US2013/039805, dated Sep. 17, 2013 9 pages.
International Preliminary Reoport on Patentability for International (PCT) Patent Application No. PCT/US2013/039805, dated Nov. 11, 2014 7 pages.
Extended European Search Report dated Dec. 8, 2015, for European application No. 13788414.4.
Official Action for European Patent Application No. 13788414.4, dated Sep. 8, 2016 4 pages.
International Preliminary Report on Patentability for International (PCT) Patent Application No. PCT/US2015/013433, dated Aug. 2, 2016 8 pages.
Official Action for U.S. Appl. No. 13/465,799, dated Feb. 13, 2013 7 pages Restriction Requirement.
Official Action for U.S. Appl. No. 13/465,799, dated May 15, 2013 18 pages.
Official Action for U.S. Appl. No. 13/465,799, dated Jan. 16, 2014 22 pages.
Official Action for U.S. Appl. No. 13/465,799, dated Jun. 20, 2014 24 pages.
Official Action for U.S. Appl. No. 13/465,799, dated Feb. 11, 2015 25 pages.
Official Action for U.S. Appl. No. 13/465,799, dated Jul. 17, 2015 25 pages.
Notice of Allowance for U.S. Appl. No. 13/465,799, dated Feb. 3, 2016 20 pages.
Official Action for U.S. Appl. No. 13/480,057, dated Oct. 24, 2013 24 pages.
Official Action for U.S. Appl. No. 13/480,057, dated May 19, 2014 34 pages.
Official Action for U.S. Appl. No. 13/480,057, dated Dec. 5, 2014 34 pages.
Official Action for U.S. Appl. No. 13/480,057, dated Jun. 22, 2015 41 pages.
Notice of Allowance for U.S. Appl. No. 13/480,057, dated Dec. 18, 2015 9 pages.
Official Action for U.S. Appl. No. 15/136,641, dated Aug. 11, 2016 15 pages.
International Search Report and Written Opinion dated Jun. 4, 2015, for International Application No. PCT/US2015/013433.
U.S. Appl. No. 13/465,799, filed May 7, 2012, U.S. Pat. No. 9,348,927, US 2013-0297606 A1.
U.S. Appl. No. 15/162,255, filed May 23, 2016, US 2016-0269248 A1.
U.S. Appl. No. 16/152,102, filed Oct. 4, 2018.
U.S. Appl. No. 13/480,057, filed May 24, 2012, U.S. Pat. No. 9,325,676, US 2013-0318339 A1.
U.S. Appl. No. 15/136,641, filed Apr. 22, 2016, U.S. Pat. No. 9,992,180, US 2016-0241526 A1.
U.S. Appl. No. 15/995,928, filed Jun. 1, 2018, US 2018-0278591 A1.
U.S. Appl. No. 15/992,634, filed May 30, 2018, US 2018-0343238 A1.
U.S. Appl. No. 16/052,068, filed Aug. 1, 2018, US 2018-0375841 A1.
Final Office Action for U.S. Appl. No. 15/162,255, dated Jun. 5, 2018. 17 pages.

* cited by examiner

```
<Pattern ID"a53e98e4-0197-4513-be6d-49836e406aaa">
    <Sequence Package="A" Type="Time" Duration="7200" />
    <Sequence Package="G" Type="DestIP" Change="Any" />
    <Sequence Package="B" Type="IntervalLocal" Start="9:00" End="17:00" />
    <Sequence Package="C" Type="Count" Num="1000" />
    <Sequence Package="E" Type="Data" Size="10000" />
    <Sequence Package="D" Type="Geo" Bottom="1.1.1.1" Top="1.1.1.255" InOut="In" />
    <Sequence Package="F" Type="Protocol" Name="TCP" Ports="All" Only="Yes" />
    <Sequence Package="END" Next="Randomize" SameLoop="Yes" MaxTimes="0" />
</Pattern>
```

First Level Instructions 1002

```
<Pattern ID"a53e98e4-0197-4513-be6d-49836e406aaa">
    <Match Time<="STARTIME && 7200">
        <Send HeaderValue="1" />
        <Capture Target="IPCRC" Math="Even" Alg="ApproachA" SeedPointer="&PointerF" />
        <Capture Target="IPCRC" Math="Odd" Alg="ApproachB" Value="PacketTTL" />
        <Capture Target="TCPCRC" Math="Modulus|&PointerQ|0" Alg="ApproachC" Value="12" />
    </Match>
    <Sequence Package="G" Type="DestIP" Change="Any" />
    <Sequence Package="B" Type="IntervalLocal" Start="9:00" End="17:00" />
    <Sequence Package="C" Type="Count" Num="1000" />
    <Sequence Package="E" Type="Data" Size="10000" />
    <Sequence Package="D" Type="Geo" Bottom="1.1.1.1" Top="1.1.1.255" InOut="In" />
    <Sequence Package="F" Type="Protocol" Name="TCP" Ports="All" Only="Yes" />
    <Sequence Package="END" Next="Randomize" SameLoop="Yes" MaxTimes="0" />
</Pattern>
```

Interpreted Modulation Language Instructions 1004

Figure 10

```
CCL: {
    Subscription_Expiration_Date: {Timestamp},
    UniqueID: {Special Value}
    Can_Initiate: {
        UserDeviceIds: {
            UserDeviceId: {
                UserDeviceKey: {Key},
                MacAddress: {MAC},
                BIOS_Hash: {Hash}
            },
            IsAllowed: [
                Allowed: True/False
                Protocols: [...]
                Times:{...}
                Duration: ##
                DataLimit:##
            ],
        }
    },
    Can_Receive_From: {
        UserDeviceIds: {
            UserDeviceId: {
                UserDeviceKey: {Key},
                MacAddress: {MAC},
                BIOS_Hash: {Hash}
                Protocols: [...]
                Times:{...}
                Duration: ##
                DataLimit:##
            },
        }
    }
}
```

Communication Control List
2600

Figure 26

Open System 3008

Partially Open System 3010

Closed System 3302

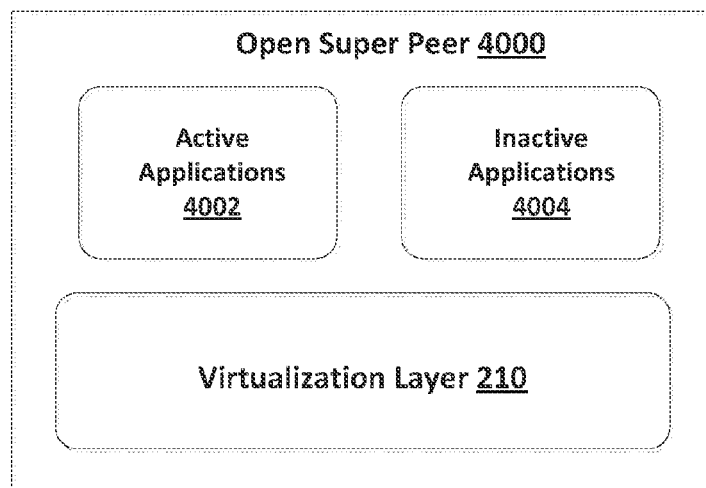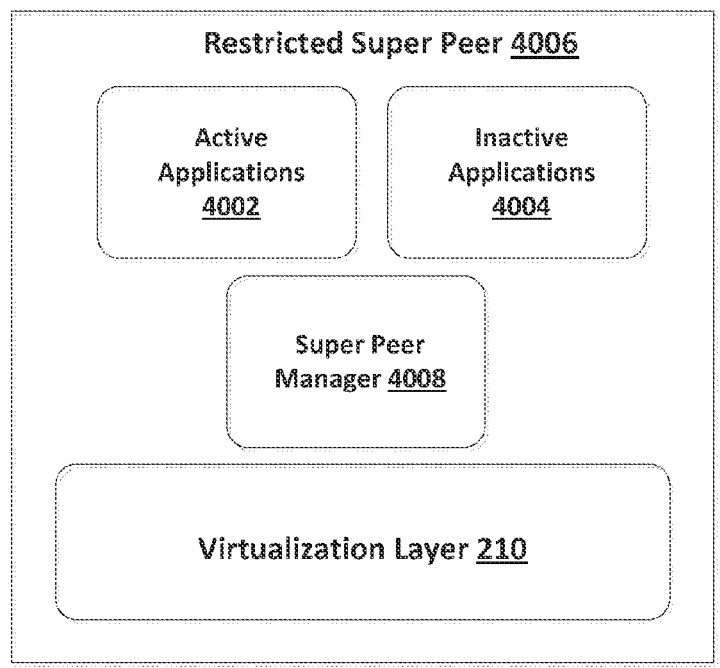
Figure 40

SYSTEMS AND METHODS FOR PROTECTING COMMUNICATIONS

CROSS-REFERENCE TO RELATED APPLICATIONS

The present application claims the benefit of U.S. provisional patent application Ser. No. 61/932,936, filed Jan. 29, 2014, entitled "Secured Invisible Private Network" and U.S. provisional patent application Ser. No. 62/022,540, filed Jul. 9, 2014, entitled "Secured Invisible Private Network," both of which are hereby incorporated herein by reference in their entirety for all purposes.

BACKGROUND

In modern data communications, a lack of data security as data flows between user devices presents problems when protecting users, user devices, networks, and enterprises. This issue is referred to as being one related to communications security. In addition to protection of data, communications security also may refer to a wide range of possible applications including communications control, session initiation, and network monitoring.

Numerous prior solutions have attempted to improve upon communications security; however, deficiencies still persist. These prior solutions generally relate to point-to-point communications protection, communication management, and network defense.

BRIEF DESCRIPTION OF THE DRAWINGS

For a detailed description of exemplary embodiments of the disclosure, reference will now be made to the accompanying drawings in which:

FIGS. 8-10 show exemplary encryption modulation schemes in accordance with various embodiments;

FIG. 26 demonstrates an example communication control list in accordance with various embodiments;

FIGS. 40-41 show exemplary super peers in accordance with various embodiments;

NOTATION AND NOMENCLATURE

Figure 1:
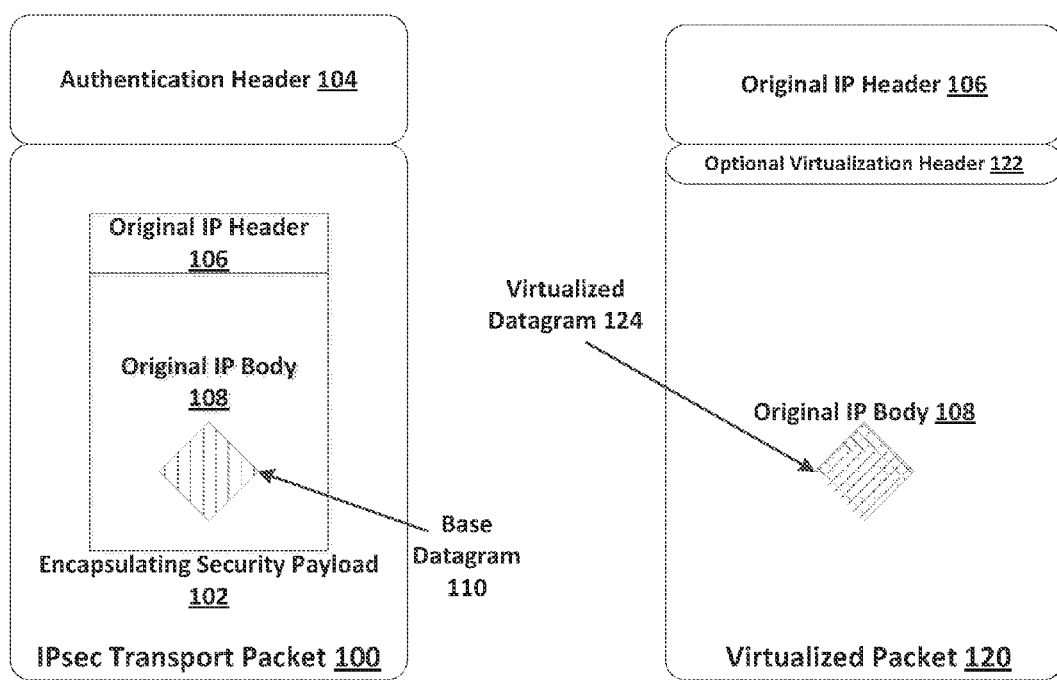
FIG. 1 shows examples of packet types in accordance with various embodiments.

Certain terms are used throughout the following description and claims to refer to particular system components. As one skilled in the art will appreciate, companies may refer to a component by different names. This document does not intend to distinguish between components that differ in name but not function. In the following disclosure and in the claims, the terms "including" and "comprising" are used in an open-ended fashion, and thus should be interpreted to mean "including, but not limited to . . . ." Also, the term "couple" or "couples" is intended to mean either an indirect or direct connection. When used in a mechanical context, if a first component couples or is coupled to a second component, the connection between the components may be through a direct engagement of the two components, or through an indirect connection that is accomplished via other intermediate components, devices and/or connections. In addition, when used in an electrical context, if a first device couples to a second device, that connection may be through a direct electrical connection, or through an indirect electrical connection via other devices and connections.

As used herein, the term "user" refers to a uniquely identifiable construct within a system that is able to perform an action within the system. This action is not limited in scope and can include such things as create, read, update, delete (CRUD) options, transport, transformation, communications and so forth. For example, a "user" is not limited to a human being, but also includes processes, services, and other such subsystems and code that can be assigned unique identifiers. Thus, a user differs from a unique option such as a row identifier in a database table, which is unable to take any action on the system. In some instances, a user refers to a logical construct such as a user of a virtual machine running within the context of a physical device. In this instance, the virtual user is a version of the user mapping of the application hosting the virtual machine.

As used herein, the term "device" refers to either a physical device (or group of physical devices) or a virtual machine or device. A physical device generally refers to the physical and software resources required to run an operating system and supporting software. A virtual machine generally refers to an emulation of a computer system, which may be carried out by a physical device or a collection of physical devices acting towards one logical purpose. Grid computing and clustered servers are examples of multiple devices working towards one logical purpose.

As used herein, the terms "user device" and "active user device" refer to the logical intersection of a device and a user. Users and devices may have a many-to-many relationship and thus multiple user devices may exist within a given device or for a given user at any one time.

As used herein, the term "platform" refers to a grouping of similar devices. Devices may be grouped based on the type of operating system used, the type of device itself (e.g., secured/unsecure; desktop/laptop/mobile; client/server; peer/super peer; or old/new), or another distinction that identifies devices in a given system either by its presence and variability among devices or by it lack of presence in some subset of devices. Thus, as used herein, the term "cross-platform" as in "cross-platform communication" refers to devices of two different platforms that communicate with one another; such a cross-platform system may be referred to as a hybrid system.

Finally, as used herein, the term "operation" or "performing an operation" refers to a packet-modifying operation such as encrypting the packet, replacing the packet with an alternate packet, deleting the packet, cloning the packet, replacing the packet with a packet pointer, and the like. Performing an operation on a packet may be restricted to a base datagram and may exclude to the modification of header fields. Alternatively, an operation might specifically target the header to alter the packet length or CRC fields, for example.

DETAILED DESCRIPTION

The following disclosure is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the disclosure of any embodiment is meant only to be exemplary of that embodiment, and not intended to intimate that the scope of the disclosure, including the claims, is limited to that embodiment.

Internet Protocol Security (IPsec) is a protocol suite for securing Internet Protocol (IP) communications by authenticating and encrypting each IP packet of a communication session. There are two main modes for IPsec: tunneling mode, which is used for virtual private network (VPN) support and transport mode, which is used for point-to-point communications. However, as a result of differences in header formatting among IPsec proponents, cross-platform, point-to-point security is not possible: This lack of cross-platform support renders IPsec unable to protect communications in a hybrid environment such as over the Internet.

Due to the dependence and location of IPsec within the IP communication layer of an operating system, IPsec suffers limitations: First, IPsec cannot encrypt data from a given port and then place the encrypted packets back on the same port. Rather, IPsec uses a standard set of well-known ports, which provides assailants with predetermined communications routes to monitor. The use of static ports also opens widely-recognized ports in firewalls and operating systems when optional-on IPsec security is not running.

Further, because IPsec is tightly coupled to the operating system, broad reaching updates to its functionality are also overly burdensome. IPsec uses a security algorithm that is provided by a given operating system and this is not an option that can be easily updated. As such, cross-system compatibility forces IPsec communications to rely on security features for numerous years or even decades at a time. The rate at which security algorithms become vulnerable is much faster, and thus the protection afforded by IPsec cannot keep up with that pace.

IPsec also encrypts an entire packet of data, which can introduce issues when dealing with maximum transmission unit (MTU) limitations. For this reason, most multimedia transmissions are unable to use IPsec to secure UDP packets with very large datagrams. IPsec is further restricted by what is considered acceptable by lower communication layers such as TCP and UDP. These limitations restrict the flexibility of IPsec as far as what encryption options can be applied and how those options can be varied. That is, with IPsec, only one algorithm can be used, which is determined by the operating system, and that algorithm has to be applied to all packets across all secured communication streams.

What is needed, and is provided by various embodiments of the present disclosure, is an adaptable framework that removes operating system restrictions from network communications. Such a system should provide encryption options, isolate the network from the operating system, and yet simultaneously be transparent to the operating system in order to avoid any interaction issues, for example with applications executing in the operating system environment.

Although IPsec transport mode was intended to secure point-to-point communications, it was never intended to manage communications. This area is largely defined by what are termed "Triple A Services" or authentication, authorization, and accounting. Authentication refers to the concept of taking a first class entity and verifying the identity of the entity. In some systems, such as Lightweight Directory Access Protocol (LDAP), the first class entity is a user. In other systems, such as a Unified Computing System (UCS), a user device is a first class member. Authorization is dependent on an authentication entity establishes what resources an entity can access and, optionally, what interactions an entity is allowed to have with each resource. Finally, accounting refers to the process of measuring resource access from the perspective of the resource provider. For example a mobile gateway might record the amount of time it allows a mobile user device to access a given VOIP connection.

In modern environments, shortcomings in each of these systems cause significant issues. For example, there is no method employed in these systems to authenticate a second class member or even add a new type of first class member option. This results in situations where a first class member requiring more restricted access is unable to be properly restricted. As one example, an executive may be given the same access rights to sensitive data regardless of whether that executive logs in from a central work computer or from an insecure phone at some remote location, which creates a higher likelihood of a security breach.

In accordance with certain embodiments, an adaptable, variable first class membership authentication solution is provided that allows for n number of first class members to be combined together as required to accomplish the level of granularity required. This system is able to extend current LDAP/UCS solutions at differing levels and provide control of such authentication to a given network as needed. To this end, an authentication system disclosed herein is able to include first class members from an existing LDAP system and extend its functionality by adding first class members from either its own system or from another LDAP system, and thus utilizes a different type of first class member. While authorization schemes are limited given their dependence on authentication, a larger issue is a lack of communications control. In modern paradigms, even if a user on a given user device has no access to any resources on another user device, the two user devices can freely communicate with one another. This uncontrolled communication can create conduits for malicious activity such as, for example, the spread of malware within a network.

In addition to providing authorization by the first class member combinations described previously, various embodiments of the present disclosure allow authorization systems to be expanded to include communications control. For example, such systems differentially control with whom members interact, how they interact, when they interact and, amongst other things, how much data is exchanged. Given the flexibility in first class membership, these interactions may occur through any number of entities including users, user devices, applications, or some combination thereof. Prior solutions do not address these needs for either authentication or authorization.

Turning now to accounting, prior solutions are largely one-sided with little ability to guarantee delivery. In accounting systems, a resource provider commonly reports to an accounting server that the provider is providing a given resource and subsequently the resource provider reports when that resource access is terminated. While there may be optional intermediate updating, information is not provided by the resource consumer sufficient to validate the use of a given resource. One example of this issue relates to Quality of Service (QoS), for example, in relation to multimedia streaming QoS is generally equated with bandwidth; thus a given user who desires improved QoS may request a better QoS, which results in an indirect request for increased bandwidth. A gateway may approve such a request and thus provide this additional bandwidth, along with reporting this increase in bandwidth to an accounting server. However, in certain situations an increase in bandwidth may not actually improve the user's QoS. Problems such as network saturation, multimedia provider limitations, or even user device processing speeds may serve as a bottleneck that is not solved by simply providing more bandwidth.

In these cases, the user has requested a better QoS and the accounting server will bill the user for the increased QoS based on the gateway reporting, however the user never actually receives the requested enhanced QoS experience. Without resource consumer-side account reporting, there is no way to verify the actual user QoS; this deficiency in reporting can lead to ongoing issues. In accordance with certain embodiments of the present disclosure, consumer-side accounting is provided where the resource consumer provides reporting to the accounting server based on what is actually received at the consumer, rather than what a gateway assumes is the case at the consumer.

In modern computing, networks focus on defending themselves as much as possible, but rarely attempt to directly respond to ongoing attacks in real time. Limitations in the prior art prevent networks from turning attacks on the attackers, distributing resource overload attempts (for example countering distributed denial of service ("DDoS") attacks) across sufficient on demand resources to overcome a challenge and so forth. One challenge facing networks is that any attempted solution is bound to the operating system and that operating system's associated communication layers. These layers provide readable indicators, for example a network hop and/or forwarding address, or use an exploitable initiation process such as a TCP handshake that prevents many types of counter-intrusion responses.

Considering these limitations, most network defense systems focus instead on intrusion detection response efforts. For example, these efforts attempt to minimize lag between an initial intrusion and a subsequent response and adaptation to that network's defense. One issue with this approach is that an attack always gets in and does some level of damage before it is blocked. The attackers are never directly confronted, although subsequent identification efforts may be taken, and these attacker's efforts are always successful to some degree. Response times to a given intrusion are often measured in weeks and months, which can exacerbate the damage.

In accordance with various embodiments of the present disclosure, network defense is provided that is proactive and prevents intrusion, as much as possible, before an attack occurs. For example, if a given member of a network is compromised, network defense mitigates the damage by isolating the infected member and preventing the dissemination of a given attack vector. If an active intrusion effort is detected, network defense responds to this attack in a manner that is transparent to the would-be intruders. Thus, in certain embodiments the response to an attack effort is beyond the purview of the host operating system.

As explained above, and as will be appreciated by one of ordinary skill in the art, point-to-point communications security suffers from significant issues. The main option available today, IPsec, suffers numerous limitations due to its reliance and location within an operating system. One such limitation is an inability to unravel a given packet, encrypt the core datagram and then rewind the packet back to its original format, aside from any descriptive field changes such as data length. Rather, as shown in FIG. 1, IPsec encapsulates the entire packet (i.e., original IP header 106 and IP body 108, which includes a base datagram 110) and adds its own Authentication Header 104 onto the top of the IP packet 106, 108, 110. This results in both a highly visible header and one that, despite a standard to the contrary, can be implemented in multiple manners.

The IPsec standard has at least two main supporters that have created incompatible versions of IPsec. As a result, implementing security in a cross-platform manner is not possible. As yet another issue, IPsec fails to enable routing for current version of IP traffic. In order to protect sensitive data within the visible headers noted above, IPsec transport mode generates a hash of the entire message, which prevents any changes. Although secure, this feature precludes the use of Network Address Translation (NAT) options, which relegates IPsec transport mode to private LANs as opposed to open WANs such as the Internet.

In accordance with various embodiments of the present disclosure, a virtualization layer is provided on a user device that allows packets to be encrypted, modified, or otherwise operated on in a way that is not readily apparent to an operating system of that user device. As such, no modification of the operating system or any applications executing on the user device is needed to take advantage of the capabilities of the virtualization layer. Further, modifications to the virtualization layer itself, or to operations carried out by the virtualization layer (e.g., modifying an encryption scheme implemented by the virtualization layer) may be performed through a simple update procedure, and may be tailored to a user's desires on a case-by-case basis.

As shown in FIG. 1, a virtualized packet 120 includes the same IP packet 106, 108 that would be subsumed using IPsec. However, unlike the IPSec transport packet 100, the virtualized packet 120 includes only a modified base datagram, referred to as a virtualized datagram 124. Further, it should be understood that certain pre-existing field values in the IP header 106, for example, may be updated as long as the original packet header structure remains intact. This figure is exemplary and should not be construed as limiting the scope of the present disclosure to IP traffic. In fact, any form of communications that provides a core datagram, or even just a datagram, is within the scope of the present disclosure. In the example of FIG. 1, the original IP header 106 includes fields such as time to live and packet length, which can be optionally updated but, outside of those fields, the IP packet itself remains structurally intact.

In accordance with various embodiments, the virtualization layer is logically situated above a physical layer (e.g., a physical layer of the Open Systems Interconnect (OSI) stack) but below all other layers. As a data packet travels from an application through the higher layers, the data packet can be inspected and, optionally, intercepted by the virtualization layer prior to reaching the physical layer, for example the miniport driver of a network interface card (MC). The virtualization layer may then perform one or more operations on the data packet, the details of which will be explained further below, while any processing of the header of the data packet can be separate and distinct from the operations performed on the data packet. By leaving the header in its original format (aside from modifying standard fields such as data length, for example), the present disclosure overcomes routing and addressing challenges.

A header can be any part of a packet of data that is available for general inspection. For certain protocols such as TCP, UDP, and IP, a header is typically considered to be a prefix that contains overall information about the packet such as, but not limited to, addressing information, time to live, and IP version. Addressing information can include source address, destination address, and intermediate addresses such as those used for proxy or static routing efforts. Different protocols, for example IPv6, allow headers to be nested within one another in order to enable a richer feature set. All such options are within the scope of the present invention.

Figure 2:
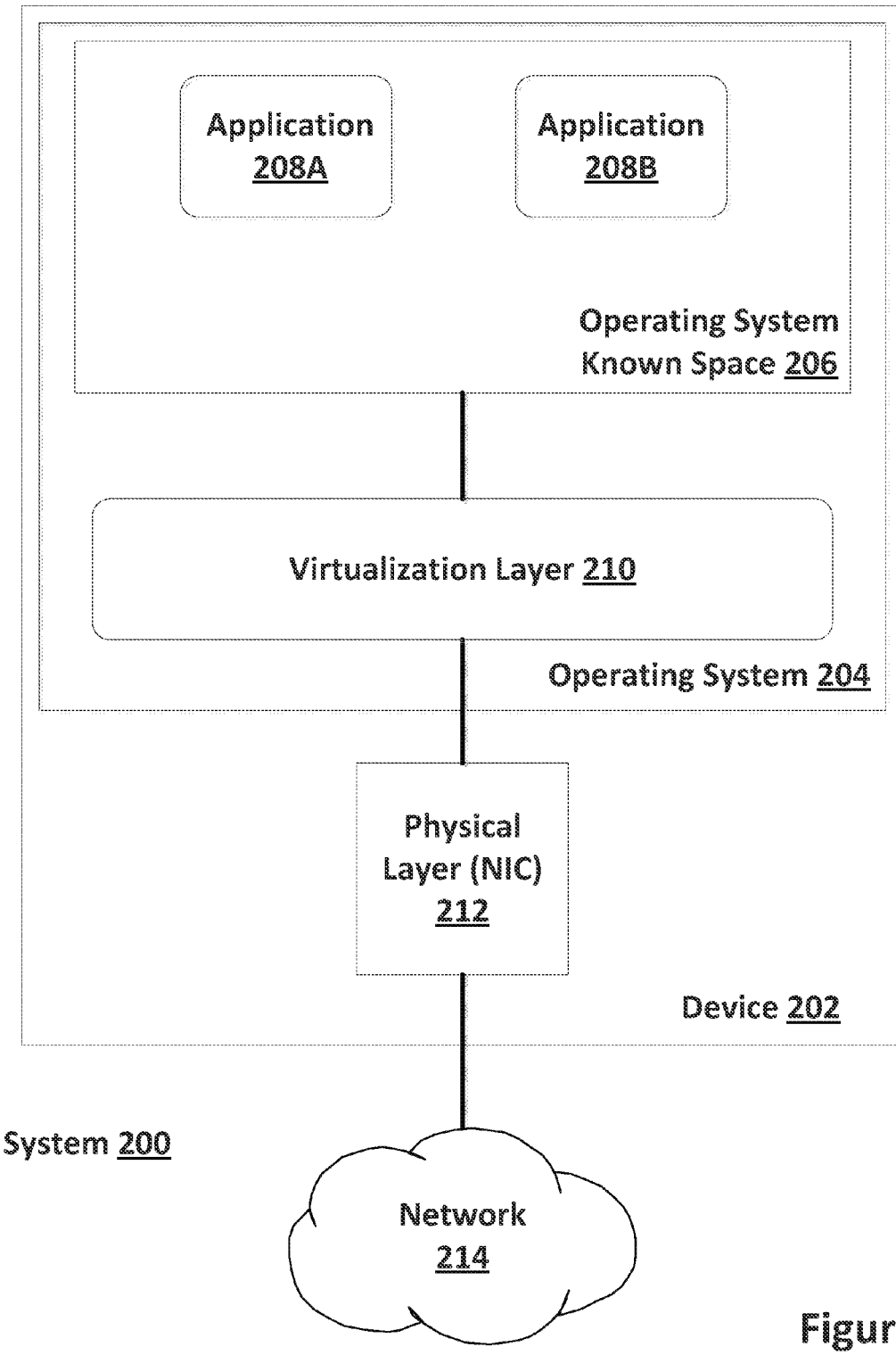
FIG. 2 shows a block diagram of a system and device in accordance with various embodiments.

Turning now to FIG. 2, a system 200 is shown in accordance with various embodiments of the present disclosure. The system 200 includes a device 202 coupled to a network 214. The device 202 may include any one of a variety of computing devices, such as a desktop, a laptop, a smartphone, and the like, which is configured to communicate with one or more other devices over the network 214. The system 200 may include many such devices 202 in communication with one another over the network 214. The network 214 may be a wired network or a wireless network and may comprise networks such as a local area network (LAN), a wide area network (WAN), the Internet, and the like.

The device 202 includes an operating system 204 within which their existing a logical known space 206. For simplicity, components of the device 202 are not shown, but it should be understood that the device 202 may include various components such as memory, hardware storage, a user input device 202, a display device 202, a file system, various communication and device 202 drivers, and the like. The operating system 204 and various applications 208a, 208b may be executed within the operating system known space 206. Known space 206 refers to the region of the operating system where processes are controlled, either directly or indirectly, by operating system rules and limitations. This known space 206 is a logical construct that related most directly to the rules and restrictions of the OSI model and how that model is implemented within a given operating system 204. The virtualization layer 210, which may be instantiated as part of the operating system 204 is not part of the operating system known space 206. The applications 208a, 208b may generate data or serve as a conduit for data (e.g., that received from an end user device 202) to be transmitted over the network 214.

In accordance with various embodiments, a virtualization layer 210 is logically positioned between the higher layers where the operating system 204 and associated applications 208a, 208b are executed and a physical layer 212. The higher layers may comprise layers of the OSI model including the application layer, the presentation layer, the session layer, the transport layer, and the network layer. Below the virtualization layer 210, the physical layers 212 may comprise the data link and physical layers for example the miniport driver for a network interface card (NIC).

The virtualization layer 210 may be initialized as an additional layer within the confines of the operating system 204 or this layer may be initialized outside the scope of the operating system 204. In the latter scenario, a BIOS pre-boot loading sequence may initialize the virtualization layer 210 after the physical layers 212 have been established but independent of the activation of the operating system 204.

Figure 3:
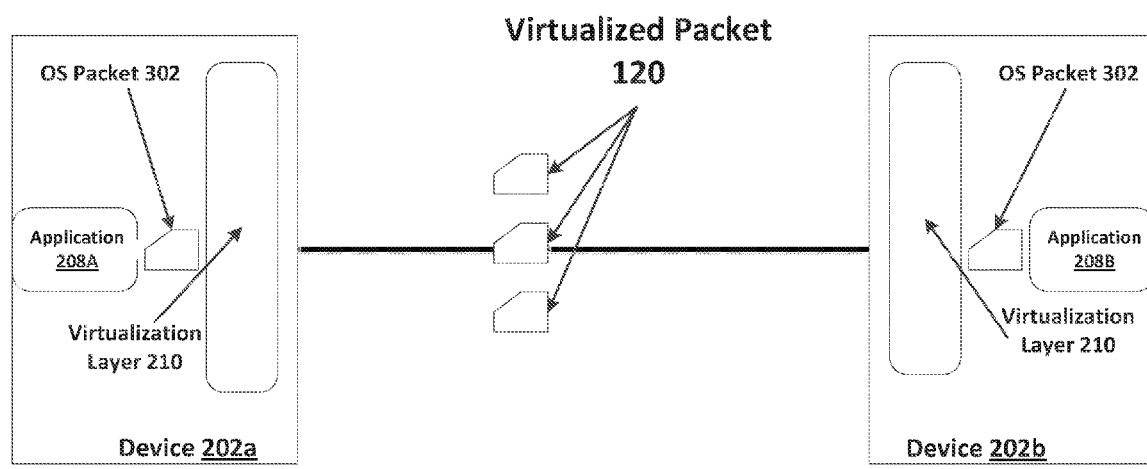
FIG. 3 shows a block diagram of a system in accordance with various embodiments.

The virtualization layer 210 intercepts OS packets 302, shown in FIG. 3, which the operating system 204 and/or the applications 208 send to the network 214, which are then processed in accordance with various embodiments. After processing, depending on the embodiment, the virtualization layer 210 places the virtualized packet 120 back into the original data stream where the packet 120 is then sent to the physical layers 212 and to the network 214.

Referring to the logical location of the disclosed virtualization layer 210, it is noted that IPv4 and IPv6 are constructed at a level logically situated above the virtualization layer 210. Therefore, in embodiments where a packet is deconstructed, the base datagram 110 can be altered or operated on and then the packet can be rebuilt and the original header structure re-applied. That header construct may be a simple IPv4 or a more complex, possibly nested, IPv6 header structure, or some other packet header. Header fields that may be updated are existing fields within the general header construct such as time to live, addressing information, and/or packet size. Considering the commonality of the outer header fields for IPv6 and the IPv4 header fields, for example, the same header operations can be applied to packets regardless of the version of IP. Differential operations might also be utilized and this IP version-agnostic capability is presented for sake of clarity on the logical position of the virtualization layer.

To the external world, the packet operated upon in accordance with the present disclosure appears the same as the original packet outside of a deep packet inspection effort. As explained above, the virtualization layer 210 resides below the non-physical OSI layers, and, as such, the same ports originally used can be used to send the encrypted or otherwise operated-on packets to the physical layers 212. Subsequently, the virtualization layer 210 transmits the modified data packet to the physical layer 212, at which point the data packet may be transmitted across a network 214. As will be explained in further detail below, when a data packet is received from the network 214 via the physical layer 212, the virtualization layer 210 may operate similarly to "undo" any operation that has been performed on the data packet before transmitting the packet to the operating system 204.

In this way, the existence of the virtualization layer 210 is transparent to the operating system 204 of the device 202. Further, the virtualization layer 210 serves to isolate the operating system 204 from a network 214 over which communications may be sent. The present disclosure also addresses synchronization of packets between two devices 202 in a communication stream where each device 202 implements various embodiments of the present disclosure.

Separately, the present disclosure addresses synchronization of packets being sent to and from the operating system 204. Referring to FIGS. 2 and 3, as one non-limiting example, assume Computer A (e.g., device 202a) sends an operating system (OS) packet 302 with a sequence number of 15 to its local virtualization layer 210. Further, assume that the operation process carried out by the virtualization layer 210 comprises an encryption process that creates an odd number of packets, such that the packet number expected by a virtualization layer 210 on another device (e.g., device 202b) was 22. An embodiment of the present disclosure maps the OS packet 302 (with sequence number 15) and the virtualized packet 120 (sequence number starting at #22) on both sides of the communication stream. This mapping feature results in the ability to combine multiple OS packets 302 into one virtualized packet 120 or, conversely as shown in FIG. 3, to extrapolate one OS packet 302 to numerous virtualized packets 120. The communication between two virtualization layers 210 over a network 214 is independent of the communications between an operating system 204 and a virtualization layer 210. By synchronizing packets, the virtualization layers 210 are able to achieve transparent isolation and remain invisible to the operating system 204 and any applications executing on a device 202. The operating systems 204 are effectively communicating directly with one another while the virtualization layer 210 is able to make any modifications without impact to that operating system 204 level communication session.

In some embodiments, the virtualization layer 210 intercepts an OS packet 302 and modifies the base datagram 110 within that OS packet 302. In order to accomplish this, the virtualization layer 210 breaks the OS packet 302 down to its core datagram 110. This datagram 110 may exist at an application layer, at a transport layer, or any layer in between. At the virtualization layer 210, the packet breakdown (also referred to herein as "unwinding" the packet) continues until the core datagram 110 has been uncovered. At that point an operation on the core datagram 110 may be performed, resulting in a virtualized datagram 124. As one example, an embodiment may encrypt the datagram 110 using one or more algorithms according to a range of rules, described in detail below. Another example operation is replacing all or part of the core datagram 110 with a pointer to data shared across devices 202, for example to reduce the size of duplicate packets being transmitted between devices 202. In other embodiments, the core datagram 110 might be captured and redirected—either individually or as a stream—to a separate location from the intended destination for that OS packet 302. In any case, an encryption operation may be layered on top of other operations. That is, in the latter described copying embodiments, a related or independent single or set of encryption approaches may be applied as compared to the OS data packet 302.

Once the operation on the core datagram 110 is complete, the virtualization layer 210 builds the virtualized packet 120 such that it again resembles the original OS packet 302. For example, the initial header or addressing information for the data packet may be re-used with only standard fields, such as CRC values and data lengths, being modified. The operation performed on the core datagram 110 is not also performed on the data packet's initial header. In some embodiments, other standard fields such as proxy server or even source and destination IP address fields are utilized to make additional modifications, but the overall structure of the header remains unchanged after the virtualized packet 120 has been rebuilt.

Other operations may be performed on the OS packet 302 that do not require a complete unwinding of the OS packet 302. Examples of such operations include cloning the packet, redirecting a packet, filtering packets, and the like. The present disclosure is not limited to a particular type of operation that is ultimately performed on the OS packet 302 or the core datagram 110; rather, any operation performed within the functionality of the disclosed virtualization layer 210 is within the scope of the present disclosure.

Certain exemplary embodiments are directed to packet pointer security. These embodiments include an optional operation that may be performed by itself or as part of a large series of operations to be described more fully below. The premise of packet pointer security is that, at the level of a base datagram 110, there exist common sequences of bytes across all packets of information. It is not guaranteed that a given sequence exists in all packets, although that may be the case in certain instances; however, common patterns of bytes or bits of data exist within a network of communication streams. Based on that premise, extracting common patterns would allow those patterns to be replaced with pointers, which both reduces communications size and further secures data being transmitted.

Figure 4:
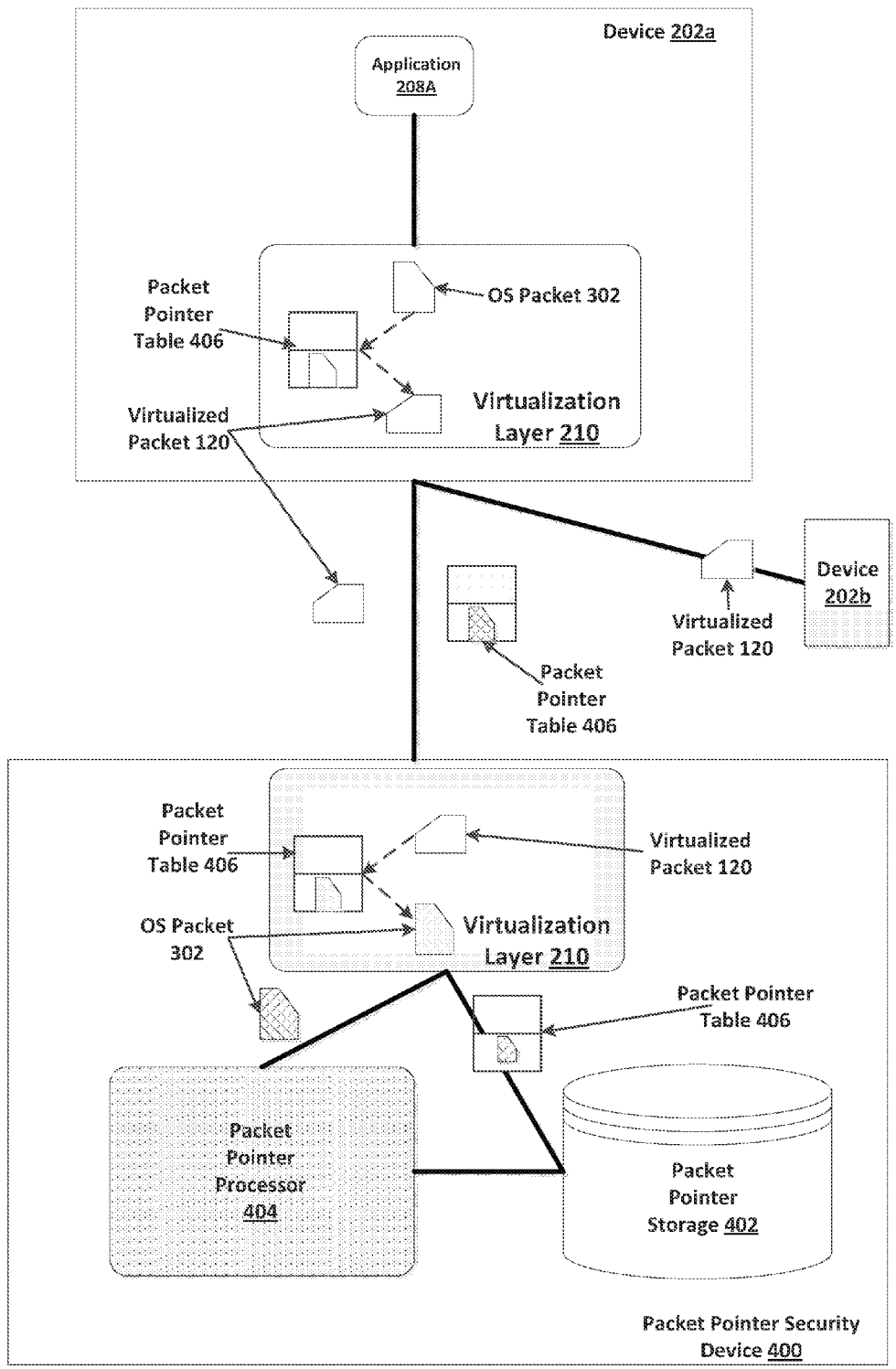
FIG. 4 shows a block diagram of an exemplary packet pointer implementation in accordance with various embodiments.

FIG. 4 demonstrates a packet pointer system in accordance with various embodiments. As described previously, an application 208A transmits an OS packet 302 to another device 202. The packet is intercepted by the virtualization layer 210, which may compare the base datagram 110, either in whole or in part, with entries in a packet pointer table 406 to determine the existence of matching patterns. The packet pointer table 406 represents a logical construct that might be, for example, implemented as a hash table, queue, memory map file, text file, in memory database, or any other such construct that enables a lookup process. The lookup process may consist of rows in a table, a series of name-value pairs, or other similar constructs such as a seed or key value to place into an algorithm. In this latter case, the key or seed value is utilized on the other end of the communications stream, in this case by device 202b, to recreate the original pattern based on the seed or key value.

The virtualization layer 210 compares the contents of the base datagram 110 to the entries in the packet pointer table 406 and, if a match is found, the pattern in the base datagram is replaced with the lookup value's corresponding pointer. This process may continue according to optional business rules and/or until all of the entries are inspected. In some cases, the entries are organized by the size of the patterns, the date a pattern was added to the packet pointer table 406, the popularity of a given pattern, and so forth. Business rules, for example, could force successive iterations through all entries again to create nested groups of replaced patterns such that the newly inserted pointers/name values themselves are replaced by other pointers, keys, or name values. Different types of patterns may be used to denote various levels of nesting depending on the embodiment. Thus a logical level 1 set of matches might be applied to the base datagram 110, the next logical level to the datagram 110 after a first pass, and so forth. This enables control over the nesting and un-nesting features.

Once completed, the altered base datagram 110 can then be optionally encrypted by the virtualization layer 210 to create a virtualized datagram 124, as explained above, and the packet itself is rebuilt to create a virtualized packet 120. In some embodiments, any such encryption occurs first and then pattern matching is carried out. In these cases, there might be additional embodiments in which encryption occurs after the pattern matching process. This sequence of encryption, pattern matching, and optionally more encryption can be modified in subsequent embodiments and controlled through static or dynamic rules to create an additional layer of security. All such variations are within the scope of the present disclosure.

This virtualized packet 120, outside of updating fields such as the data length, time to live, and CRC fields, is structurally the same as the original OS packet 302. During this process, either by cloning the base datagram 110 or by cloning the resultant virtualized packet 120, the virtualization layer 210 is able to create a copy of the virtualized packet 120. This copy would have its destination IP address field, and optionally its port and source IP fields, altered such that the packet is sent to a packet pointer security device 400 instead of the device 202b.

Thus one virtualized packet 120 is sent to the device 202b and the other virtualized packet 120 is sent to the packet pointer security device 400. In alternative embodiments, the receiving device 202b may create the clone and forward that clone to the packet pointer security device 400. This embodiment is particularly useful when adding in resource consumer-side accounting, as this conduit could support both functions. Yet another embodiment places the packet pointer security device 400 in between the devices 202, which mitigates the need for cloned packets.

The virtualized datagram 124 is optionally decrypted on the receiving devices 400 and 202b, and then pattern matching is performed in reverse, with the name or pointer used to revert the entire or partial section of the virtualized datagram 124 back to the original set of bits or bytes. If the inserted value is a key or seed value, then a hosted algorithm is used to generate the missing data. This process continues in the reverse order of the processing for the outgoing packet described above, until the original base datagram 110 is reconstructed. In certain embodiments, this includes completely unnesting all nested replacements and/or performing any subsequent decryption efforts. Once complete, the original OS packet 302 is rebuilt with all original field values replaced as needed, including expected synchronization values and correct CRC calculations.

Referring to the packet pointer security device 400, the OS Packet 302 is sent to a logical construct referred to as a packet pointer processor 404. This construct may be implemented using an application, a system of hardware devices and/or applications, or another similar implementation that supports the described processes. In one embodiment, this construct consists of software that receives the incoming OS packets 302 and stores them in a storage device. The packet pointer security processor 404 includes a map reduce capability that continuously determines the best patterns to utilize before storing the results of this effort in the packet pointer storage 402. The packet pointer storage 402 may comprise a physical database, a document repository, an in memory datagram, an XML map memory file, or any other such medium capable of storing data.

The packet pointer processor 404 compares the bits or bytes of data across numerous packets and obtains common patterns found within these packets. Thus, the base datagrams 110 are unwound to form conceptual lines of bits or bytes, which are then compared to one another using any combination of matching methods. For example, some embodiments might take a string in the first position and compare that string to the other strings in a set, first as a whole and then as a substring. This latter substring can be generated by taking one bit or byte of either or both ends of the first string, by creating a crawling subset, or by starting with a central minimum subset and expanding outwards. A crawling subset may be created by starting at one end with a substring of finite length that is smaller than the whole string with a position of 0. As pattern matching progresses, the length of the substring stays the same, but the starting position of the substring increases until the entire string has been processed. Some embodiments might continue through to the end of the first string, thus producing smaller and smaller substring lengths, whereas other embodiments might stop when the substring includes the last bit or byte of the first string or some minimum substring size is reached. Other embodiments may crawl in reverse order and even others may start at both ends and create combinations off of the two resultant substrings.

Some embodiments might utilize a generational approach which supports different levels of matching patterns as described previously. Thus a given map reduce effort might be utilized to generate a logical first level of patterns. Then, the resultant datagrams, modified with the pattern-matched modifications, can be processed again to generate a logical second level of patterns and so forth.

In more complex cases, matching process instructions in the virtualization layer 210 may be included in the packet pointer table 406. By including instructions, which can be a simple sequence number to denote the type of matching or a complex series of steps akin to BPEL commands, the matching paradigm can become more sophisticated. As one possible example, different matching techniques may be strung together such that a given pattern is only used if certain other matches occur ahead of time, or whether a certain type of encryption algorithm was used. These additional features are useful in avoiding data corruption issues, which can occur when encrypting certain patterns of data as one example.

Regardless of the operation performed on the base datagram 110, after the virtualization layer 210 performs the operation, the virtualization layer 210 assembles the virtualized packet 120. After the virtualized packet 120 has been assembled, the virtualization layer 210 forwards the virtualized packet 120 to the physical layer 212, which transmits the virtualized packet 120 across the network 214. Unlike other packet security schemes, the header of the data packet remains structurally unmodified (although, as described above, certain field values, such as a data length field or CRC field, may be altered or recalculated to account for other changes to the data packet) by the virtualization layer 210. That is, the original header format is maintained such that a receiving entity coupled to the network 214 recognizes the format of the packet. In certain circumstances, header fields, such as a packet length field or a cyclic redundancy check (CRC) field, are modified to reflect changes to other portions of the data packet, but the header itself is not otherwise operated on. In some embodiments, where the operation performed is an encryption operation, the virtualization layer 210 would not encrypt the header itself.

The virtualization layer 210 also may be configured to operate on certain packets while allowing other packets to pass through to the physical layer 212 without first being operated upon. For example, the virtualization layer 210 may perform operations on packets directed to a certain port, but does not perform operations on packets directed to ports other than the certain port. It should be appreciated that the same differentiation scheme may apply to a grouping of ports. Further, in other embodiments, the virtualization layer 210 may perform operations on all packets to be transmitted over the network 214. Other embodiments may apply an optional filter on any characteristic that can be attributed to a packet including, but not limited to, source/destination IP address, protocol, packet size, sending application, and so forth. This filter can be used to differentiate packets and subject certain packets to no operations or a varying set of operations based on any number of characteristics.

The ability to inspect, filter, and apply variable operations at the packet level therefore leads to the ability to enforce a distributed packet level firewall capability. Dynamic firewall features are covered later in this disclosure and this feature is similar to deep packet inspection firewalls, although with numerous differentiating features. Prior art deep packet inspection firewalls are most commonly implemented as separate appliances or intermediary servers situated between a possibly large number of devices on one side and a protected variable set of resources on the other side. While effective in handling packet level inspection and supporting rules to that end, deep packet inspection firewalls are limited in terms of speed and throughput. In accordance with various embodiments, packet inspection requirements are distributed to a larger number of devices, thus mitigating the speed and throughput concerns of prior art designs. Further, as will be explained, more intricate rules can be created based on a distributed enforcement model as opposed to a centralized system.

Figure 5:
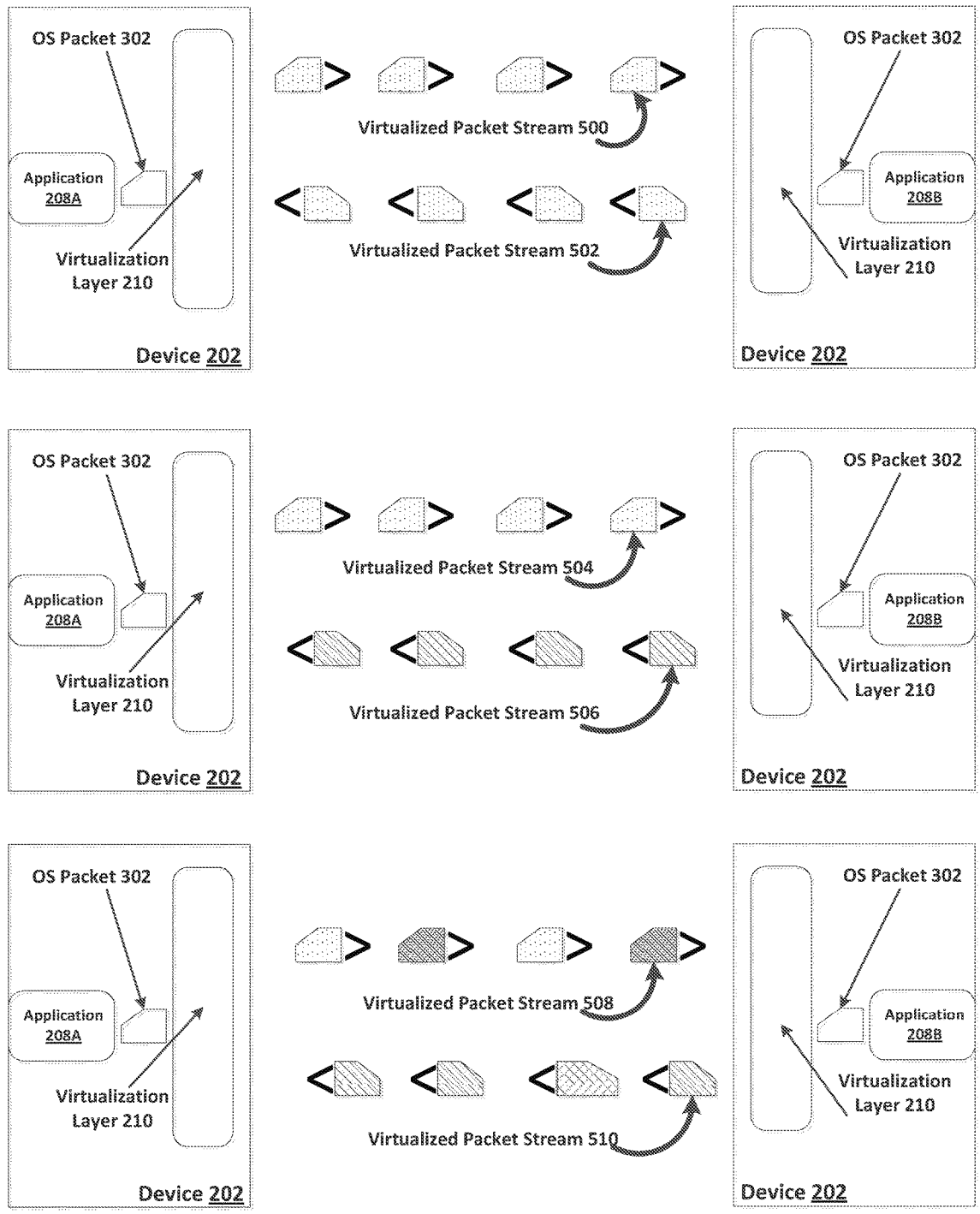
FIGS. 5-7 show exemplary encryption schemes in accordance with various embodiments.

In accordance with various embodiments, the ability to differentially operate on packets based on various packet characteristics provides a new approach to performing encryption or other operations. Certain embodiments of the present disclosure take advantage of this feature to provide enforcement rules that apply different types of encryption at different times based on a static or dynamic series of characteristics. As shown in FIG. 5, the use of multiple types of encryption may be applied within the same communications channel. As shown in virtualized packet streams 500, 502, the same encryption may be applied for packets flowing in either direction. Virtualized packet stream 504 demonstrates a first encryption used for packets going one way, whereas virtualized packet stream 506 demonstrates a second, different encryption used for packets going the other direction.

Figure 6:
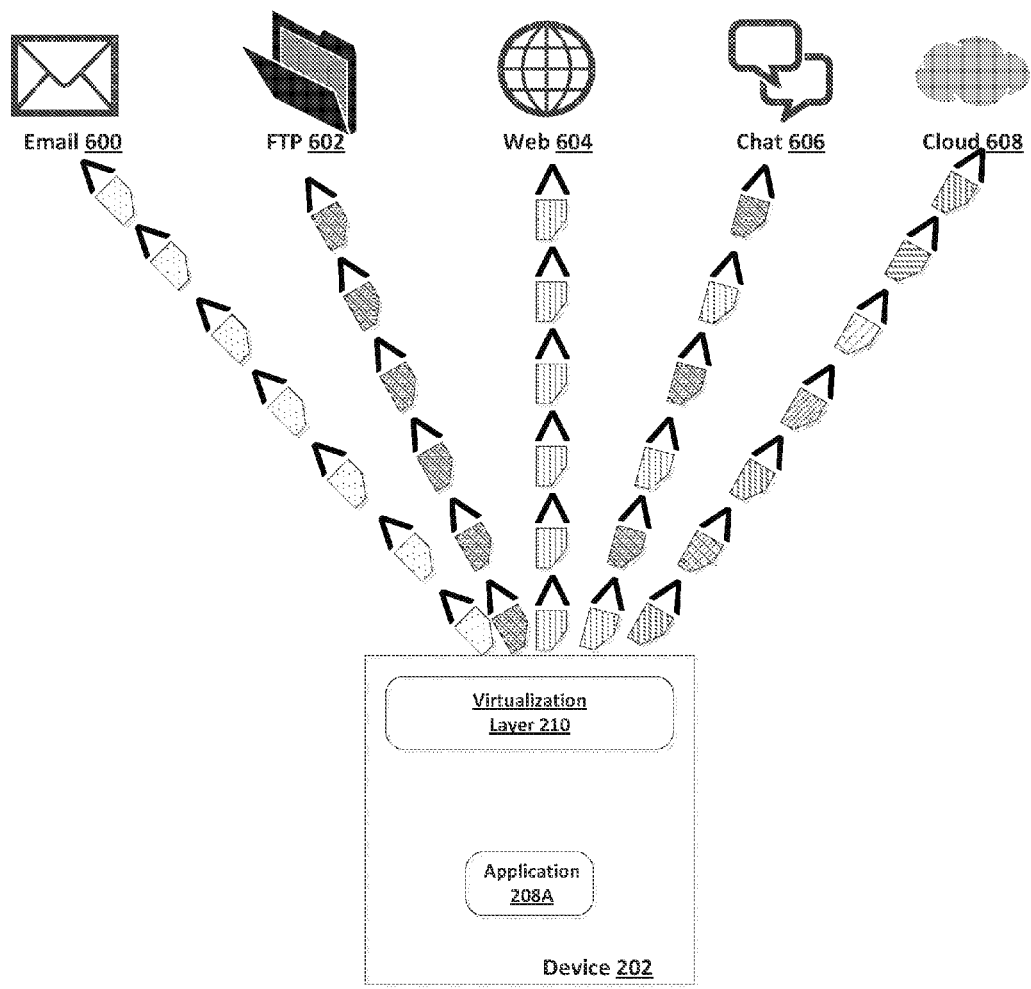

Encryption can be further changed within a given stream over time for a potential range of reasons. As one example, virtualized packet stream 508 shows a different encryption being applied on every other packet. As another example, virtualized packet stream 510 shows no encryption being applied on a random packet, namely the third packet from the left. In still other embodiments, multiple encryption schemes are applied on a single packet. The application of one of more encryption algorithms, pattern-based bit/byte swapping, encoding, or other data altering/conservation techniques to a given packet is referred to generally as an "encryption approach." In addition to controlling encryption based on remote destination, the present disclosure enables altering encryption based on other options such as the protocol or application involved in a given communication session. For example, as shown in FIG. 6, disparate encryption approaches are applied to different communication streams by protocol such as email 600, FTP 602, or web 604 and/or by application such as chat 606 or cloud-based applications 608.

Figure 7:
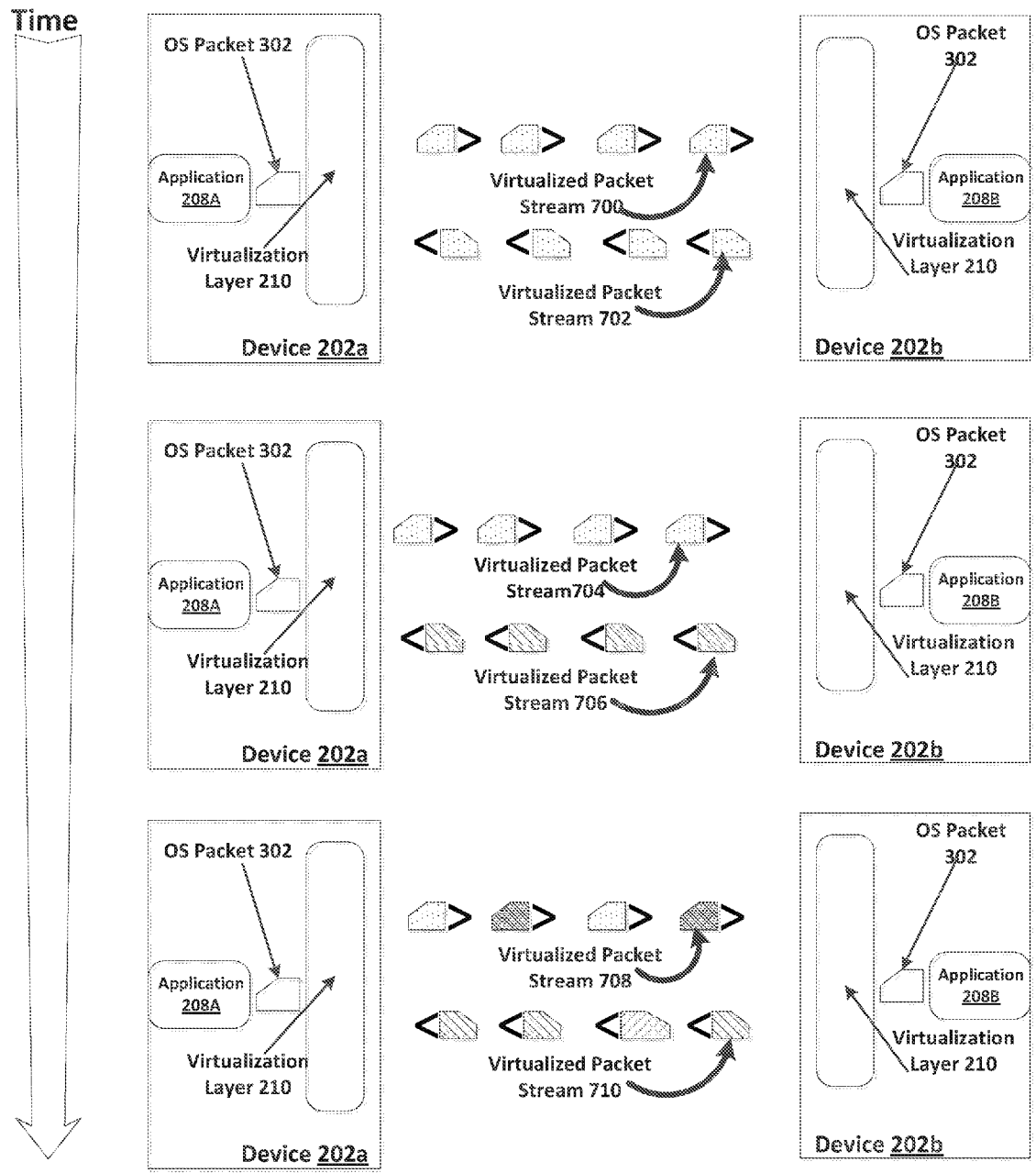

Embedded rules, a configuration file, or more complex options such as BPEL may be used to determine which packets to apply which encryption approach. This capability provides for additional embodiments to support complex encryption management requirements for securing communications. While some embodiments utilize the same encryption regardless of duration, other embodiments alter the encryption approach over time, for example as time progresses in the downward direction as shown in FIG. 7. The process of changing encryption approaches over time, or in response to changes in other factors or variables, is referred as an "encryption modulation."

Some embodiments statically include such modulations as part of embedded code or a configuration file, whereas other embodiments utilize a concept referred herein as a connector pattern. Connector patterns are constructed of modulation charts, which are combinations of modulation packages, each of which contain a series of modulation sequences. These embodiments are described more fully below, beginning with a modulation sequence.

A modulation sequence is an instruction or command that tells the virtualization layer 210 to perform a given encryption approach on a packet. Packets are selected based on any characteristic of that packet or, in the case of no applied filter, the encryption approach is applied to all packets. A modulation sequence may include, as part of its encryption approach, a single operation to be applied to a matching packet or a series of operations joined together using a logical join operator such as Next, Or, And, or other operators common in process flow approaches. These operators enable primitive process flow applications at the packet level to provide optional additional levels of operations for more advanced requirements such as cloning and nested encryption.

A modulation package is a series of modulation sequences sufficient to cover all applicable packets for a given device 202. A modulation package may vary from one embodiment to the next, but could be required, for example, to provide at least one modulation sequence for every type of packet passing through a device 202; in some instances, a catchall modulation sequence may be used to ensure such compliance. Certain embodiments allow for modulation sequence overlap, such that a given packet might be processed more than once (i.e., be subject to multiple modulation sequences). In these instances, the order of modulation sequence processing can be determined in a variety of manners, such as newest/oldest modulation first, a manually entered priority number, based on type of operation, and so forth. Dynamic components such as time of day, device type, device location, and the like may be applied to turn on or off the availability of certain modulation sequences within a modulation package as well as to change priorities of those modulation sequences. This latter set of instructions may be stored as metadata with the modulation sequences within the logical modulation chart construct. Other embodiments prevent overlapping modulation sequences, but may still utilize dynamic data to determine the availability of specific sequences.

A modulation chart is a logical level above the modulation package. The modulation chart contains a variable number of modulation packages along with a connector pattern, which is explained in further detail below. Some embodiments include a series of modulation charts and rely on virtualization layer 210 processing to determine which chart to utilize. In these embodiments, determination logic may be included as embedded code in the virtualization layer 210, as separate instructions sent to the virtualization layer 210, as a configuration file, or some other similar data input. In all of these cases, the determination code may be static, such that the determination of a given modulation sequence or use of modulation packages can be fixed; in other embodiments, the determination code may utilize dynamic information. In the static instances, variability may still be introduced based on placement of the modulation packages within the modulation chart. As one example, a static determination code may generally state that the virtualization layer 210 should use the modulation package in position 1, then the modulation package in position 2, and so forth. The process of creating the modulation chart could therefore distribute, either randomly or according to some set of rules, the modulation packages into various logical positions for different iterations of the modulation chart.

Figure 8:
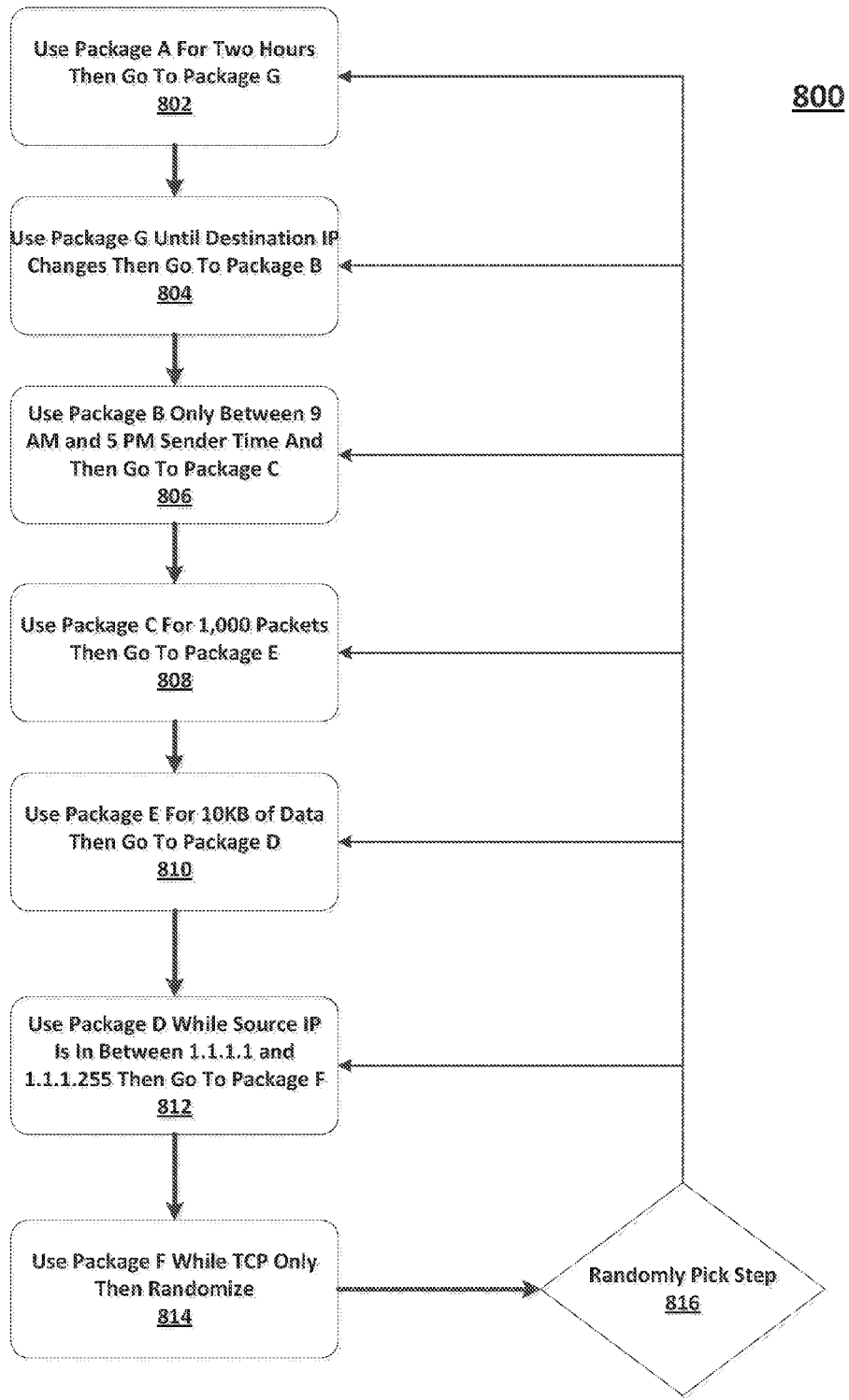
Figure 9:
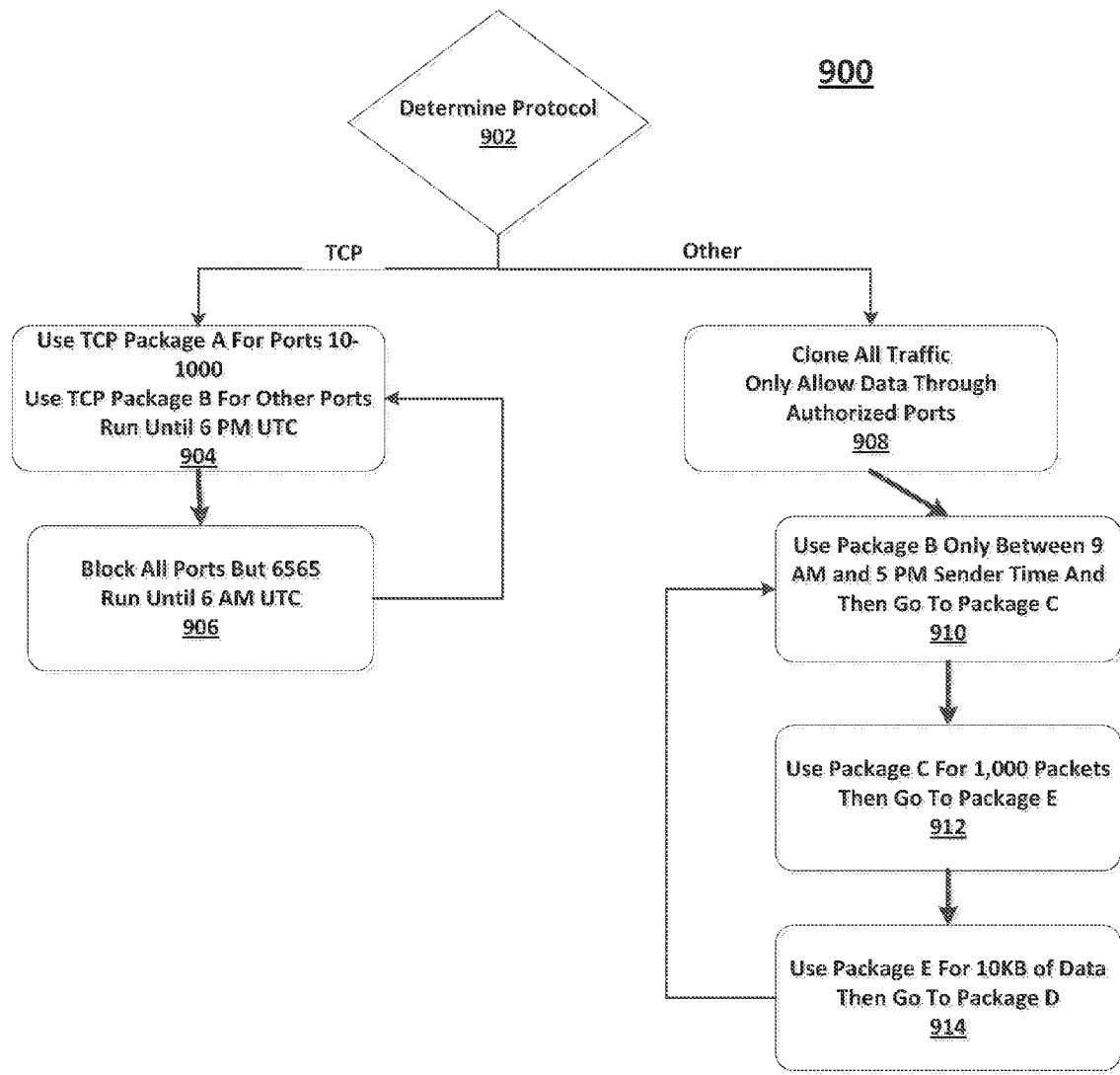

In other embodiments, a connector pattern is created in which the order of transitioning from one modulation package to another is determined ahead of time. FIG. 8 demonstrates one such conceptual example of a connector pattern. In this example, options such as duration (block 802), source/destination IP addresses (blocks 804, 812), time (block 806), amount of data (blocks 808, 810), and protocol (block 814) are used to determine when to switch from one modulation package to another. While the variety of factors in FIG. 8 is demonstrative, it should not be interpreted on a limitation on the scope of the present disclosure. That is, these options are a sample of a larger set of characteristics that may be used to create a connector pattern. In this example, the modulation packages are referred to in a generic sense (e.g., Package A, B, C . . . ). However, FIG. 9 shows another connector pattern in which a determination (block 902) separates packets by protocol, after which different modulation packages are applied to these packets. The modulation packages may be built based on protocol, with some communications control components added. The concept of communications control will be explained further below.

Connector patterns can be generated manually, for example by using prebuilt software and/or business rules, or through a larger system output such as machine learning. In the latter case, a big data analytical system may be setup to model data and predict possibilities such as network saturation, vulnerability times, and usability windows. A usability window, as one possible example, may be defined as a time during the workday when administrators need direct access to a backend data store through their client side tools. A learning system receives packets from the target backend data store over time to determine this window dynamically and to alert users when an outlier access attempt is created. In this hypothetical example, such tools may require certain ports to be opened for a small range of protocols. Outside of that usability window, the ports can be closed. Additional data inputs such as past successful intrusions, user behavior, and network load can be input to enhance the predictive model until a point where the model is capable of generating connector patterns that leverage the strength of a given network and reduce an increasing level of exploitable weaknesses. This latter feature again enforces the strength of a distributed deep packet inspection firewall approach.

A modulation chart can therefore contain a range of specific modulation packages and an optional connector pattern. This information is optionally stored and transmitted to devices 202 throughout a given network 214. This information can be conveyed to devices 202 as a library, an embeddable module such as a COM+ component, a loosely coupled precompiled component such as a DLL, as a new client application or other similar option. In some embodiments, the conceptual steps outlined in FIG. 8 are reduced to XML-like first level instructions 1002 as shown in FIG. 10. It should be appreciated that the instructions 1002 (and 1004 discussed below) demonstrated in FIG. 10 are conceptual and such a concept may be implemented in myriad ways. These instructions generally reduce the conceptual design into interpretable instructions based on localized resources. In these embodiments, the virtualization layer 210 translates semantic items such as Time, DestIP and Geo into local methods/subroutines and/or programs and passes in the rest of the instructions in turn. The local virtualization layer 210 also has access to modulation packages A through G.

Further embodiments may utilize an interpreted modulation language to further reduce semantic level instructions 1002 into more actionable interpreted modulation language instructions 1004. For example, as shown in FIG. 10, the semantic level instruction 1002 is broken down into a packet characteristic, or characteristics depending on the filtering complexity/embodiment, a match type, the encryption approach to apply, and the location of any input values required. For sake of explanation, the filtering criteria, match type, approach, and seed values in this example are all singular. It should be noted that each of these can be optionally expanded to contain more options as needed. For example, the first capture line in this example instructs the virtualization layer 210 to match on any packet where the IP level CRC value is even. This filter could be expanded to include such options as protocol, sending application, and/or destination IP address. Match values can be statically included as provided in the first capture line or the match can include a dynamic value as provided in the last capture line, which conceptually states that the TCP CRC value modulus the value found at the location identified by the pointer &PointerQ needs to equal 0.

The next part of the capture line determines the encryption approach to be applied to the captured packet. The actual approaches may be hard-coded into software, part of an initialization configuration file, or be pulled dynamically through a static pointer. More than one approach may be applied, which could be applied in the order included—for example, right to left or left to right. Finally an optional series of either statically-included values, pointers to dynamic values, or a characteristic of the packet can be included for the algorithms as needed. Note that the last capture line can result in the application of multiple operations to the same packet. In this case, the IP CRC match occurs first and the TCP CRC match occurs second for outgoing packets, whereas the opposite is true for incoming packets, along with the reverse application of an encryption approach (e.g. decryption rather than encryption) applied for matched packets. In cases where values such as CRC or packet size are utilized, the original CRC, TTL, packet size, or other alterable values, may be included in an optional virtualization header 122 to enable subsequent decryption.

The interpreted modulation language instructions may be partially compiled in a central location and then transmitted to a device 202, depending on the embodiment, or completely compiled prior to any transmission. In the case of partial compilation transmission, the ability to complete the full translation may rely in part on code embedded in the virtualization layer 210 on the device 202, physical characteristics of the device 202, and/or decryption of subsequently transmitted data. In one embodiment, a partially completed modulation chart is encrypted in one manner using a specific user device public key, signed with a central/network private key, and then transmitted to that device 202. In this instance, a separate set of data sufficient to complete the modulation chart may be encrypted using a standard algorithm along with the current IP address of the device 202 and sent to that device 202. The device 202 may then use the network public key to verify the authenticity of the incoming data and then use its IP address and private key to decrypt the data prior to finishing the compilation of the modulation chart.

Figure 11:
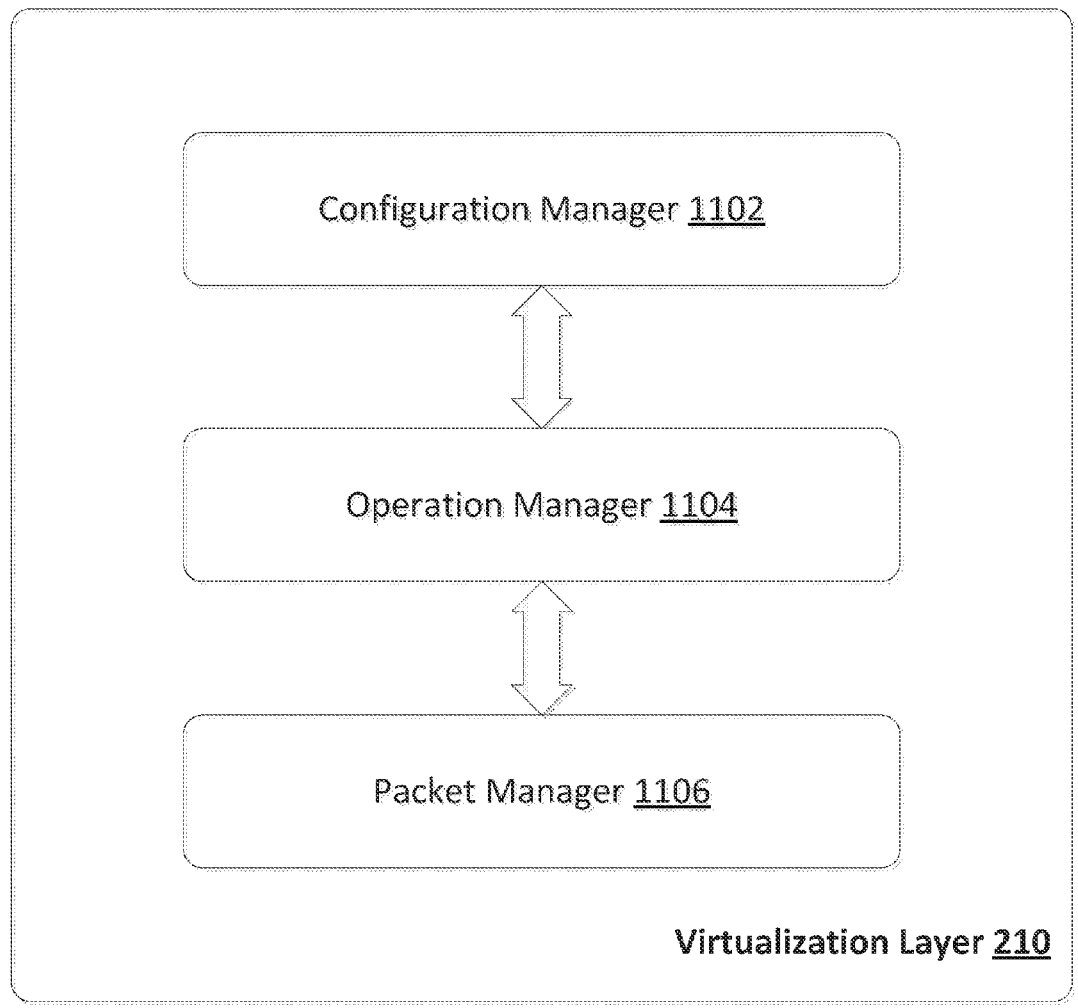
FIGS. 11-15 show exemplary block diagrams of a virtualization layer in accordance with various embodiments.

By using modulation charts that are sent separately to all devices 202 ahead of time, devices can engage in long-running communications that modulate encryption over time. These modulations provide enhanced security relative to a static, non-changing encryption system. To better understand the implementation of modulation charts in virtualization layer 210, FIG. 11 shows an embodiment of virtualization layer 210 in further detail. The virtualization layer 210 includes a configuration manager 1102, an operation manager 1104, and a packet manager 1106. These managers represent logical constructs and thus may or may not be implemented discretely. Some embodiments may combine all or some of these constructs together, whereas others might re-organize the functional areas. All such embodiments are within the scope of the present disclosure, and these managers are delimited as such for explanatory purposes.

The packet manager 1106 is generally responsible for capturing packets of data as those packets leave the last layer within the operating system known space 206 on their way the physical layer 212. The operation manager 1104 is responsible for applying a given encryption approach onto a given captured packet according to one of the various embodiments described in this disclosure. The configuration manager 1102 is responsible for setting up any variable data such as encryption keys, modulation charts, and so forth. These subsystems can be organized in a variety of ways including in kernel mode only, in user mode only, or across user and kernel modes.

Kernel mode is generally defined as a part of an operating system 204 where enhanced access to a kernel is provided. Some operating systems 204 do not provide a strict partition, but rather utilize another method for restricting access such as security, authorized access, or even special types of internal protocols. Thus, the concept of kernel mode is used to describe the concept of enhanced kernel access as opposed to restricted kernel access. The region, logical or not, of an operating system 204 where access to the kernel is restricted is generally referred to as user mode. Again, different operating systems 204 delineate parts of their system in different ways. User mode is used to describe a logical or physical part of an operating system 204 where access to the kernel is more controlled and/or restricted relative to another region of the operating system 204 (i.e., the kernel mode).

Figure 12:
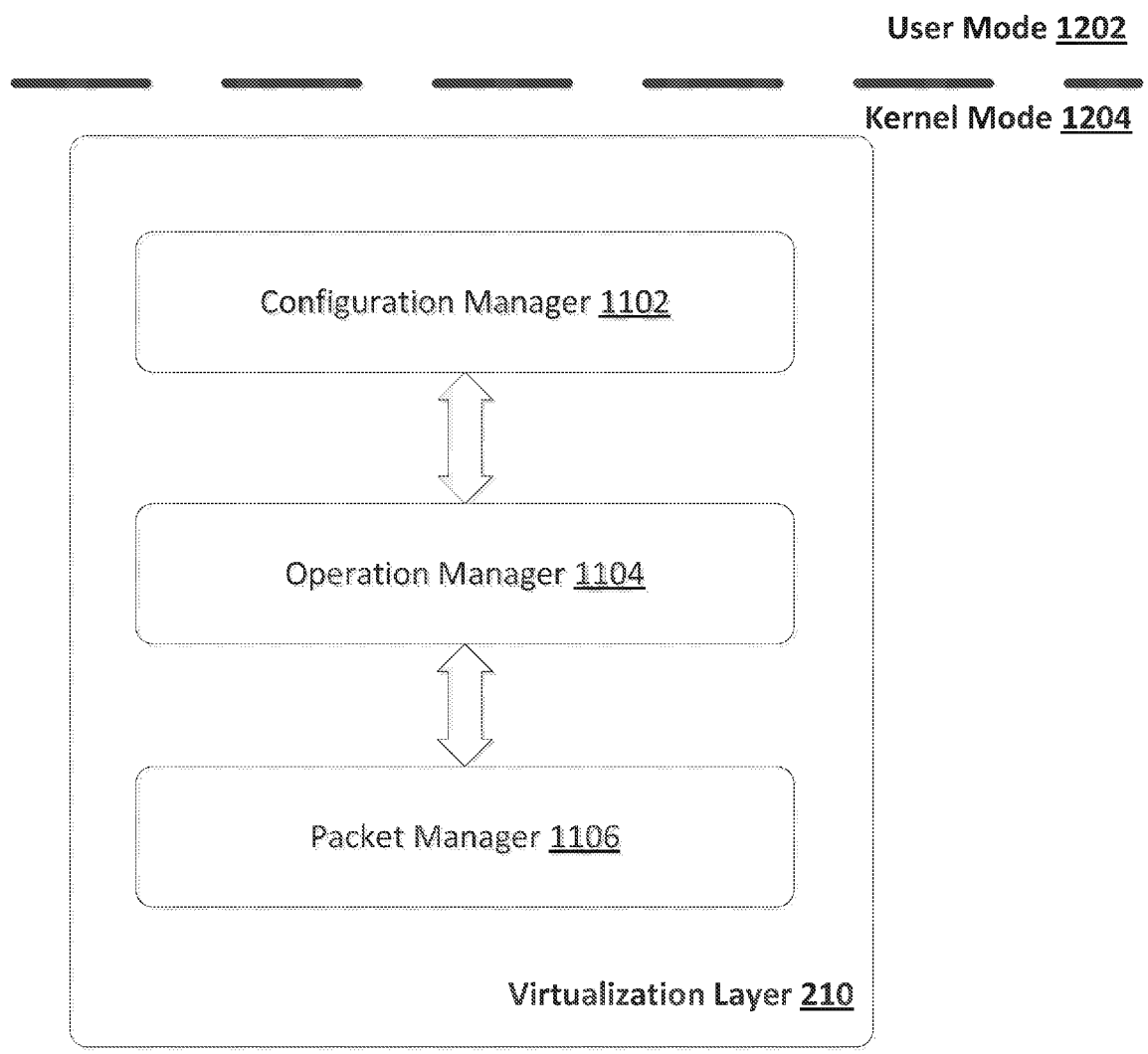

In general, processes running in kernel mode have less access to other resources such as memory, I/O, and so forth compared to processes running in user mode. User mode processes tend to interact with the kernel at a slower pace and often have a lower processor priority, which may result in slower processing times. In some embodiments, the entire virtualization layer 210 may reside in kernel mode to optimize speed. One such embodiment is shown in FIG. 12. Here, the virtualization layer 210 resides completely in kernel mode 1204. The packet manager 1106 intercepts outbound data packets and passes those packets to the operation manager 1104, which performs an operation as described above based on values defined by the configuration manager 1102. Once the operation or operations are complete, the operation manager 1104 passes the packets back to the packet manager 1106, which optionally places the packets on the same communication line for transport to the physical layer 212. One of the limitations imposed by many operating systems 204 on processes residing in kernel mode 1204 is limited access to resources such as memory, which often forces configuration information to be defined during process initiation. As a result, embodiments in which the virtualization layer 210 resides completely in kernel mode 1204 may collapse the configuration manager 1102 into the operation manager 1104 and not allow for continuously updated configuration information. Upon launch of the virtualization layer 210, in other embodiments, options such as the applied encryption algorithm, dynamic values such as SALT, and any required key-value pairs are read and may be, for example, contained in locations accessible through static pointers. One enhancement to this base example comprises a two-driver system in which one driver is responsible for executing the packet manager 1106 and the other driver is responsible for executing both the operation 1104 and configuration 1102 managers.

Figure 13:
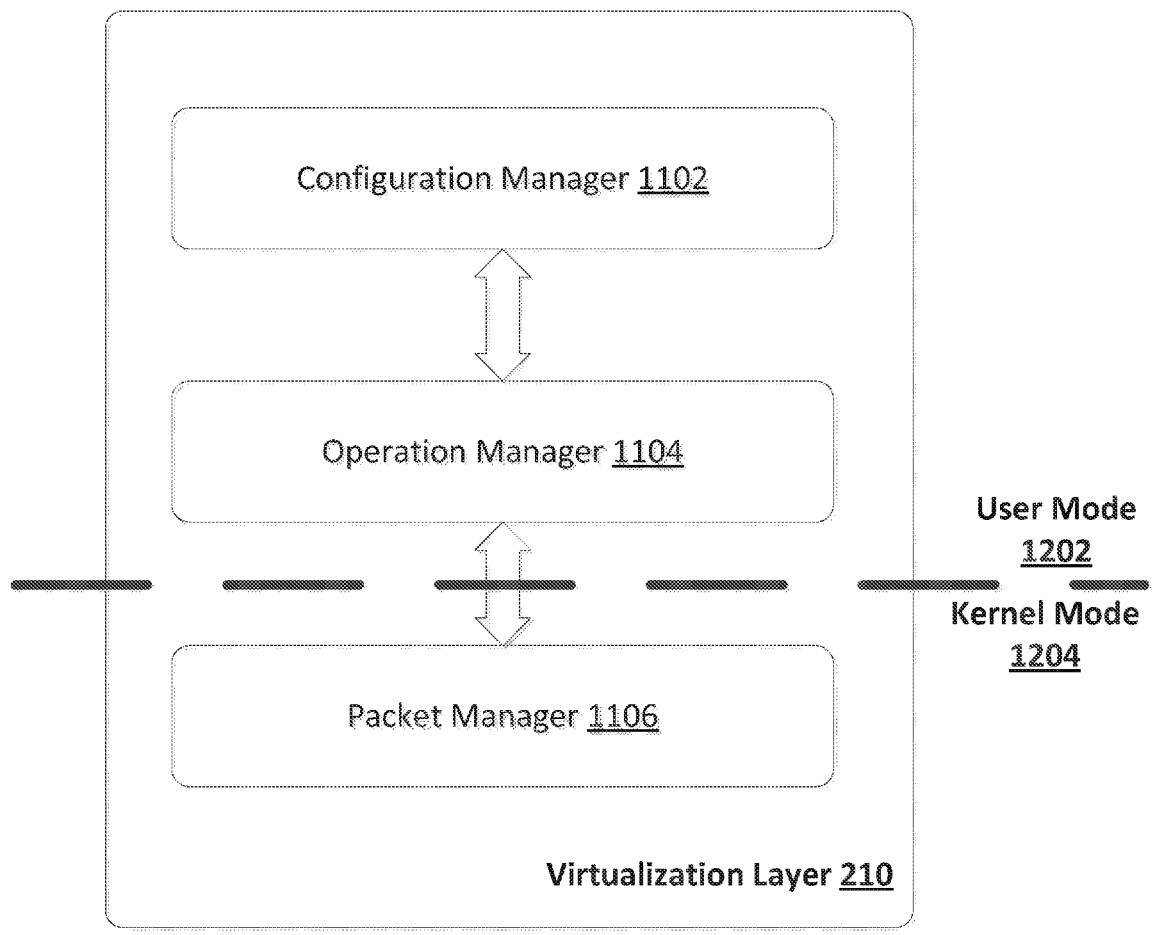

FIG. 13 demonstrates an embodiment that leverages a more robust set of resources available in user mode 1202. In FIG. 13, both the operation 1104 and configuration 1102 managers reside in the user mode 1202, leaving only the packet manager 1106 in kernel mode 1204. The packet manager 1106 typically remains in kernel mode 1204 due to restrictions on packet access at the level required for implementation of the above-described functionality of the virtualization layer 210. However, in alternate embodiments where the virtualization layer 210 is implemented as a separate process outside of the operating system 204, such restrictions are not applicable. In those cases, the virtualization layer 210 may maintain the various described manager constructs, but no restrictions exist due to the functional distinctions between user mode 1202 and kernel mode 1204. Further, in such cases, resources are defined during a process such as the BIOS pre-boot process and are typically based on overall device 202 resource limitations.

Referring to the specific embodiment of FIG. 13, the operation manager 1104 retains a significantly larger amount of resources, including the ability to retain stateful information about virtualized packets 120 when compared to kernel mode-only embodiments. It should be noted that kernel mode-only embodiments may also maintain stateful information, as some operating systems 204 do provide sufficient resources. However, it is a challenge in many operating systems 204, particularly those on mobile platforms, to obtain sufficient access to memory in kernel mode 1204. Thus, embodiments placing the operation manager 1104 in user mode 1202 are able to store virtualized packets 120 for a variable duration. As one example, a given embodiment may store a sent virtualized packet 120 for a duration equal to the time to live value found in the header of that packet 120. By storing these packets, the operation manager 1104 can respond to retransmission requests from a remote device 202 without having to first send a request back to the operating system 204. This is particularly useful in cases where dropped packets are common, for example in mobile or microwave communications.

The operation manager 1104 can also store dynamically generated values such as encryption keys, computed seed values, and similar data for optimized encryption processing by the virtualization layer 210. Although an encryption key could be computed for each packet, it is more efficient to compute a key once and then reuse that key for the duration of the encryption approach. Similarly, a seed value may be a static value or it may be computed by an algorithm such as a time series, location-based, or other such approach. Even in the case of a time series algorithm, storing a computed key or seed value for milliseconds can result in performance improvements through enhanced efficiency. Longer lasting values may also be stored, such as the location of various encryption libraries, session keys to support different communication efforts, time sync values between two devices 202, and so forth. Running the operation manager 1104 in user mode enables a manner in which to store this information.

By locating the configuration manager 1102 in user mode 1202, configuration information can be dynamically updated in a much wider range of ways. For example, some embodiments may utilize configuration files, whereas other embodiments read remote locations, obtain push updates, or use some combination thereof. As one example, a configuration manager 1102 makes a remote service call to retrieve all or part of the configuration information that it needs, including such items as modulation charts, key generating algorithms, seed values, and other dynamic information. This data is sent to the configuration manager 1102 as part of an authentication process, or an administrative channel may push updates through according to a range of criteria from time intervals to attack responses. In all of these cases, placing the configuration manager 1102 in user mode enables a wider range of possibilities and interactions, including interactions with a logged in user, when compared to running the configuration manager 1102 in kernel mode 1204.

In many operating systems 204 the movement of a packet of data from kernel mode 1204 to user mode 1202 results the generation of a copy of the packet. Many operating systems 204 retain the original copy while the copied packet is in user mode 1202. Thus, moving a packet between kernel mode 1204 and user mode 1202 can result in numerous copies of the packet being maintained for some amount of time. Heavy system loads exacerbate the impact of such issues that result from internally cloning the packet. Depending on the embodiment, the device 202 resources, and system allowances, these performance impacts may not be tolerable.

Figure 14:
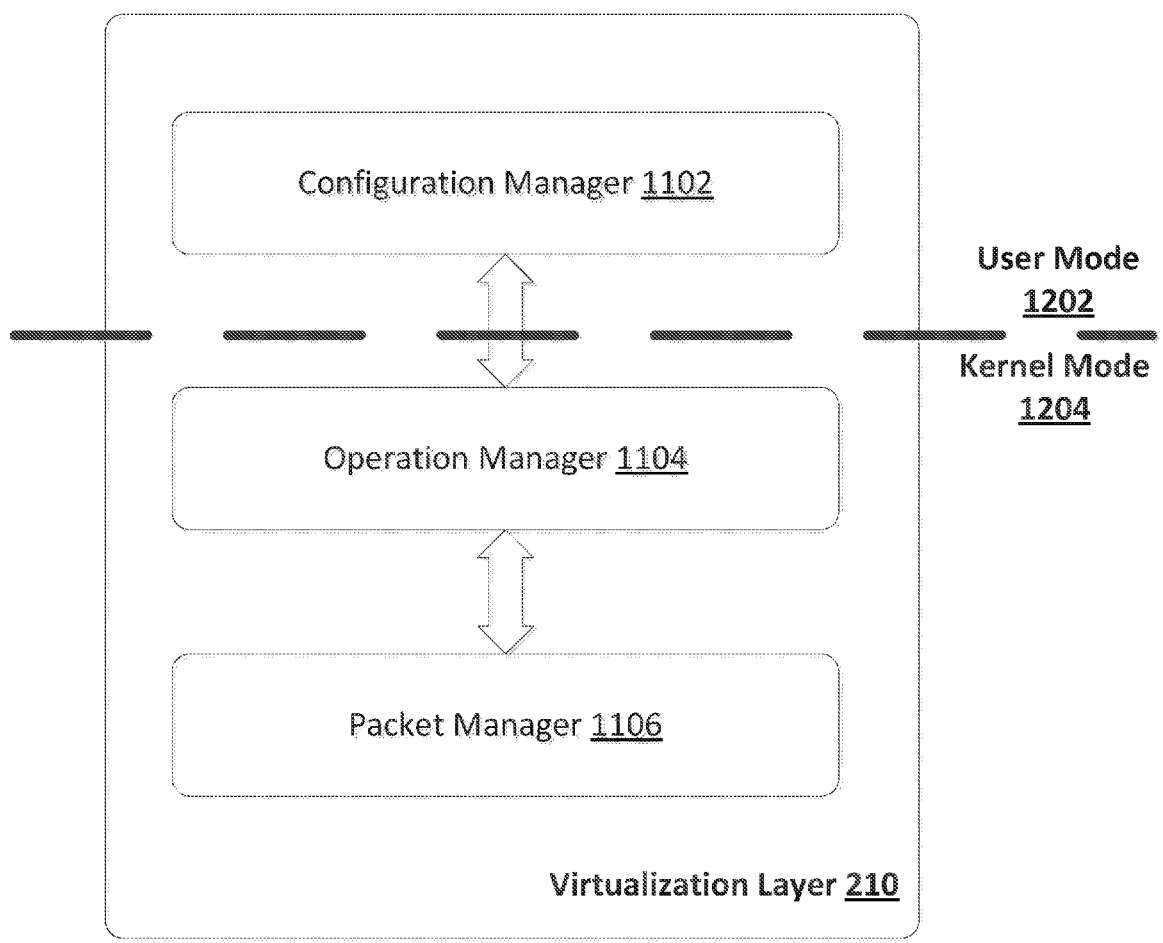
Figure 15:
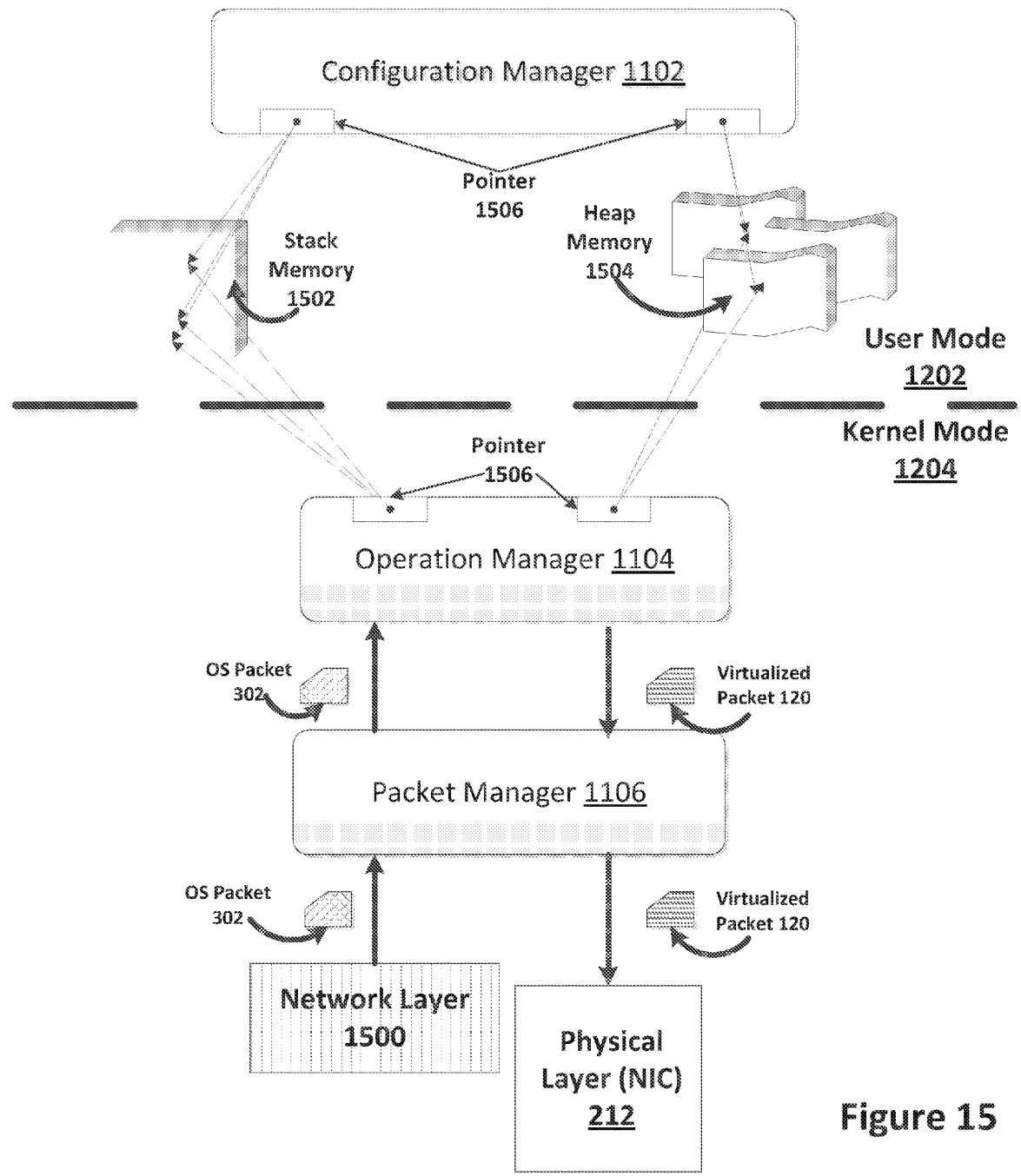

For higher-demand embodiments, or in the cases of more restricted devices 202, such as mobile device, the operation 1104 and packet 1106 managers are placed in kernel mode 1204 while the configuration manager 1102 is in user mode 1202 as shown in FIGS. 14 and 15. These embodiments have the benefit of improved speed of kernel mode 1204 processing without the configuration limitations of the solely kernel mode 1204 implementation. In order to access configuration information, the packet manager 1106 could utilize a static pointer 1506, a mapped memory file, or utilize a protocol such as named pipes to obtain data stored in user mode 1202 amongst other similar options.

FIG. 15 demonstrates one such embodiment, in which the operation manager 1104 and the configuration manager 1102 access shared locations in stack 1502 and/or heap 1504 memory. Each manager 1102, 1104 accesses these locations using a pointer 1506, which will be a static pointer for the operation manager 1104, but may or may not be static for the configuration manager 1102. In some embodiments, the operation manager 1104 establishes static pointer locations in the heap 1504 and/or stack 1502 that the configuration manager 1102 scans and finds upon either its initiation or during processing. Leveraging shared memory locations allows the configuration manager 1102 to utilize a range of simple values or complex objects, while permitting those objects to be statically read by the operation manager 1104. Thus, as one example, interpreted modulation language instructions can be further reduced to a series of if-then loop instructions that are written to a shared location in memory 1502, 1504 by the configuration manager 1102 based on a new modulation chart. The operation manager 1104 can then compare an incoming OS packet 302 to the current filtering statements and match statically on an updated series of statements. This technique enables fluctuations over time in encryption approaches even while maintaining static kernel mode 1204 processing.

As described previously, an encryption approach is a process or method where a given type of encryption is applied to a packet. FIG. 10 provided one conceptualization of how an approach might be implemented. It is important to note that these instructions can include an algorithm and, as described, moving algorithms to different positions can alter the overall application of approaches or operations even when the modulation sequences are hard coded in a given embodiment. Approaches using encryption are not restricted to just performing encryption and can include other operations in conjunction with encryption such as packet pointer security, communication wrapping, and so forth.

The above approach is algorithm-agnostic, since various encryption algorithms may be easily interchanged, and thus gives rise to an open encryption platform concept where any encryption algorithm can be used without requiring higher-level direct knowledge of that algorithm. To accomplish this, various embodiments of the present disclosure support a common interface across algorithms. This interface is one to which all algorithms are written, which is the case for example with class factory adaptations. Alternatively, the open encryption platform could be encapsulated in a common wrapper that still supports a class factory approach, but more similar to a distributed library technique such as those found in dynamic link libraries. In all such cases, the use of static pointers, large object constructs such as arrays, and other such input options provides a layer of abstraction at the interface level.

Figure 16:
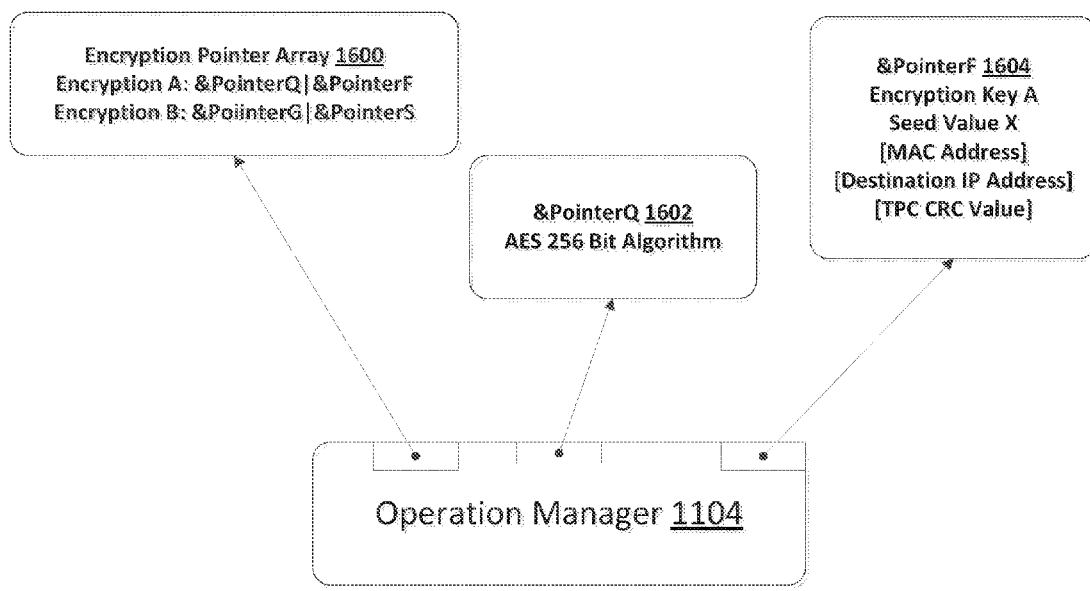
FIG. 16 shows a block diagram of an operation manager in accordance with various embodiments.

As one example, FIG. 16 shows a given embodiment that utilizes a static memory pointer to obtain an array of instructions for the algorithms to be used. FIG. 16 is provided for sake of explanation, but should not be interpreted as providing a limitation on the scope of the open encryption platform disclosed herein. In FIG. 16, the operation manager 1104 reads an encryption pointer array 1600 to obtain a list of available encryption options. In this case, each option has a pipe-delimited list of other pointers that point to a target encryption algorithm object location as well as to a text array to be passed into each encryption object. This simplified interface therefore takes in one generic text array with a variable number of entries. In the case of the first encryption option, Encryption A, the algorithm object is an AES 256 Bit Algorithm into which the text array found at the location designated by the pointer &PointerF 1604 is used. Within the text array retrieved from that location, for the purposes of this example, square brackets denote dynamic data that the operation manager 1104 needs to replace prior to passing that information into the algorithm found at the location designated by the pointer &PointerQ. In this case, the dynamic values are media access control (MAC) address of the device 202 as well as the destination IP address and TPC-level CRC of the individual packet.

Certain embodiments may load the encryption pointer array 1600 at startup, while others load might load the array 1600 on demand, while still others might load the array 1600 on startup and then periodically check that array 1600 for updates. Similarly, the referenced algorithms can be loaded and/or updated at different times in various embodiments. These techniques allow for an algorithm-agnostic approach that enables a dynamic open encryption platform. The open encryption platform can be thought of as supporting "pluggable encryption." That is, as long as a given encryption option meets the interface requirements for a given embodiment, that encryption option can be added to the platform at any time without requiring major revisions to the overall virtualization layer 210.

To protect against exploits such as cold boot or RAM or similar, attacks, certain embodiments of the present disclosure might require all encryption options to be signed using a known certificate or key. Other embodiments might, instead, require that the encryption objects or code be sent in an encrypted format to the device 202 and then decrypted and instantiated/compiled at runtime on the device 202. In these latter cases, the encryption may utilize a device 202 public key that can only be decrypted on the local device 202. This key may be a general key for the device 202 or the key might be a key generated just to transfer one or more encryption options to the device 202. In a similar manner, other embodiments may require all data referenced through a pointer to be encrypted prior to being stored in memory. In these cases, the configuration manager 1102 can be used to carry out these encryption requirements. The encryption utilized might be one of the options made available to the operation manager 1104, with optional different input values, or a distinct encryption option might be used for either or both the encryption options and the other stack 1502 values or heap 1504 objects.

As noted above, another important aspect of a comprehensive communications security solution is the ability to control communications between devices. Unlike prior efforts such as IPsec, which only encrypt data between devices, the present disclosure also extends into authenticating and authorizing communications between devices 202 before any communications can even occur.

Figure 17:
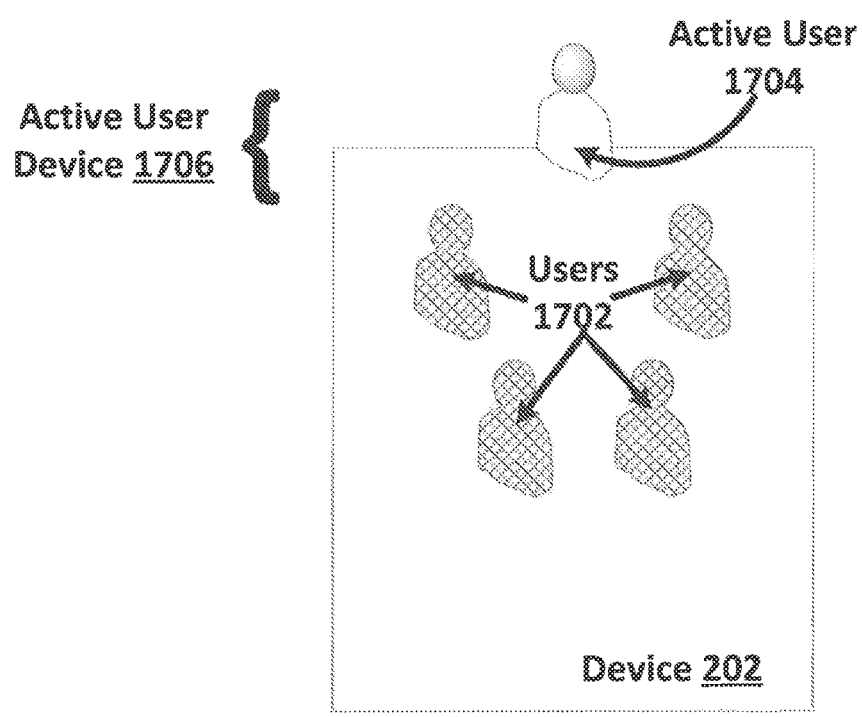
FIGS. 17-19 show exemplary user devices in accordance with various embodiments.
Figure 18:
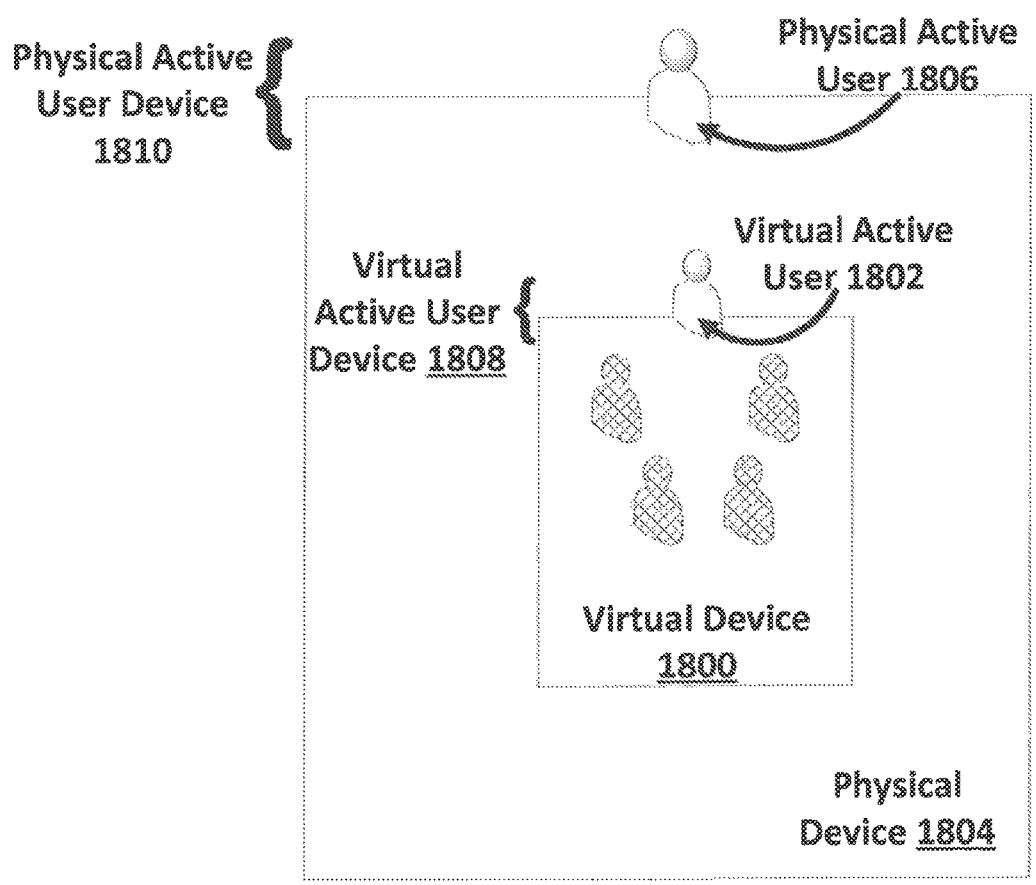

A central concept to the disclosed communications control embodiments is that of an active user device, which is at times also referred to as a user device. Turning to FIG. 17, a device 202 can have a variable number of users 1702 with access to that device 202 at any given time. In fact, especially in the case of backend services and processes, there can be a variable number of active users 1702 on a single device 202 at any period of time. However, for a specific communication stream, there can only ever be one active user 1704 on a given device 202. This single active user 1704 for a specific device 202 communication stream is referred to as an active user device 1706. A device 202 in this case can be a physical device 1804 or a virtual device 1800 as shown in FIG. 18. This gives rise to virtual active user devices 1802 and physical active user devices 1810 which may or may not interact depending on the embodiment.

As will be discussed, utilizing a variable first-class membership authentication system enables handling these virtual active user devices 1808 in a novel manner By elevating applications to a first class member status, rules can be applied to virtual and non-virtual users and combinations therein by applying a different set of rules to different applications. Thus a virtual machine, which is typically an application running on a device 202, can be assigned a range of authorization rules. As one example, a general rule might be conceptually "no Internet access". Thus a virtual administrator running in the virtual machine—with complete access to that machine—would not be able to access the Internet due to the general application control list. Another, more interesting, rule might be a downgrade rule for an example such as classified documents. Within this example, the application—suppose this time the application is a VPN—might state that all users are restricted to a maximum of security clearance based on use of a particular application such as a VPN client. Thus a person with top secret clearance, using a desktop device with unrestricted access, utilizes a VPN to bypass a local network and can only obtain normal secret documents.

As yet another example, assume the virtual active user device 1808 is granted super user access on a virtual device 1800 and the physical active user device 1810 is granted basic user access on the physical device 1804. For purposes of communication, there might exist a general application policy preventing any off device access for virtual devices, which precludes the need to combine active user device definitions together, or there might be a policy that treats virtual users the same as physical users. Other embodiments might simply assume the physical active user device 1810 rights for all processes hosted within, which again precludes the need for combining rights. Other embodiments may combine rights where the resultant active user device is a logical combination that creates a virtual physical active user device 1808 and 1810. All of these options are possible, both across different embodiments and within a given embodiment, as different types of active user devices 1808, 1810 might require different approaches. To this latter point, working in a sandbox or isolated environment may permit more lax rules whereas working in a sensitive production area or highly-connected public environment might require a more stringent set of communication rules.

Figure 19:
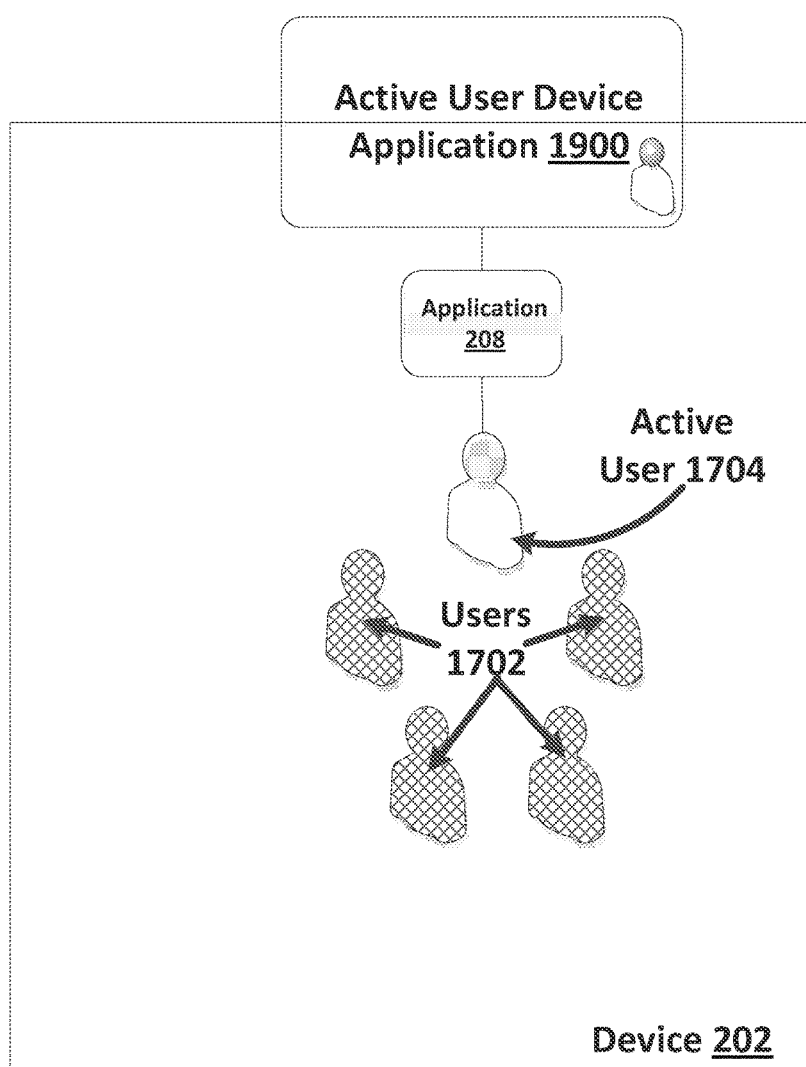

Turning to FIG. 19, there are typically two participants within a given device 202 for a specific communication—an active user 1704 and an application 208. The present disclosure also relates to the concept of an active user device application 1900, which further extends communications control to the application level. As has been discussed, this provides for a deeper level of control. However, for the sake of clarity the following largely focuses on the active user device level.

Most modern LDAP systems utilize a single first class member and then assign characteristics, otherwise referred to at times as metadata, attributes, tags, or some other similar term, to that first class member. For example, many modern LDAP systems provide users as a first class member and then assign a tag such as group membership to each user. Resource access rights are typically assigned to the tags, which provide a group-based security system. Other LDAP systems use devices as the first class member. The use of a single first class member creates security weaknesses, which are addressed by embodiments of the present disclosure.

As one example, assume an executive who accesses sensitive corporate documents from both a central, secure office building and also remotely from that executive's mobile device. When the executive accesses information from the central office, that active user device should likely have a different set of access rights than the active user device that stems from the executive's access from a remote location. Further, it may be desired to provide the executive with one set of rights when accessing the corporate network from a "friendly" location (e.g., where cyber-attacks are less likely) as opposed to an "unfriendly" location (e.g., where cyber-attacks are more likely) in the world. That is, geographic constraints may also influence the permissions afforded to a particular active user device. However, by only utilizing a single first class member, the authentication capabilities in modern LDAP systems are unable to assign such differential rights based on the interaction of a user and device much less by location.

In accordance with various embodiments, the implementation of active user devices 1706 provides an improved two-member authentication system where both users and devices are elevated to first class members. This approach enables a new type of interaction, the active user device 1706 rights, which can be directly utilized or managed through indirect interactions. Rights can be assigned to devices based on device group membership and users based on user group membership and then rules can be created to control combinations of those memberships. As one example, a rule for executives might be that only executives can read any document on the corporate secrets server. In this example, mobile devices might have a rule stating that they can only read documents up to general secret protection. Thus an executive on a mobile device might get a resultant rule stating that they can read any document on the private secrets server that has been marked as general secret or lower. Rules for collisions, similar to the rules used for group membership collisions in modern LDAP systems, can also be used to control user and device interactions. Examples of such rules are user wins, device wins, hierarchical determination, and so forth. Other interaction management options will be apparent from the disclosure herein.

By providing an active user device 1706 paradigm, options such as device location can be included as additional attributes either directly to the active user device 1706 construct, to a user, or to a device. This enables further refinement within the active user device to provide a differential set of access rights depending on dynamic information such as, for example, geographic location. All of these concepts, while discussed with respect to resource access up to this point, can be similarly applied directly to communications.

This concept of location-based authorization for active user devices 1706 can be further extended in some embodiments to include the concept of geographic intelligence. In this manner, a type of device might be provided with a set of restrictions based on changes in location. As one example, a desktop computer might not be allowed to travel more than 100 miles in an hour but a mobile device might not have this restriction. These restrictions introduce another communications access rights paradigm discussed more fully in the next section. In response to violating a location-based rule, a device 202 might be forced to re-authenticate, the virtualization layer 210 might be uninstalled or the entire user device 1706 communication capabilities blocked or redirected until a properly authenticated user unlocks the user device 202. This latter communications control might be contained within the one offending user device 1706 or, depending on the embodiment, all user devices 1706 for that device 202 or that user 1702 can be affected. Movement is not the only type of location-based rule as, for another example, there might be rules based on multiple logins by the same user 1702 or device 202 from different locations. These latter rules might range from not allowing multiple locations to allowing multiple locations within some defined distance variable on device type and so forth.

Communications access rights also provide the ability to restrict initial communications in a variety of ways. At the device level, types of devices (e.g., desktop, laptop, mobile, manufacturer, or operating system) can be directly managed. As one example, all mobile devices might be required to only use certain ports or be restricted from certain subnets within a network. Users might also be directly managed in terms of communication, for example all accounting personnel cannot initiate communications with IT personnel, or only an executive can initiate communications with an employee. Rights can also be applied on the receiving end; for example, billing personnel cannot accept any communications outside of a given protocol. Communications can be restricted or locked down by any characteristic of a communications effort including such options as network used, protocol, application, data type, time of day, duration, and amount of data. These options provide support for complex communications control options that may extend far beyond what is available in the prior art. As another example, consider a background service that obtains updates from a central server every day at 1 AM. As shown conceptually in FIG. 26, a communications control list 2600 entry for that service might only allow that service to provide any off device communications at 1 AM, only allow one request to be sent out, and only allow one response in, up to a finite amount of data over a specific protocol from a finite number of allowable active user devices. "Off device communications" can refer to data sent outside the physical boundaries of a device as opposed to internal device communications, which are typically communications within device boundaries, such as applications communicating across application domains or a given application requesting, for example, I/O access.

Some embodiments include communication characteristics such as protocol, network type, throughput, network hops and so forth, as additional attributes added to users and/or devices, where other embodiments create yet another first class member. This latter feature reveals the potential of a variable first class membership authentication scheme. In this latter set of embodiments, the communication control features are appended directly onto groups of communication types and those types may be defined by any characteristic of a communication effort. Thus given groups may be defined communication control characteristics, further including options such as port numbers, geographic locations, internal vs. external, subnets and so forth. Control can then be applied by other options such as type of data, amount of data, duration and time of day amongst other features. This first class member can then be combined with users and devices to enable a rich series of interactions that fully lock down communication access to whatever degree is required by a given network or enterprise. As one example, a first class insecure communication member might have a general restriction of not allowing any level of secret data. This first class member might be defined by broadband networking protocols. In this case, an executive authorized to access regular secret and general information on a laptop would lose access to secret information when the laptop transitions from a local wireless home network to the broadband connection from the café next door.

Returning to the use of applications as a first class member, there are a number of reasons for extending control down to this level. First, an administrator can group applications together using any semantic category, which are used throughout modern LDAP and would be an option for any first class member in that respect. As one example of semantic categorization, an administrator might create application groups such as personal, background, employee work, employee social and so forth. Administrators, and/or any appropriately authorized user, can generate a semantic definition as required and even overlap definitions for different enforcement reasons. Traditional definitions by business unit or corporate hierarchy might be used as well as trusted vs. untrusted people, number of years of employment, certifications obtained, behavioral testing results, and so forth. Each of these application groups can then be controlled in any manner desired in order to not only control the communication lines and protocols allowed by an application, but also with which other applications a given application can communicate or other application resources a given application can access. For example, a web browser might be designated in a high risk group with no access to employee resources on a computer or that group might not be allowed to save information if the total amount to be saved exceeds a certain size. Both of these restrictions aid in countering potential malware attacks from being downloaded and/or accessing data.

As will be discussed in more detail, prior authorization schemes rely on the first class member authentication in order to determine authorization rules. These rules or configuration settings are most commonly referred to as Access Control Lists or ACLs. Since these systems only support one first class member, they are unable to provide interactions required for more detailed authorization requirements. As one possible example, a given file system might preferentially enable access to parts of its file system based on a user's security clearance. While an administrator might want to further define restrictions based on the device being used, in the current authorization implementations, this is not a possibility. In the variable first class membership authorization system described herein, the interaction of a distinct device first class member resolves this issue. Extending the current example, an administrator might enable full access to desktop devices but only allow non-secret access to mobile devices. Thus a person with top secret access would end up having differential access to a file system based on device type.

Taking this concept one step further, another first class member option can be communications, which can include both internal and external communications. Another first class member could be applications. In this case, the file system of the prior example could also go??? higher than normal secret access when communicating using a wireless protocol and applications defined as social could be blocked altogether. These final two options also provide a way to block malware attacks. In this example, the top secret person could access top secret data from a desktop computer unless that desktop used a wireless connection. While that person is working on files on the file system, they could also be running a web browser, which is defined as a social application. That application, running malware in an active scripting exploit, could then attempt to obtain files from the file system in question; however, those attempts would be blocked because a social application is not permitted access to the file system.

Various embodiments of the present disclosure also provide the ability to monitor through existing techniques such as DTrace in order to maintain other rulesets. In this regard, one of the main challenges facing prior security is a weakness known as active scripting. Active scripting allows small programs to run within the context of a web browser in order to support more advanced user interactions. However, these nested applications often require resource access outside of domain of a standard application. Since there are no communications control options in prior LDAP systems, there is no way to lock down active scripting sessions, creating a vulnerability that is a source of attacks. For purposes of the present disclosure, communications also include data flowing within a device between application boundaries. One such boundary is that between a given application, such as a web browser, to device options such as a processor, file system, or memory.

This control enables the lockdown of a web browser, for example, such that it is only able to download a finite amount of data in a controlled space. On the external communications side, that web browser can be locked down such that the external IP address locations available to be accessed are controlled and can be optionally further refined by protocol. Thus, a given web browser might be allowed to use the FTP protocol for a finite set of IP addresses representing internal FTP servers, only the HTTP protocol for all other IP addresses, and no communications for IP addresses representing a given country. Any binary responses coming into the web browser can be locked down, for example using an option such as Dtrace or the above-disclosed virtualization layer 210, such that the total amount of data allowed is fixed to be below a predetermined threshold.

Figure 20A:
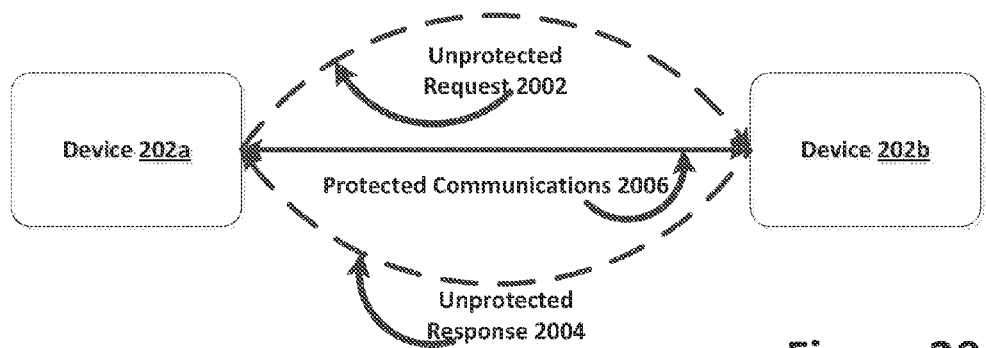
FIGS. 20*a* and 20*b* demonstrate in-band versus out-of-band session initiation in accordance with various embodiments.

In order to support a variable set of first class members, in accordance with various embodiments of the present disclosure, a new type of authentication system is provided. Whereas applications and communications already provide identification techniques, the process of authenticating users 1702 and devices 202 is more difficult. In fact, many of the challenges facing modern communication security relate to how to establish secure communications. The restriction in these cases is that two devices 202, having not previously communicated, cannot exchange secure communications until a secret is shared between them. This secret is used for encryption, which is how current encryption operates, and the secret needs to be received by both devices 202. FIG. 20*a* shows one approach, public key exchange (PKI), which attempts to resolve this issue. These approaches are generally considered to be inline session initiation protocols since the session initiation occurs in the same path as subsequent communications will occur through. However, inline initiation approaches have been a point of weakness and source of exploitation for a number of years.

Figure 20B:
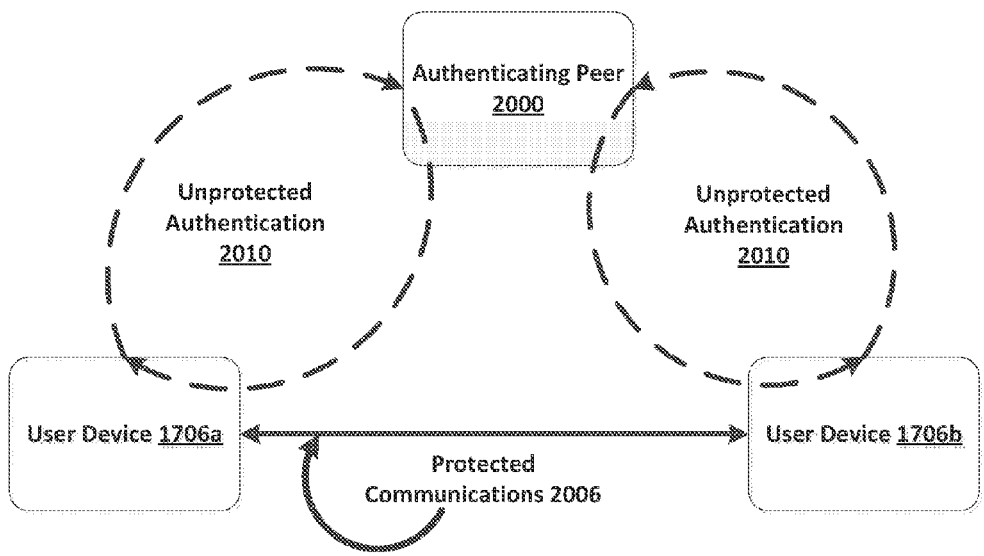

In accordance with various embodiments, FIG. 20*b* shows a system for out-of-band session initiation, which is an alternative to the inline initiation of FIG. 20*a*. The scope of the present disclosure should not be construed to be restricted to any particular architecture; rather, options such as client/server, peer-to-peer, mainframe, hybrid peer, and so forth are understood to be within the scope of this disclosure. While further disclosure may revolve around more traditional architectures, this is provided for the sake of clarity and brevity. For example, referring briefly to FIG. 23, the authenticating client 2300 could be a peer node within a peer-to-peer context that has access to an authentication client 2302. This access might be a static construct such as is found in traditional RADIUS/DIAMETER systems or it might be a dynamic construct based on a distributed mobile architecture and based on the active user device 1706 instead of static device placement. In this regard, the ability to authenticate both the device 202 and user 1702, as will be explained, that removes many of the issues facing traditional authentication systems and the relative inability to secure remote connections without significant delays.

A given active user device 1706 can, as one example, include a separately authenticated active user device application 1900 that can act as an authentication client 2300. Depending on the embodiment, the authentication client 2300 might be comprised of more than one device 202 as will be described in a subsequent section.

Referring back to FIG. 20b, out-of-band initiation requires authentication of two would-be endpoints 202a and 202b of a communications stream with an authenticating peer 2000. This authentication process can then be leveraged to send each authenticated user device 1706 a secret enabling secure communications. This out-of-band approach provides an enhancement over the prior art in that no unprotected data ever travels over the same lines that need to be protected (i.e., for subsequent communication between the user devices 1706), but unprotected authentication 2010 itself can still be utilized. In fact by utilizing the previously descried modulation charts, even first time requests can be protected between two user devices 1706 that have never communicated with each other before. The receiving user device 1706b, in these cases, would be able to use a modulation chart, an embedded static encryption approach, or some other previously presented option, to attempt to decrypt a first-time session initiation request. This concept is discussed in further detail below with respect to proactive network defenses.

Figure 21:
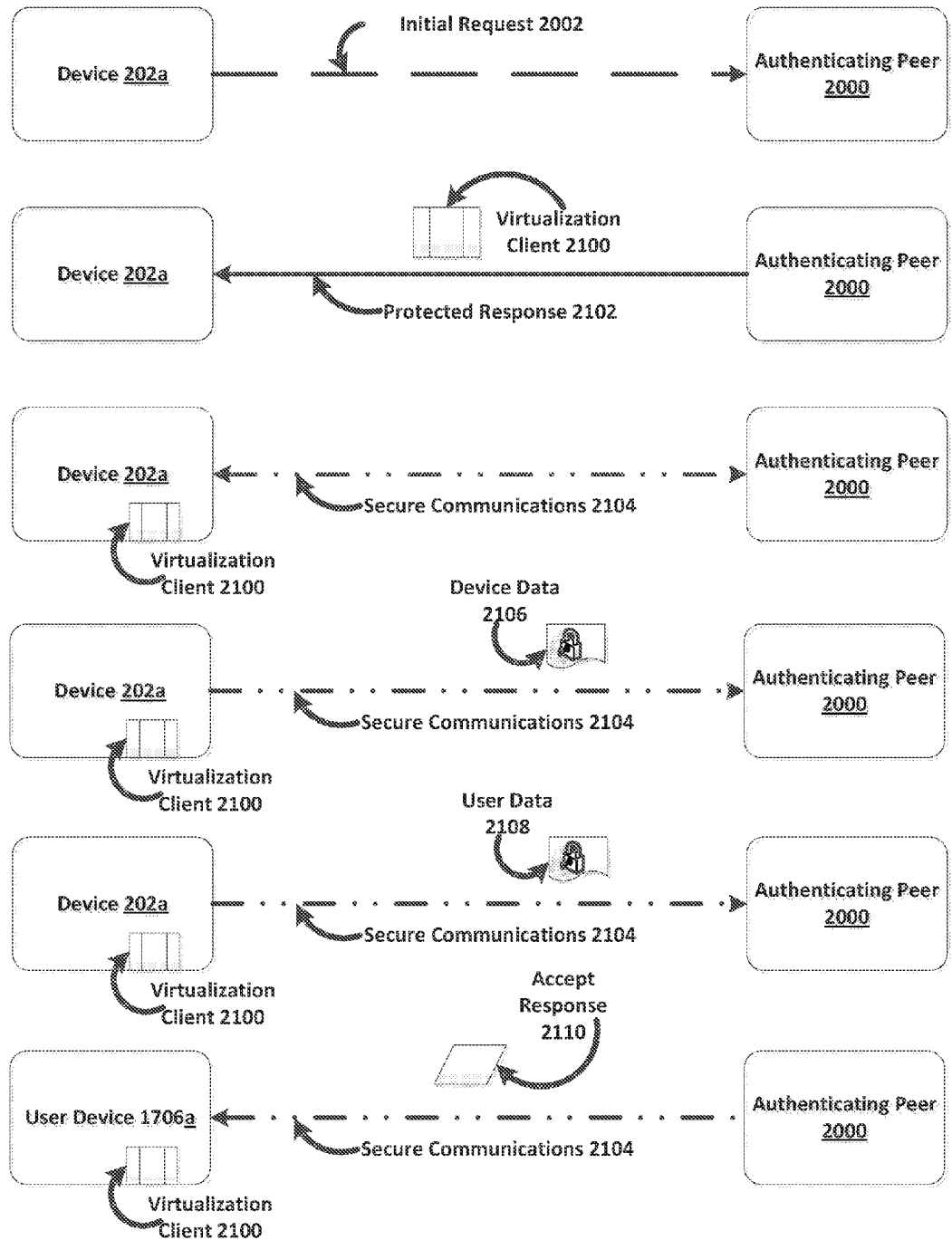
FIGS. 21-24 show various exemplary device authentication schemes in accordance with various embodiments.

FIG. 21 shows the exchange of information in an authentication system in accordance with various embodiments. In FIG. 21, a device 202a sends an initial request 2002 to an authenticating peer 2000. The authenticating peer 2000 provides a protected response 2102 using an option such as SSL or TLS or, in embodiments using modulation charts as previously presented, the virtualization layer 210 might provide this protection. This response 2102 is labeled as protected since SSL/TLS both use inline session initiation and the protection would be considered secure if the virtualization layer 210 was involved in the communication. Once the protected response 2102 has been established, the authentication peer 2000 transmits a virtualization client 2100 to the device 202a. This client 2100 may take the form of any type of code that can be run on the device 202a. This includes such options as a precompiled application, an installer that either includes all of its code or pulls data from a remote location, or a script/program that can run in a web browser. The purpose of this virtualization client 2100 is to either install the disclosed virtualization layer 210 on the device 202a or provide the intermediary user and device information sufficient to complete authentication. The presence of the virtualization layer 210 does not define a user device 1706 nor is its functionality required to define a user device 1706. Likewise a virtualization layer 210 can run on any device 202 and does not require a user device 1706 on which to function.

A virtualization layer 210 can operate in a functional manner without any authentication or authorization and does not require such systems and processes as described herein. As one example, the virtualization layer 210 can run on devices 202 and encrypt all or a portion of the communications between those devices without any authentication. In this example, the authentication and authorization might take place in a standard LDAP system or through application-level processing. At the same time, the described authentication, authorization and accounting enhancements described herein need not incorporate a virtualization layer 210. While certain advantages may be realized by combining the disclosed virtualization layer with authentication and authorization processes, triple A Services may be supported by a range of options including applications 208 running in an operating system 204.

To this end, the present disclosure provides embodiments where the virtualization layer 210 is installed on the device 202a prior to authentication. These embodiments are exemplary and should not be considered as required. None of the functionality required for the disclosed authentication scheme requires the virtualization layer 210—although the virtualization layer may enhance speed by operating logically below the operating system and provides further security opportunities described in further detail below. That stated, some embodiments will not install the virtualization layer 210 until at least the device 202 or user 1702 have been authenticated and other embodiments will require full active user device 1706 authentication prior to installing the virtualization layer 210.

Further, the disclosure focuses on a single active user device 1706 authentication process and does not include cases where prior users 1702 have been authenticated on a device 202, nor does the disclosure distinguish between an end user authentication effort and a backend process or service authentication. In cases where the virtualization layer 210 already exists due to separate active user device 1706 authorization, the actual installation component might be an activation sequence for the current active user device 1706. Other embodiments might uninstall the virtualization layer 210 if authentication fails, or even each time a new authentication initiates (for end users only or varied by type of user 1702) for any user 1702 on a given device 202 and/or lock the current user 1702 out of the device/disable said service or process. Some active user device 1706 authentication processes will only enable one end user authentication per device 202 at any given time and handle pre-existing by preventing the current authentication or ending authentication for any current end user devices. Other embodiments might set a total number of active end user devices whereas others will either extend this limit to all active user devices 1706 or vary limits by active user device 1706 type. In these cases, deactivations might occur in a range of manners such as priority numbers, first in/last out/first in/first out, and so forth.

In some embodiments, the virtualization layer 210 includes information sufficient to establish secure communications and subsequent authentication can proceed. In other embodiments, however, the device 202a first needs to be authenticated itself. If the device 202a is to be authenticated, the virtualization layer obtains sufficient information from the device 202a to uniquely identify the device 202a. Again the virtualization layer 210 is not required at this juncture as these operations can be completed by any sufficiently authorized process such as pre-existing services, downloaded code, application or scripts and so forth. Such information may include the media access control (MAC) address, any or all IP addresses and BIOS/UEFI (unified extensible firmware interface) information. This information 2106 is sufficient to identify the current device 202a and, once protected and sent back to the authenticated peer 2000, the device 202a can be authenticated.

In order to protect the device data 2016 going back to the authenticating peer 2000, some embodiments may generate a private/public key pair and then sign the device data 2106 with the private key pair. Sending the signed content and the public key will ensure that the authenticating peer 2000 can ensure the data came from the device 202a, but it does not protect the data 2106 from being intercepted. Other embodiments might thus utilize a public key sent from the authenticating peer 2000 to the device 202a in order to encrypt the device data 2106 prior to transmission. This ensures that only the authenticating client 2000 can decrypt the content. Some embodiments encrypt the signing hash, device public key, and content; others only encrypt the content; and yet others will not use a device public key and only use the authenticating peer 2000 key. Each of these keys can be privately-computed, third party-generated from a certificate authority, or themselves be certificates.

Figure 22:
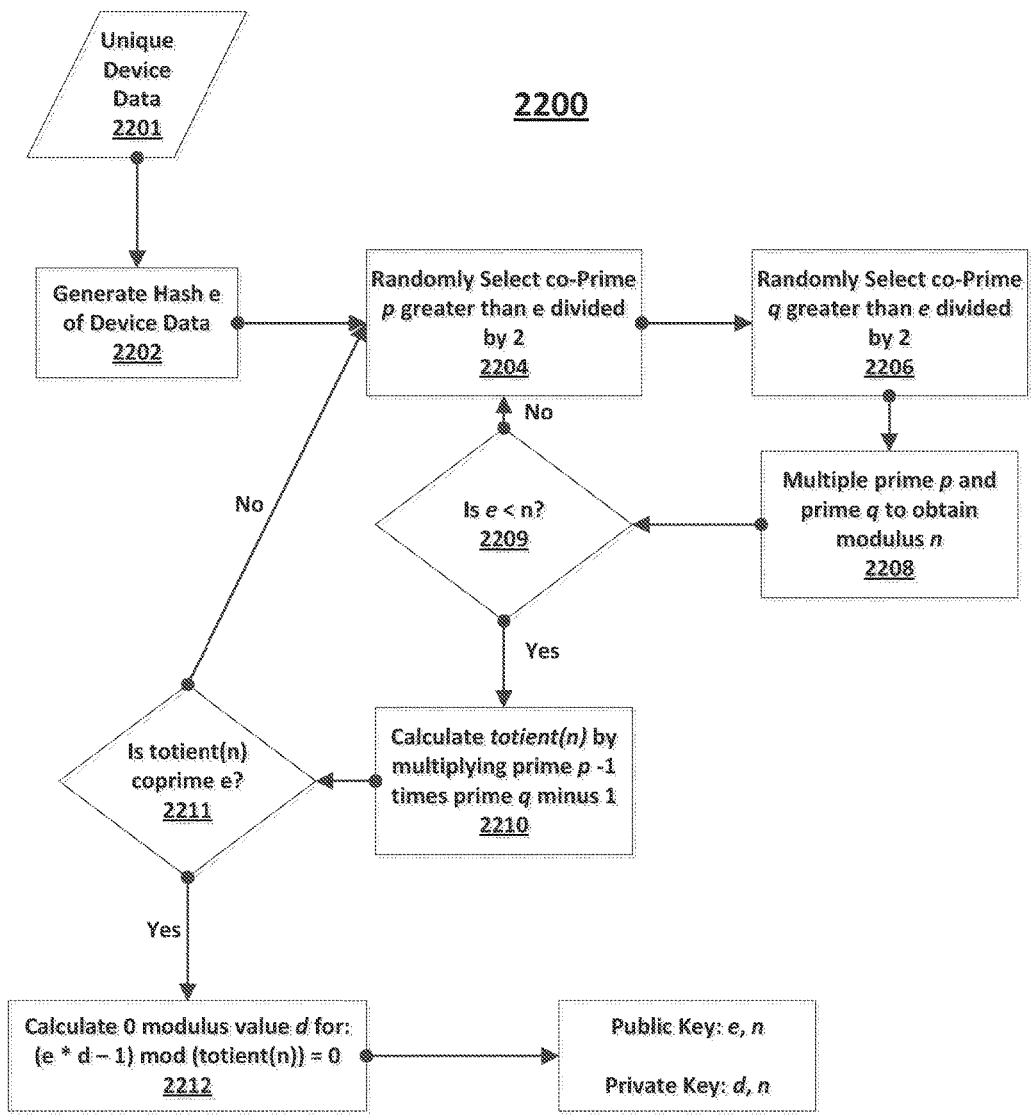

Further embodiments may require the ability to add in an additional layer of device 202 authentication by utilizing the exemplary process shown in FIG. 22. The main concept is to include as one of the values inputted into a key generation algorithm the values being utilized to uniquely identify a given device 202. In this manner the public key can be subsequently analyzed in order to verify device 202 authenticity. To understand this process more fully the following explanation of the key generation process is provided.

FIG. 22 shows a method 2200 in accordance with various embodiments. The method 2200 begins in block 2201 with receiving the various elements comprising the unique device data. The method 2200 continues in block 2202 where the unique device data elements are hashed using a hashing algorithm such as MD5, which results in a number, e. The method 2200 continues in blocks 2204 and 2206 with selecting co-primes p and q of e, respectively, that are each greater than half of e. The method 2200 then continues in block 2208 with multiplying p and q to obtain the modulus n, which needs to be greater than the original hash e as determined in block 2209. After ensuring this rule, the method 2200 continues in block 2210 with calculating the totient(n) by subtracting 1 from both prime values p and q, and multiplying those two results together. In block 2211, the method 2200 includes confirming whether the totient(n) and the original hash e are coprime. If the totient(n) and the original hash e are coprime, the method 2200 continues in block 2212 with calculating a 0 modulus value d for (e*d−1) mod (totient(n))=0, at which point a public and private key can be obtained in block 2214. The public key is then comprised of modulus n and e, which is the hash of the device data. This optional process therefore embeds that hash directly into the public key, thus ensuring that the public key came from that device. At any point in the future the device can be asked to re-generate the key pair in order to verify this hash.

It is noted that this is just one example to demonstrate the concept. Generating keys can also utilize SALT values and, indeed, alternative embodiments utilize this latter option in turn. Generally, a unique manner is provided in which a public private key can be generated with the public key being tied to physical attributes of the device 202*a* in some replicatable manner Other options include using the physical attributes of the device as a modifier parameter or even utilizing a closest prime approach, where the two closest primes to the hash value e are used. In this later case, the totient(n) value would always exhibit a correlative relationship with the modulus n, which is commonly included as part of a public key. Further embodiments might also include unique user 1702 identification information, as is commonly found in LDAP systems, to create a key attributable to a user device 1706.

Referring back to FIG. 21, the authenticating peer 2000 then obtains the device data 2106 from the device 202*a* which has been optionally signed with a device private key and encrypted using the authenticating peer's 2000 public key. Additional information such as the device 202*a* public key may also be sent depending on the embodiment. At this point the authenticating server 2000 is able to authenticate the device 202*a* and the device 202*a*. In fact, given that the virtualization client 2100 can also be signed to ensure unaltered delivery, this approach closes the security gap in first time authentication efforts. Once the virtualization layer 210 is installed, the secure features of virtualized communications described above can be implemented and this, in turn, provides yet another avenue for secure communications as will be discussed further with respect to FIG. 23.

Figure 23:
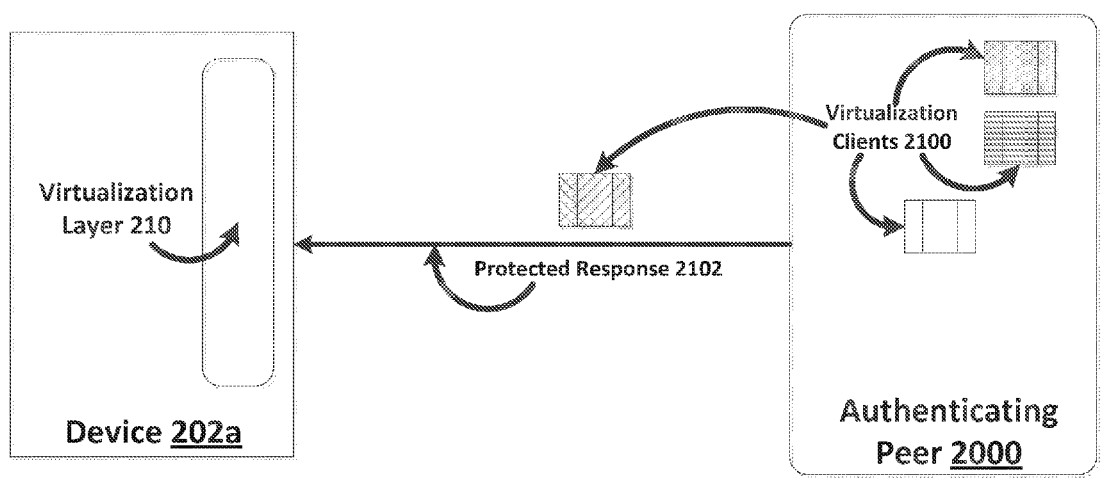

As will be discussed in a later section, communications can be secured using in-session keys. For the purposes of authentication, a newly activated virtualization layer 210 might obtain, or have embedded in it, a temporary session key. As shown in FIG. 23, an authenticating peer 2000 may store a variable number of virtualization clients 2100, each with its own unique session key. These keys might be embedded in the code, in a precompiled manner, included in a signed download as metadata, and sent as part of a longer communication data stream separate from the virtualization client 2100 itself. In some embodiments, these session keys might not be the actual session key but rather a unique identifier, such as a GUID, that is subsequently sent to the authenticating client 2000 in order to obtain a session key.

In all of these cases, the session key can then be used to establish virtualized communications upon the first response back from the device 202*a* when it transmits the unique device data 2200 to the authenticating client 2000. Some embodiments may allow the SSL/TLS connection to continue, while others may drop that connection altogether. Other embodiments further include a modulation chart, in a manner similar to the manner in which the session key is included, to provide additional flexibility. The modulation chart may also be provided in other manners. The modulation charts may wrap protocols and/or send communications out of nonobvious ports in an effort to better obscure communications. As one example, a common vulnerability in IPsec VPN implementations is the use of well-known ports. Since would-be intruders know ahead of time which ports to monitor, and because of current in-line initiation protocols, these intruders are able to sit and listen to certain ports and wait for an opportunity to infiltrate a given VPN connection. By utilizing other ports, a much greater effort is required to capture outgoing traffic. Even in environments where traffic flows over known ports, intruders also typically need to know the expected protocol in order to effect viable decryption operations. In embodiments of the present disclosure, where one protocol, such as HTTP, is nested inside another, such as SMTP, efforts required to obtain the base data become more difficult. This feature is discussed in further detail below. The use of this type of communications security approach does not obviate the encryption approaches provided for securing the device data. In fact, separate and distinct encryption beyond the communications encryption covered in the modulation charts/encryption approaches can be carried out for any data and even those options can be controlled using a modulation chart.

Once the virtualization layer 210 and the authenticating peer 2000 have exchanged device data 2200, the device can be authenticated. This authentication can occur through a range of options including complex lookups in logical data repositories, hashing and encryption techniques to reduce lookup complexities and so forth. Within this context, the authentication of a device is reduced to the general authentication processes for any first class member within this authentication system. In general terms, this process consists of utilizing uniquely identifying information of a first class member, either directly or through a remote system interface and the like to look for the presence of that first class member. If the member is found then that member's information can be retrieved and used in a variety of manners. Depending on the member and embodiments, that information might be used as part of a challenge response back to the user 1702 (challenges can be distinct as well from this information) or the data can be inspected to determine next authentication steps. If the member is not found then various rules based on any characteristic of the member can be implemented. As one example, a new mobile device might be allowed to be assigned to a user generically but needs to be dependent on a next authentication step. Conversely a known exploitation device might be rejected in turn prior to any further authentication efforts taking place.

Figure 24:
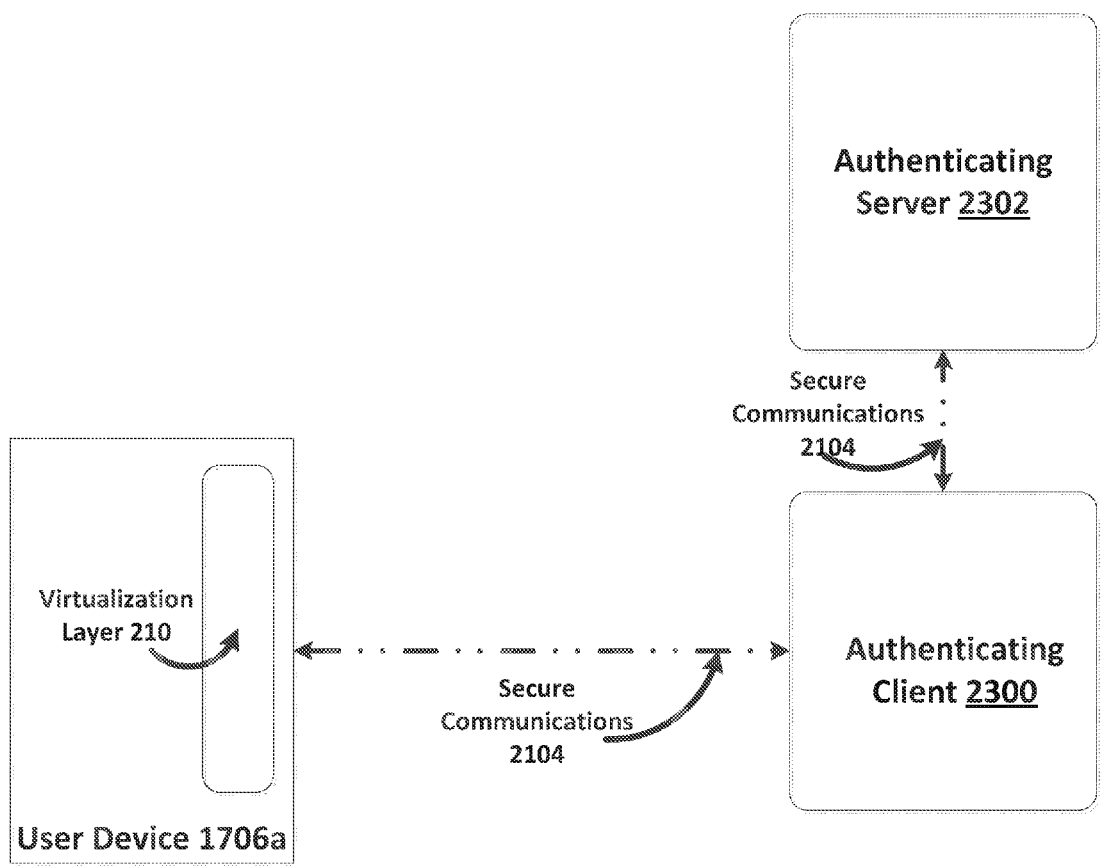

After device authentication is complete, the next step is to present to the user 1702 of the device the ability to provide user-level authentication information, which is detailed in FIGS. 21 and 24. In traditional RADIUS/DIAMETER terminology, an authenticating client 2300 is an endpoint on a network to which unknown users can make authentication requests. In these paradigms, an authenticating client 2300 queries the authenticating server 2302 and obtains a challenge from the authenticating server 2302, which is then passed to the device 202*a*. While the most common format of such a challenge is a username and password request, there are other options. Some systems rely on MAC addresses, some rely only on a password, where others require username, password and security questions. Some authenticating servers 2302 will utilize a range of challenge responses that may extend past the current device 202*a*. For example, many banks may require a second challenge be completed by texting a secret code to a user's mobile device. During this phase of authentication all of these options can be supported.

In order to support communications control, however, standard authentication is often insufficient because of a gap between where and with whom communications are occurring. Devices 202 are actually performing communications that support users 1702 who are typically exchanging data. By ignoring the device 202, differential communications options are not enable based on location and/or device characteristics. By failing to include users 1702, a given device can provide open access to all potential users on that device despite a need for isolated and/or varying levels of communications security.

While some embodiments require interaction with an authenticating server 2302 that handles communications control, others rely on a separate communications authentication step. This separate, but related, communications authentication step which might be subsumed in the authenticating server 2302 processing and may occur prior to user authentication. As one example, a given network might not allow any mobile devices and, once identified, a given device might be rejected before any user authentication can occur. In a situation where a user 1702 and/or device 202 fails authentication, the downloaded virtualization layer may be optionally disabled or automatically uninstall. In some embodiments, if a user device 1706 is active for more than a set amount of time without connecting to an identified network, the virtualization layer 210 might disable or uninstall itself. Once an accept response has been obtained from all systems responsible for authentication, the device 202*a* becomes a user device 1706*a* as shown in FIG. 21.

Figure 25:
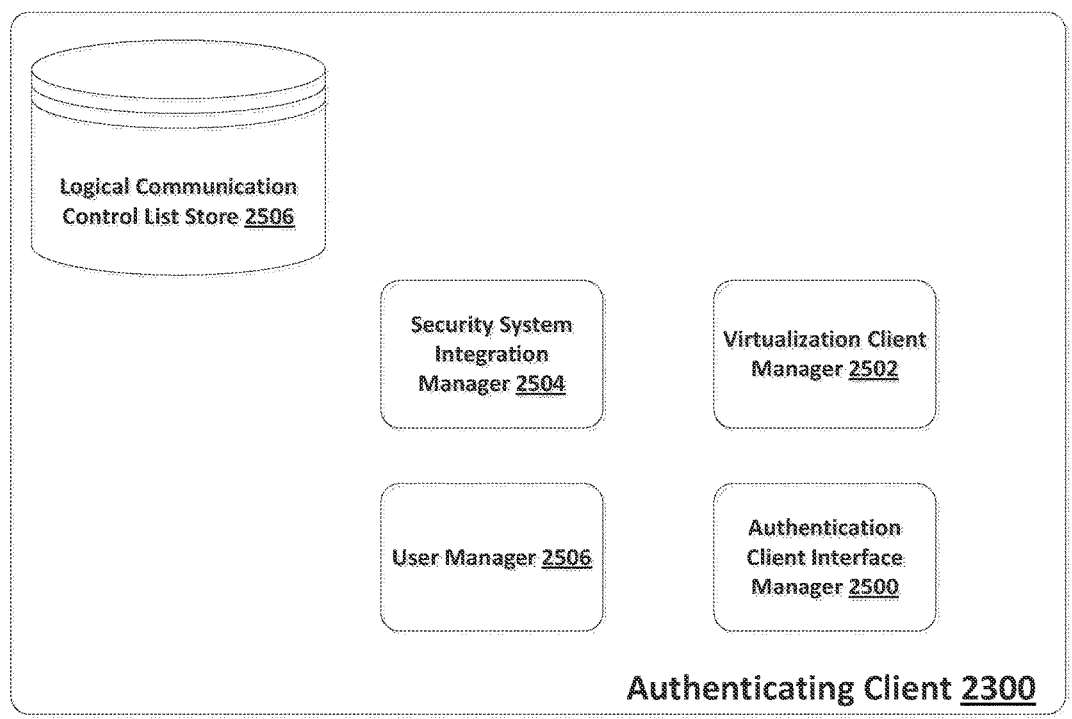
FIG. 25 shows a block diagram of an authentication client in accordance with various embodiments.

Referring now to FIG. 25, the authenticating client 2300 is an exemplary logical construct that can be implemented as one application on one device 202, as multiple services on one device, across numerous devices 202 as a variable set of services, and so forth. Additionally, the authenticating client 2300 may include a logical communication control list 2600 store 2506 (e.g., a SQL/NoSQL data store or as in memory cached set of values). An authentication client interface manager 2500 can handle user interactions, maintain state as needed and orchestrate the above-described authentication process as needed. A virtualization client manager 2502 may control the deployment and monitoring of virtualized clients 2100. The virtualized client manager 2502 may generate new virtualized clients 2100 in cases where the session key in embedded, or manage entries in a data store where sent GUID values result in subsequently transmitted session keys. The virtualized client manager 2502 may also load balance installer requests in cases where user demand overwhelms a single location or client 2300. A user manager 2506 can control the actual communications control list 2600 if one is sent separately for communications as shown in FIG. 26.

A communication control list 2600 can either be included as part of a general access control list or stored/managed separately. In those embodiments where the list 2600 is stored separately, it can be sent to the user device 1706 or it can be retained on the authenticating client 2100. In FIG. 26, an example is provided that shows how embodiments might separate initiation from responding based on device, protocols, times, and the like. General restrictions for an entire user device 1706 are not shown, although these may be either be stored locally or sent to the user device 1706. In cases where the control list 2600 is sent to the user device 1706, there is a speed advantage and a proactive (i.e. before the operating system is aware of an interaction) ability to stop unwanted communications. For embodiments that maintain these control options on the authenticating client 2300, a slower response time may result, but an increase in control access list 2600 security is present. In terms of security, in embodiments where the control list 2600 and/or the device control data is sent to the user device 1706, some embodiments will encrypt the content both in disk and in memory, while others will do one or the other, and yet others will provide no encryption and/or not store the list 2600 on the device.

The user manager 2502 also creates new user entries in either the logical communication control list store 2506 or through a security system integration manager 2504. In embodiments where the communication control list 2600 information is stored separately from the access control list data found in an LDAP system, the user manager 2502 creates entries, as needed, in the logical communications control list store 2506. The logical communications control list store 2506 may be a data repository existing in memory, on a disk, or some other storage variation. The store 2506 may be comprised of a local version and a remote version for distributed storage purposes. In other embodiments, a separate function or system handles all control list requests and processes create, read, update, and delete access control list 2600 requests based on a series of rules. These same types of rules may be included on a resident authenticating client 2300 and/or the user manager 2506, in the event that it is implemented as a separate process. Rules may include such things as total number of devices allowed per user, user type, or group. Other rules, applied at various levels, may include such things as type or types of devices allowed, location, operating systems, and even number of active devices per user.

Regardless of whether rules are stored in the main LDAP system or separately in the authenticating client 2300, these rules can be used to determine whether an authenticated device 202 belongs or can belong to a given user 1702. If a device 202 has already been registered to a different user, then the question of whether a given device 202 can be multi-tenanted can be addressed through attributes applied to either the device or a device group. User devices 1706 may have additional restrictions that enable or disable simultaneous active users 1704 on a given device 202. Such a rule, as one example, could lock down all communications by other active users on a device when a logged-in executive initiates a multimedia web conference. Thus these rules can be applied both to the authentication process of whether a given device 202 can be applied to a user 1704, the determination of behavior of the user device 1706, as well as the effect of that user device 1706 on other active users 1704. Other embodiments might act even further to isolate a given active user device 1706 for a range of reasons. As one example, a given active user device 1706 might attempt to initiate illicit communications and thus be identified as potentially hosting malware. In response, all other active user devices 1706 on the same network as the target active user device 1706 might either be logged off, prevented from communicating with the target active user device 1706, forced to use a separate subnet or distinct protocols, some combination of these options and so forth. Given the connected nature of user devices 1706 to authenticating clients 2300/peers 2000, the clients and peers might control this response. In other embodiments, a separate system such as an administrative channel might handle these responses or even embedded code, in response to different types of communications, might elicit this response both for the current device 202 as well as all other connected devices 202 or 1706.

The security system integration manager 2504 integrates access control information in embodiments where the access control data is not sent directly from the authenticating server 2302. Whereas typical access control protocols might base all authorization on responses from the authenticating server 2302 through the authenticating client 2300 to the user device 1706, communications authorization may not always be included in that path in certain embodiments. In these cases, the security system integration manager 2504 obtains the authentication and/or authorization responses from the authenticating server 2302 and uses that information to look up values for the active user 1704. These lookups may be based on the logical communication control list store 2506 or the queries might pull directly from the backend LDAP system. In these latter embodiments, the user manager 1704 may send CRUD requests for communication control list 2600 entries that the security system integration manager 2504 then processes. Processing may be performed within the authenticating client 2300, translated into backend LDAP requests, or some combination thereof.

At this point the device 202 has been authenticated, the user 1702 has been authenticated, and together they form the active user device 1706. This active user device 1706 has received from the authenticating client 2300 any local control lists required to operate and the user device 1706 is ready for subsequent communications with other active user devices 1706. The next step is to initiate a session. As a preliminary matter, it is noted that heartbeat processing may be utilized in some embodiments, which is described below.

For explanatory purposes, the present disclosure refers to three main types of data: device, dynamic, and security. Device data consists of all BIOS and other data sufficient to uniquely identify a given device. Device data may be, for example, the BIOS serial number and device MAC address. Newer devices typically use EFI (Extensible Firmware Interface) instead of BIOS; however "BIOS" terminology is used as an encapsulating term. One challenge with the BIOS serial number is that duplicate values can occur, for example blank or sequential (i.e. 123456) values, and those values might be filtered out or ignored to ensure device uniqueness. Any values not easily filtered may be appended together for that device 202 in certain embodiments. The device data may also contain the type of device (mobile, desktop, tablet) and operating system. Finally, in certain embodiments, the BIOS data can be separately hashed on both the authenticating client 2300 and device 202 sides using a device timestamp as SALT, the resulting value of which can be referred to as a BIOS hash.

Dynamic data includes any data that can be used to identify the location of a device. For mobile devices, this data may be GPS data in addition, or instead of, an IP address. While dynamic data is mainly used for location-based rules and for enforcing communication authorization rules, the dynamic data may be used for other purposes as well. One such other purpose is that the device timestamp may be used for synchronizing packet communications between two devices. In these embodiments, after a session has been initiated, a first user device 1706a might send to a second user device 1706b its current timestamp. The second user device 1706b can look at this timestamp, along with the time the packet left the first user device 1706a, and then match those values to its own timestamp. Then the second user device 1706b can store the difference in timestamp values and use that variance to synchronize timestamp values in the packet headers for the two devices. This process can either be repeated or done as an option of the first user device 1706a over the second user device 1706b. Synchronized timestamps may be required for many types of security approaches including, as one example, time-series algorithms which often work in the picosecond range.

It should be noted that where a process, data exchange, communication, and so forth are described with respect to a specific user device 1706, those processes could be similarly applied for all constructs on a given device 202, for a given user 1706, or some other first class authentication member. In this regard, the approach of using groups can be utilized to mitigate processing requirements. As one example, two devices 202 exchanging timestamps can share timestamp differential values across user devices 1706. Depending on the embodiment, user devices 1706 might also use the same modulation charts or different groups of users might share modulation approaches. As one example, all virtual machine application users (virtual users 1802), might utilize the same modulation charts applied, as a semantic definition, to all virtual machines.

Security data includes data related to the generation and exchange of keys between devices 202 and authenticating clients 2300. In some embodiments, a unique network-level key is obtained for use by all of its authenticating clients 2300. Other embodiments might obtain a distinct network key for each authenticating client 2300. These network keys comprise security data and might be ties to a certificate authority such as Verisign or Thawte and used to sign data flowing to the device 202.

In addition, each time an active user device 1706 reconnects to an authenticating client 2300, the device 202 or user device 1706 may generate a new public/private key combination and, in some further embodiments, a unique timestamp is used in that key generation. In these embodiments, the active user device 1706 generates a new picosecond-level timestamp that may be optionally encrypted with the network public key and sent along with the new device 202, or user device 1706, public key. Additional embodiments might further encrypt the entire message with the network public key to better secure transmission. It should be noted that, as opposed to time synchronization efforts, this timestamp could be completely artificial and, in fact, used for increased security. In embodiments where every device 202 in a given system is running a virtualization layer 210, the timestamp used in the headers of packets can be completely artificial and, in fact, be any date at all. The benefit of using this technique is that operating system layers, such as network or transport layer, cannot generate these types of artificial timestamps. This approach therefore ensures that a given packet was sent from a virtualization layer 210 and, further, it gives rise to timestamp modulation control using modulation chart techniques described previously. To this latter point, some embodiments might generate artificial timestamps based on device information, communication characteristics and so forth and utilize the timestamp as another type of packet verification and/or signature option.

Referring to data grouping, dynamic data requires a connection between an authenticating client 2300 and the active user device 1706. The specific authenticating client 2300 might vary as a device changes location, or due to network loads, but the connection is still required for these embodiments. In these cases, a finite amount of time can be defined by which a given active user device 1706 needs to have sent an authenticating client 2300 an update of its dynamic data. In some embodiments, a message may need to be received by the active user device 1706 from the authenticating client 2300 on a regular basis in order to remain authenticated. Other embodiments may require updates to be received from the active user device 1706 on the authenticating client 2300 at some interval or the device 202 will have to go through re-authentication. In this latter case, the virtualization layer 210 initiates the re-authentication process and begins where a session key with the authenticating client 2300 is required. Maintaining the dynamic data is needed by the device 202 for session initiation as described for certain embodiments.

Figure 27A:
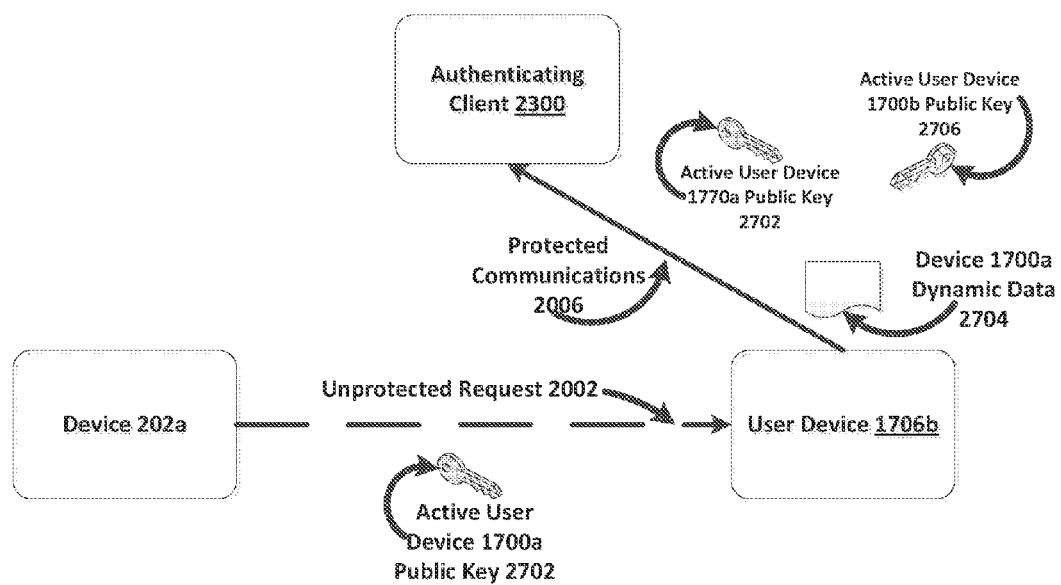
FIGS. 27*a* and 27*b* show examples of out-of-band session initiation in accordance with various embodiments.
Figure 27B:
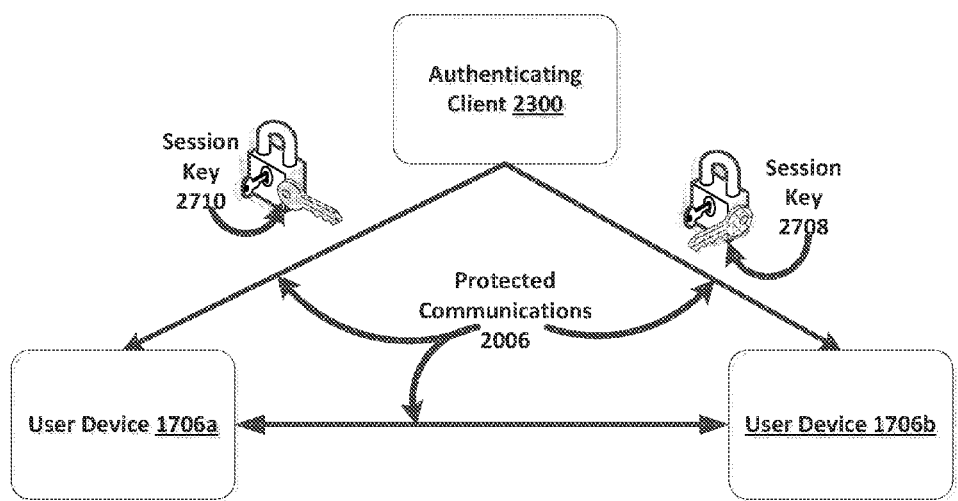

Turning now to FIGS. 27a and 27b, examples of out-of-band session initiation are shown in accordance with various embodiments. In these examples, two devices 202 are attempting to communicate with one another or a device 202a is attempting to communicate with a user device 1706b. Going one step further, both devices 202 could support user devices 1706 which has further advantages as explained later. For now, the only difference between session initiation between two devices 202 and two user devices 1706 is the required authentication process that has to occur between two devices 202 and an authentication client 2300 prior to session initiation.

In FIG. 27a, device 202a sends its public active user device key 2702 to user device 1706b. Depending on the optional utilization of modulation charts, this initial request might be encrypted in a manner known to user device 1706b even though this is a first time communication (device 202a would also need to be user device 1706a). Depending on the embodiment, a device 202b might iterate through the various active users 1704b and look for an active user device 1706b that is allowed to communicate with the incoming device 202a. In many embodiments, a further restriction is applied that only one active user device 1706b can be an end user, which represents an actual person. In these embodiments, the other active users 1704b may represent a range of processes and/or services but none might be allowed to accept user input, for example. When comparing active user devices 1704b, the sending device 202a (or user device 1706a) can optionally send a request for the type of interaction, specific application, or the incoming protocol/port can be utilized for such a determination. The device 202b may then iterate through potential matches based on the application, type of interactions and so forth sent from device 202a, and can begin with the active user device 1706b that represents the end user. Certain embodiments might only allow matches on the end user and reject all others. Finally, some embodiments may prioritize active user devices 1706b to prevent a plurality of potential matches. In the cases where a device 202b performs local matching, the device 202b may then inspect its rules to determine if the incoming communication is allowed. If the rules are maintained on the authenticating client 2300, then these processes may occur based on communications between the authenticating client 2300 and the device 202b.

In the case where rules are enforced locally (i.e., at the device 202b or user device 1706b rather than the authenticating client 2300), when the user device 1706b approves a communication the user device 1706b sends the matching active user device's 1706b public key 1706. In cases where the rules are enforced in the authenticating client 2300, the device 202b can either send a range of possibly matching active user device keys 2706 or a single active user device key 2706 with which the authenticating client 2300 can perform a lookup to obtain all other active user device keys 2706 for that device 202b from an optionally independent data store, service, process, system or similar option. In these cases, the incoming active user device key 2702, and any dynamic data 2704 obtained from the device 202a are sent from device 202b to the authenticating client 2300. In terms of dynamic data 2704, the device 202a either does not send specific additional information beyond what is contained in its packets, or it sends over additional parameters such as GPS location. This latter set of optional data may be transmitted in an encrypted format that is not readable by device 202b, but only in a format that can be decrypted by the authenticating server 2300. Further the entire request from device 202a may be optionally signed by the device 202a and even encrypted using a network key controlled by the authenticating client 2300 in cases where the rules are enforced at the authenticating client 2300 or even device 202b through modulation charts or similar option described previously. In this latter embodiment, nothing unencrypted passes between two devices 202 including a public key.

Once the authenticating client 2300 receives the device keys 2702 and 2706 and optionally decrypts and processes any rules, dynamic data 2704 can be used to validate the device 202a based on data accessible to the authenticating client 2300. Since the communication arrives on a secure transmission from device 202b, the identity of the user device 1706b is already confirmed. Assuming the device 202a is matched and communication is authorized, the authenticating client 2300 may then generate a session key 2710 using an option such as Kerberos or its own internal key generation option to be sent to both user devices 1706. This session key 2710 may then be copied and encrypted with the active user device public key 2702 to produce a secure session key 2710 for user device 1706a and the session key 2710 can be encrypted with the user device 1706b active user device key 2706 to create a secured session key 2708 for user device 1706b. The authenticating client 2300 may then optionally sign the keys and transmit those keys separately to each user device 1700. Both keys might, instead, be sent to either user device 1706a or 1700b and the receiving user device 1706 might then send the session key 2710 to the other user device 1706. In these latter embodiments, the authenticating client 2300 might not encrypt the session key 2710 twice, or at all, and the receiving device may or may not encrypt the session key with its own or the other device's key prior to transmitting the key to the other device. In the first embodiment, each user device 1706, in turn, decrypts the received session key 2710 using its private key and then the user device 1706a and 1700b may start securing communications based on a shared session key 2710. Throughout the process shown in FIGS. 27a and 27b, there is no mandatory exchange of any inline, unprotected, security information between devices 202 or user devices 1706.

Referring back to the location of the virtualization layer 210, the process of FIGS. 27a and 27b can occur without operating system interference. The logical location of the virtualization layer 210 is important when considering a TCP handshake and its use in distributed denial of service (DDoS) attacks. Specifically, a TCP handshake involves a SYN packet being sent from one device 202 to another; a SYN ACK packet being sent in response; and then an ACK packet being sent from the first to the second device. All of these packets are exchanged before any higher-level information is exchanged between two devices 202. These handshake packets themselves are not typically problematic, but attacks such as DDoS leverage this process multiplied many times over to overwhelm a specific series of devices or services. Since, in accordance with various embodiments disclosed herein, the virtualization layer 210 sits below the TCP layer and given the single package nature of session initiation, the virtualization layer 210 provides a shortcut to avoid such an issue.

When considering the TCP handshake communication deficiencies discussed above, it should be noted how the use of the virtualization layer 210 in out-of-band session initiation can improve network performance. Instead of a minimum of 16 packets being exchanged in an out-of-band initiation effort that utilizes a TCP handshake, by using the virtualization layer 210, only 4 packets at a minimum are required. By using the virtualization layer 210 and optional modulation charts, even the initial request from device 202a to device 202b can be protected. To this latter point, a modulation chart might establish one or more expected types of encryption approaches that device 202a needs to use prior to sending out a request. Device 202b, using the same modulation chart—and this modulation chart can optionally be fulfilled using a range of options such as configuration files, embedded code, and so forth—will attempt to reverse the encryption approach process and, failing to do so, will result in an automatic rejection. This operation could be as simple as looking for a certain header value or as complex as a BPEL-like series of decryption steps. Even a simple header value might be the result of a complex operation such as a time-series calculation. Once the virtualization layer 210 is added in a session initiation process, a layered secured initiation process in enabled.

In some embodiments, for example, the virtualization layer 210 transparently redirects a flood of incoming requests to other devices, which will be explained in further detail below. For now, it is noted that the virtualization layer 210 can forward packets without a visible network hop, which may be the result of operating system restrictions, since it is unencumbered by such restrictions. Other embodiments establish rules that ignore a flood of incoming requests, for example where repetitive requests from an external device are ignored for a certain period of time. Since there is no handshake in the above-described session initiation process, any processing impact is nominal, and the traffic is significantly reduced and the number of devices required to impact a system are greatly increased.

Figure 28:
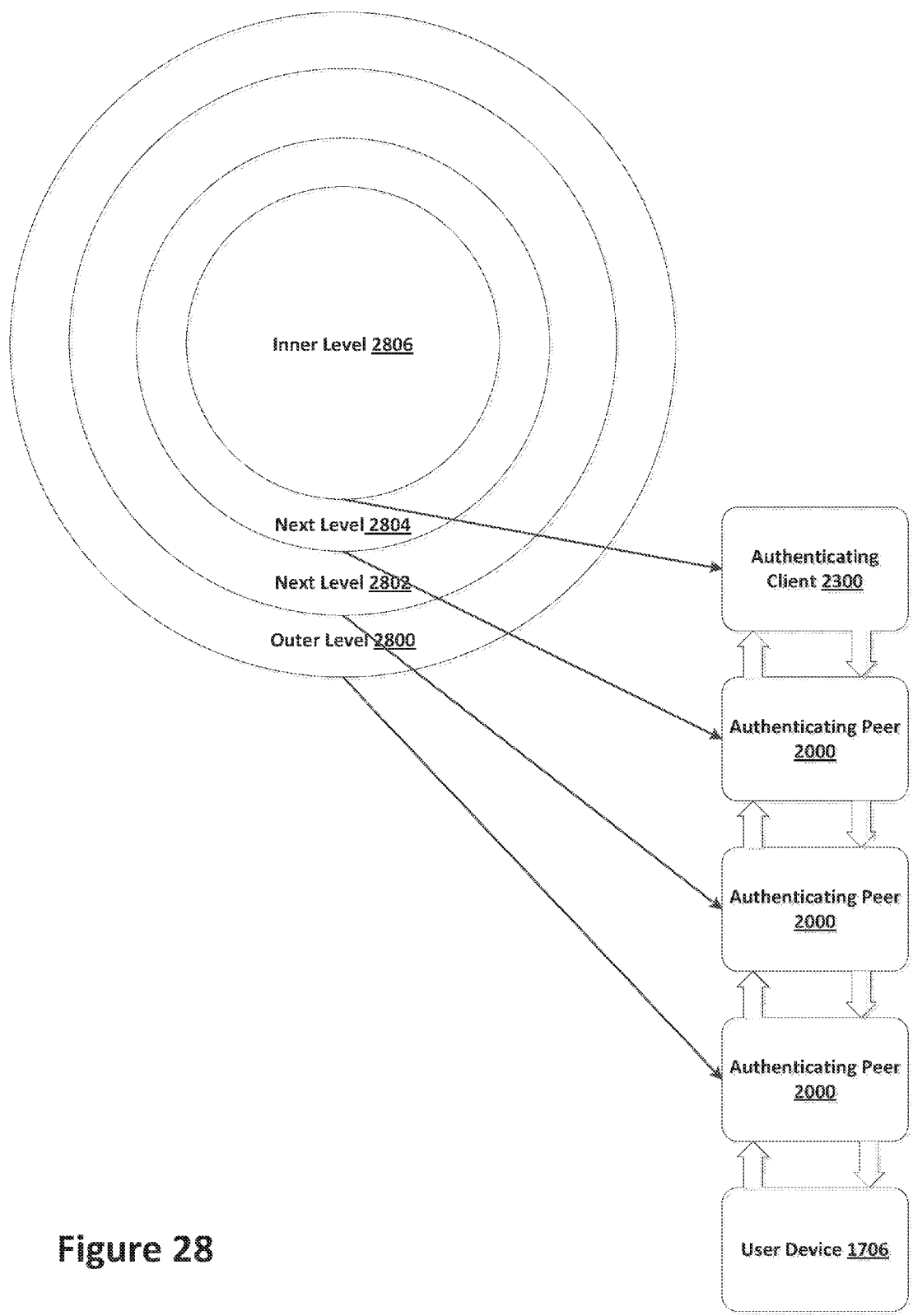
FIG. 28 shows a block diagram of a multi-level authentication scheme in accordance with various embodiments.

FIG. 28 illustrates a concept of a distributed authenticating client 2300, which leads to the ability to manage different levels of security using a distributed series of devices 202 and authenticating peers 2000. In the circles, which represent levels of security, the inner level 2806 secures the most sensitive information whereas the outer level 2800, sometimes referred to as the edge of a network 214, contains the least sensitive information and/or systems. These are logical constructs and not necessarily limited to a type of network 214, an active user device 1706 location, or other such features. While some embodiments might use such distinctions, the present disclosure relates to any delineation attributed to either a first class member or the interaction of two or more first class members. For example, an executive using a mobile device from a home network 214 might still be considered to be inner level 2806 for purposes of communications security, but an outer level 2800 device in terms of resource access.

Figure 29:
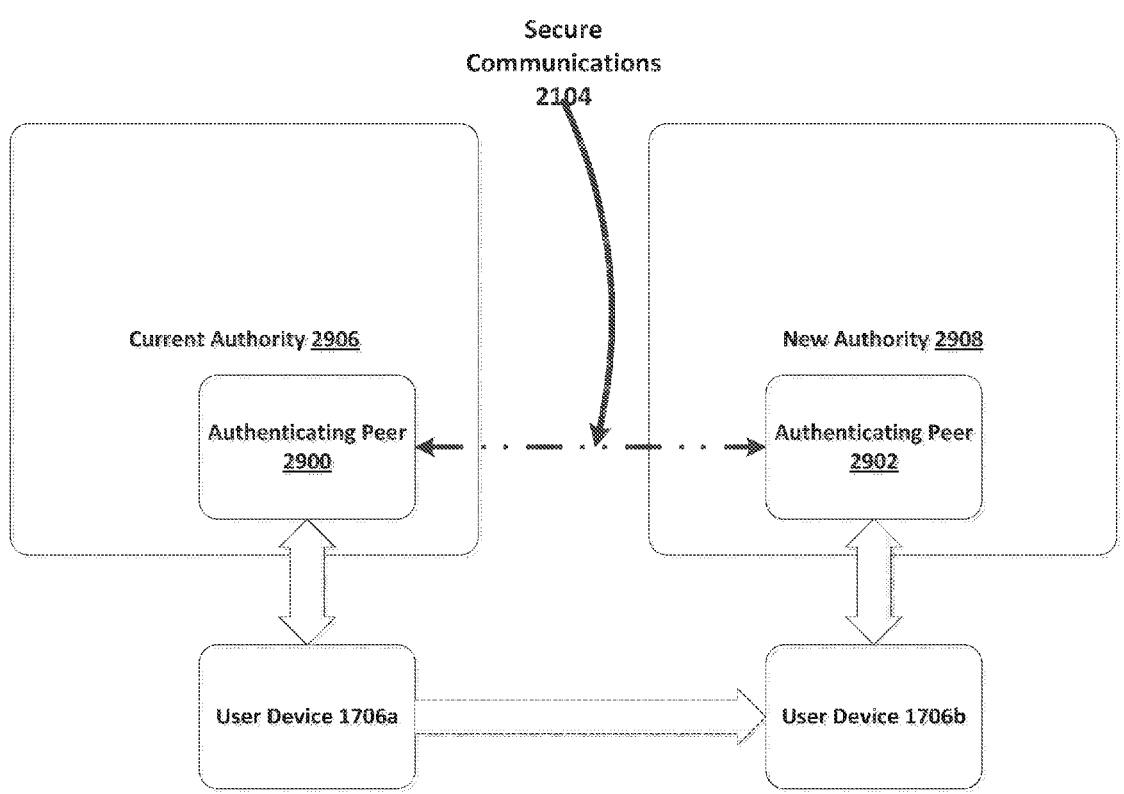
FIG. 29 shows an exemplary block diagram of out-of-band session initiation in accordance with various embodiments.

The ability to utilize intermediary authenticating peers 2000 in the authentication and authorization scheme enables an extremely robust and flexible security construct that can be utilized to address some fundamental issues in current RADIUS/DIAMETER solutions. One issue faced in this regard is an inability for RADIUS systems to support remote authorities and the challenges faced by DIAMETER with remote authorities given its dependence on IPsec. In each of these cases, there is no viable cross-platform way to pass a given user device 1706 from authority to authority as said device 202 interconnects through different networks 214. Moreover, outside of providing restricted resource access, these systems do not provide a mechanism to lock down foreign user device 1706 communications. Utilizing the system in FIG. 28 can, in effect, restrict user device 1706 access to an outer level 2800 and push the required authentication to a lower level authenticating peer 2000. This latter component can then utilize an authenticating peer 2900 from the current authority 2906 connected to an authenticating peer 2902 located in the new authority 2908 as shown in FIG. 29. In this case, the two authenticating peers already have existing secure communications 2104 based on a session initiation with a trusted authenticating client 2300. Once connected, the two peers can readily hand authentication and authorization information off for devices crossing domain boundaries. For the user device 1706a, moving forward to or "becoming" 1700b as shown becomes a seamless transfer as all information is passed off proactively. These embodiments, where the appropriate authenticating peers 2000, 2900, 2902 transfer user device 1706 authentication and authorization information directly, are especially advantageous in mobile environments where longer connections to central networks 214 can result in latency issues.

Figure 30A:
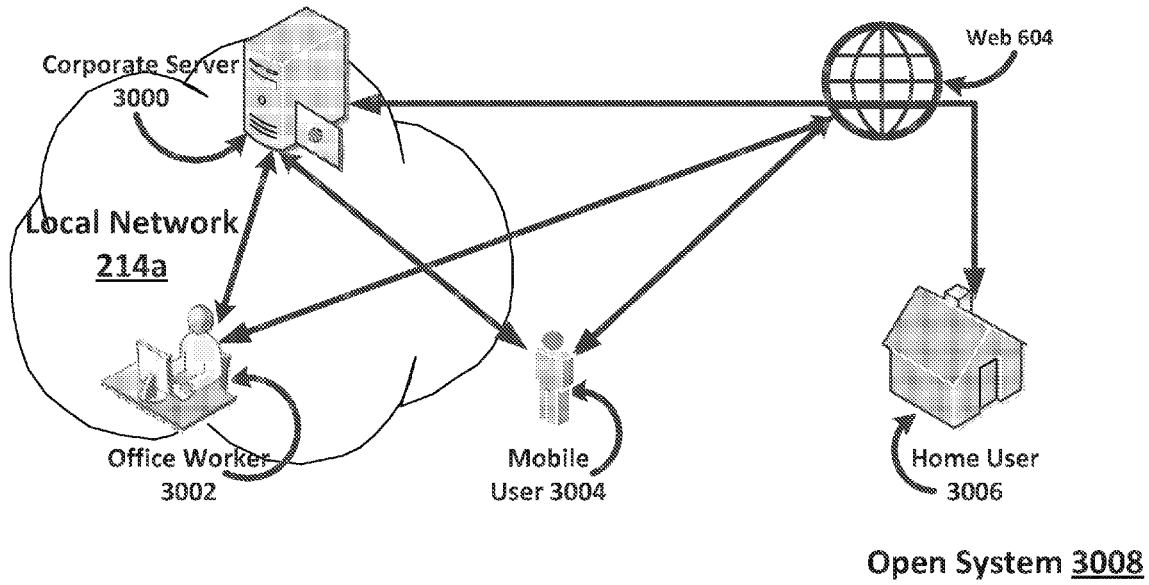
FIGS. 30*a* and 30*b* show exemplary open and partially open systems in accordance with various embodiments.
Figure 30B:
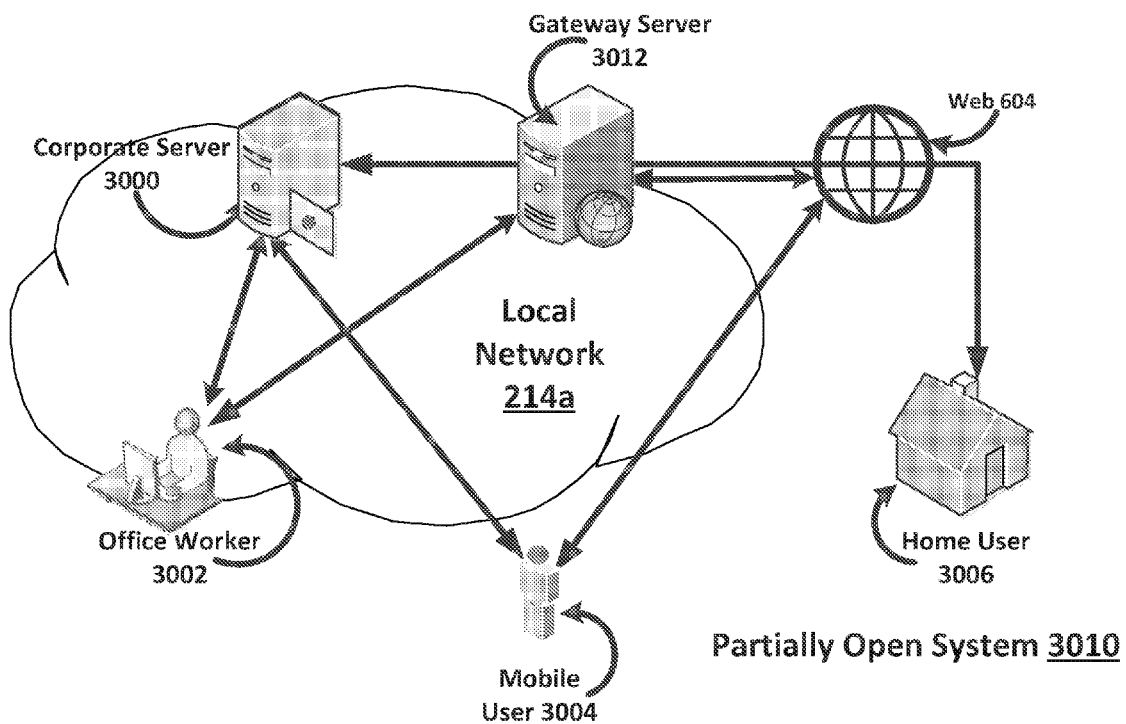

One of the largest security holes in modern networks 214 is the ability for users 1702 to access unprotected, unmonitored resources such as those located on the web 604. As shown in FIG. 30a, these systems are often referred to as open systems 3008 where a device has access to both secure resources, such as a corporate server 3000 and unsecured resources such as on the web 604. In these cases, the device 202 acts as a bridge that enables resources to be transferred between secure and unsecure locations and that bridge is often a conduit for hacking activity.

FIG. 38b shows a local network 214a, which demonstrates an attempt to counter some of these gaps in security by moving beyond the fully open systems 3008 into a partially open system 3010 that utilizes a gateway server 3012 to monitor traffic. Even supposing the gateway server 2012 is able to properly monitor traffic, however, there are two common use cases that break this type of system. First, as denoted by the mobile user 3004 example, many local networks 214a are supporting BYOD (bring your own device) implementations, where users can bring any device they desire into the local network 214a. Very often, users will connect via their phone carrier's signal and, even more concerning, there is little to no ability for modern LDAP to enforce any level of differential security on these devices. The second use case is that of a home user 3006 connecting through an option such as a virtual private network (VPN). This issue provides a twofold challenge with the first being that a user can run a VPN application while simultaneously running an unsecured application such as a web browser. Again, this deficiency results in a bridge through which intruders can gain remote access to a local network 214a. The second issue is that a user 1702 can turn off VPN protection. Thus, even if a VPN implementation somehow prevented other applications from running, the user can simply shut down the VPN, turn on an insecure application and possibly download malicious code. The next time the VPN is turned on, that code gains access to the secured local network 214a directly through the VPN.

Figure 31:
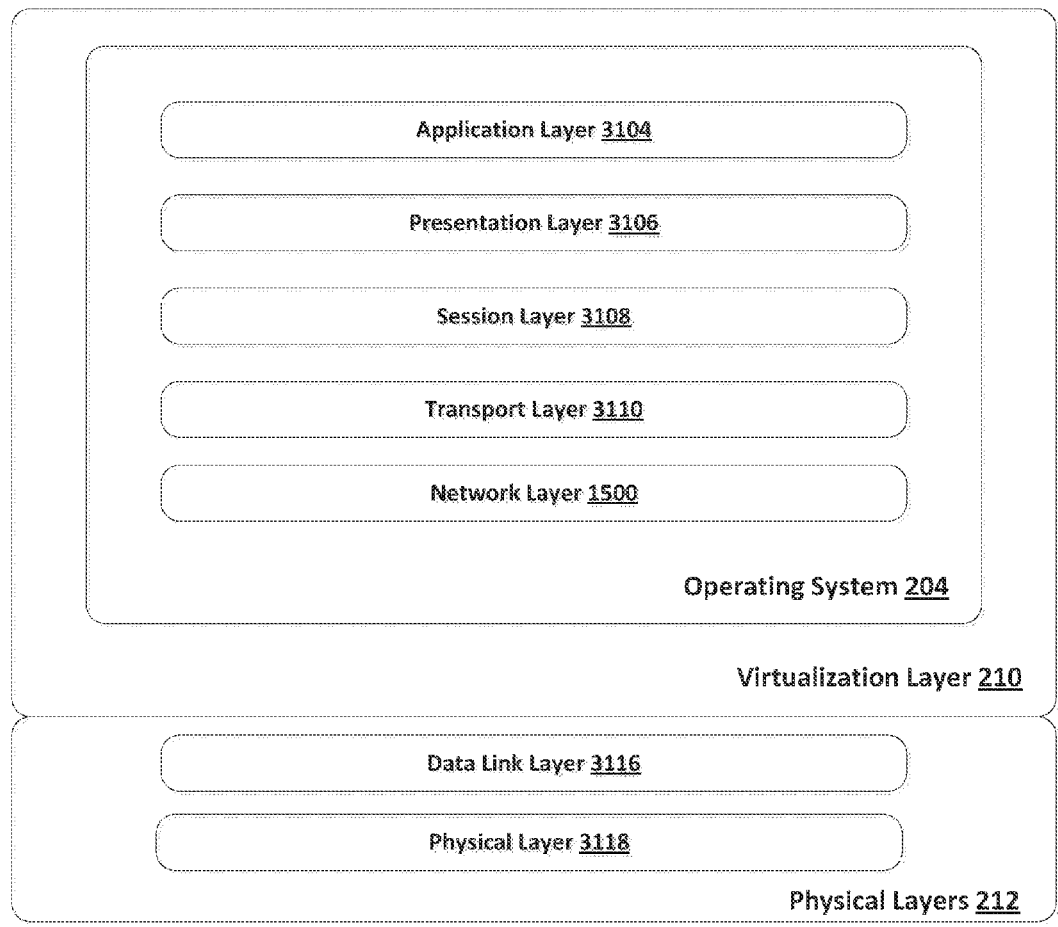
FIGS. 31-32 show exemplary block diagrams of a system including a virtualization layer in accordance with various embodiments.
Figure 32:
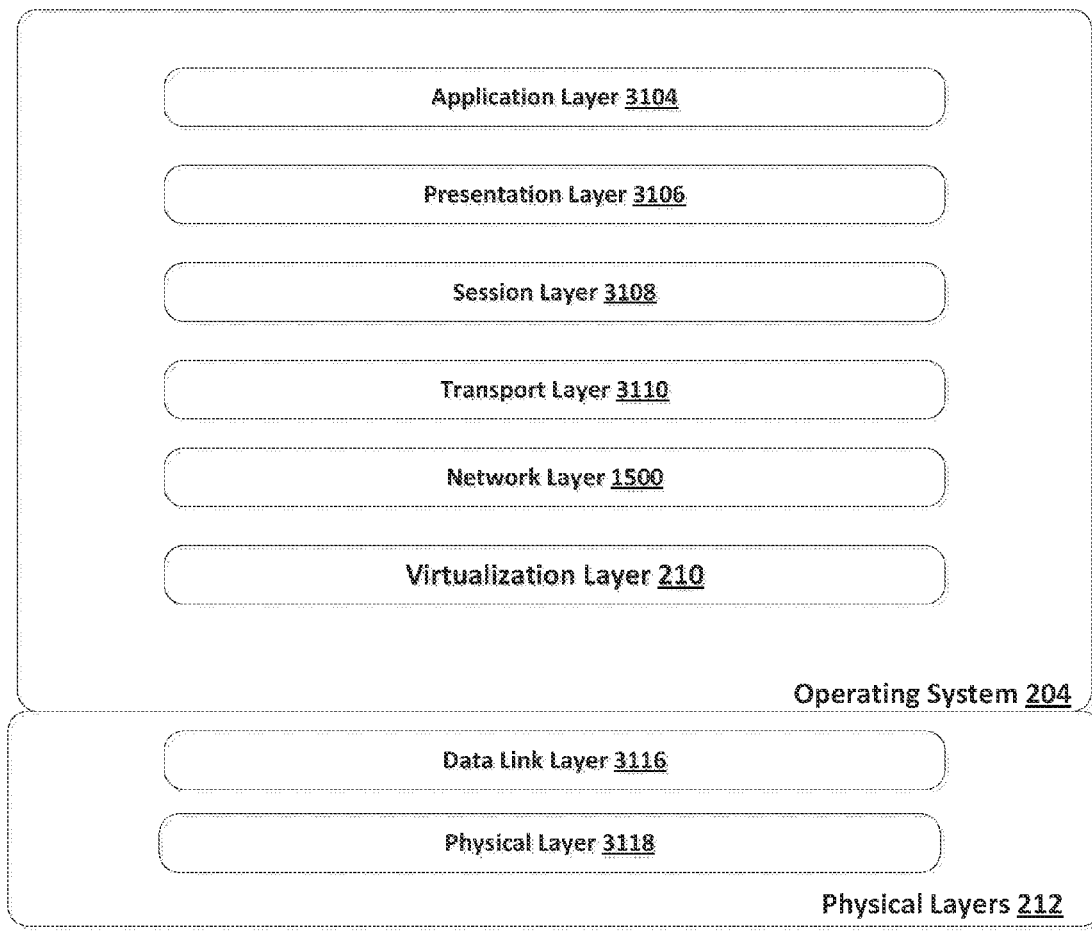

In order to counter these issues, embodiments of the present disclosure provide a virtualization layer 210 that is conceptually shown within the OSI stack in FIGS. 31 and 32. FIG. 31 shows a conceptualization of the virtualization layer 210 in which the virtualization layer 210 is initiated prior to the operating system 204. These types of initializations are often found in pre-boot loading techniques, which will be understood by one skilled in the art. Once the virtualization layer 210 is running, with its own resources separate and distinct from the operating system 204, the operating system 204 is launched. This enables the virtualization layer 210 to act as a barrier between the operating system 204 and the network 214. FIG. 32 shows an alternative embodiment where the virtualization layer 210 exists within the operating system 204. As described previously, while hosted within the operating system 204, packets captured by the virtualization layer 210 are out of scope of the operating system 204.

Figure 33:
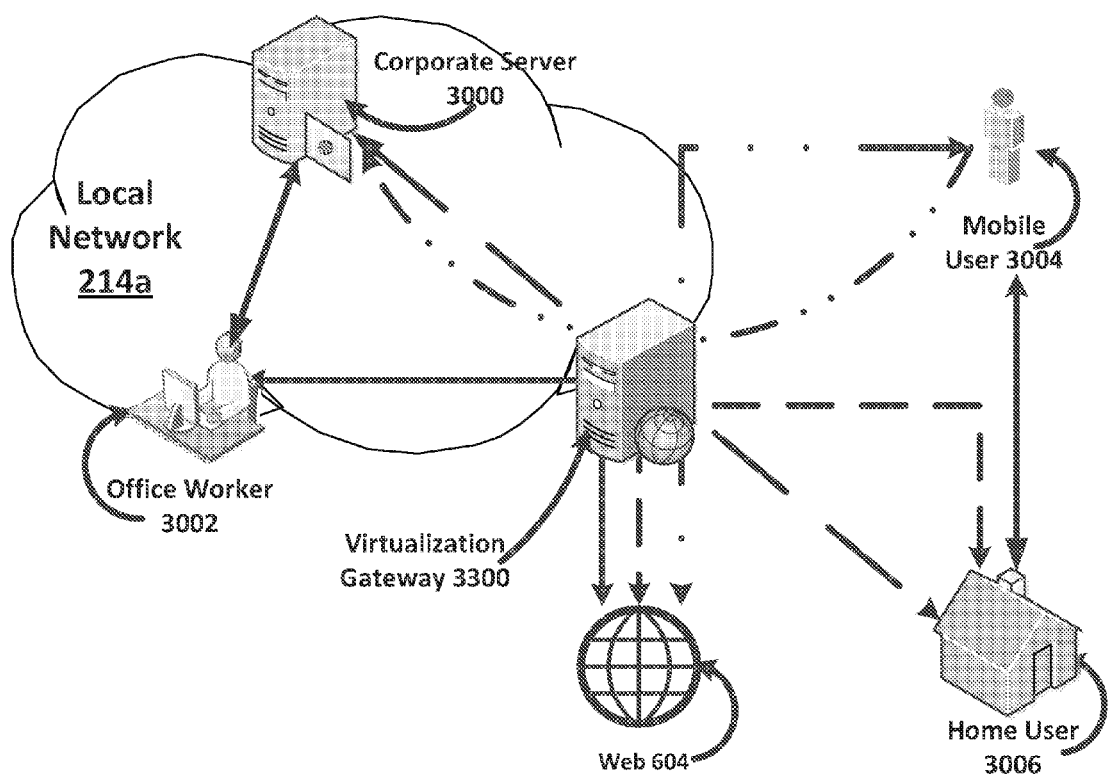
FIG. 33 shows an exemplary closed system in accordance with various embodiments.

The level at which the virtualization layer 210 functions enables the virtualization layer 210 to provide communications security beyond the control of a user. In some embodiments, this type of virtualization layer 210 might be fulfilled using a possible plurality of drivers and even further embodiments might run protected services or drivers that cannot be turned off without administrative access. To this end, embodiments of the present disclosure relate to an always-on security model that can run across all communications on a given device. This level of always-on, pervasive security can be applied across all devices in an enterprise to create, in certain embodiments, a closed system 3302 as shown in FIG. 33. In this case, all external communications pass through a virtualization gateway 3300. This includes both communications intended for external locations, such as the web 604, and, in some embodiments, this includes all communications from devices not physically on a local network 214a attempting to access resources on that local network 214a. This latter requirement is optional to the definition of a closed system 3302 and, even in these embodiments, direct communications—such as the connection from the home user 3006 to the mobile user 3004—is still possible.

The virtualization gateway 3300 is a logical construct that might be fulfilled in a range of ways depending on a given embodiment. Some embodiments will utilize an existing gateway server and add a virtualization layer 210 to that gateway server. In these embodiments, the virtualization layer 210 might act to fulfill encryption requirements or it might be used to enhance communications monitoring and control. As will be described in a subsequent section, the virtualization layer 210 can be employed in a variety of manners for enhanced gateway functionality. Other embodiments might utilize a range of devices, similar to the authenticating peer 2000, to fulfill gateway requirements without requiring a roundtrip to a local network 214a. In these embodiments, a series of active user devices can support larger communication control list to control and manage internal and external communications. Outer level 2800 connections, such as remote devices, can be handled by an authenticating peer 2000 acting in the role of a virtualization gateway 3300 as one example. While roundtrips to the central systems might be required for options such as remote access to central resources or novel requests not handled in an authentication peer 2000, utilizing the virtualization layer 210 for multiple purposes results in an advanced ability for a distributed virtualization gateway architecture.

In terms of ubiquitous communications security, the virtualization layer 210 can function beyond the purview of an end user and be controlled through centralized administrative techniques as described previously. Along these lines, the virtualization layer 210 can be configured to process all packets across all ports for all destination IP addresses from every application or any subset thereof. Various embodiments may implement virtualization layer 210 in an end user manner, a centralized manner, or a combination of the two. For example, a given embodiment might provide a centrally-controlled option to run the virtualization layer 210 in something akin to silent mode. In this mode, the virtualization layer 210 might be centrally administrated through communication control lists 2600 and modulation charts and may not provide any interface to an active user device 1706. In this same optional embodiment, the centrally controlled configuration might be instead set to something akin to an active role.

Figure 34:
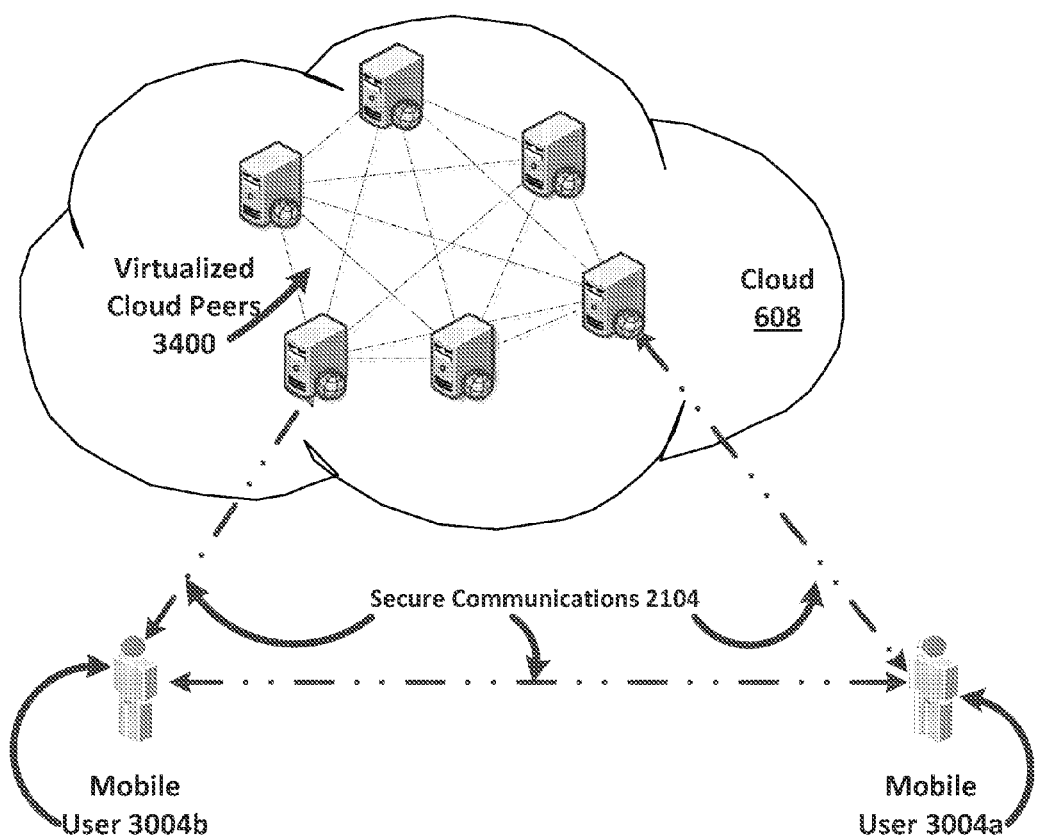
FIGS. 34-35 show exemplary cloud-based communication systems in accordance with various embodiments.

In this active role, there may exist optional control lists 2600 and even modulation charts; however, certain embodiments provide a more intrusive active user device 1706 presence. For example, certain embodiments might enable complete control by the active end user device where a chat-like interface is presented to the active end user device through which the active end user device is able to accept/deny/invite other active end user devices into a secure communication. Some embodiments might then utilize some level of encryption approaches based on the active end user device connection whereas others might enable the active user devices 1706 to further determine which applications or ports to protect. Certain embodiments might enable communication wrapping, to be described in a subsequent section or other additional obfuscation features such as cloud bouncing as shown in FIG. 34.

A cloud 608 is a concept understood to one skilled in the art. This construct can refer to a large range of devices 202, ranging from a single server in one location to a global network of connected devices 202. Within this cloud, as shown in FIG. 34, virtualized cloud peers 3400 can be placed in order to aid communications in a number of important manners. Some embodiments may utilize this cloud 608 architecture to provide an out-of-band communication pathway for enhanced security. Depending on the complexity of the embodiment, each mobile user 3004, representing an active user device 1706, would have separately initialized a session with one another as well as one or more virtualized cloud peers 3400. At this point, these embodiments can send data between the two mobile users 3004 divided amongst the two paths. The delineation of what data is sent over which path can be made based on any characteristic of a packet such as the packet size, protocol used, CRC value, encryption approach implemented, and/or results of an applied approach and so forth. Some embodiments may use defined business rules, whereas others might utilize a random generator in order to determine which packets traverse which path. The same options for creating and determining encryption modulations can be used in this regard and, in some embodiments, the use of the cloud-based path or the direct channel might be included as part of a modulation sequence.

Figure 35:
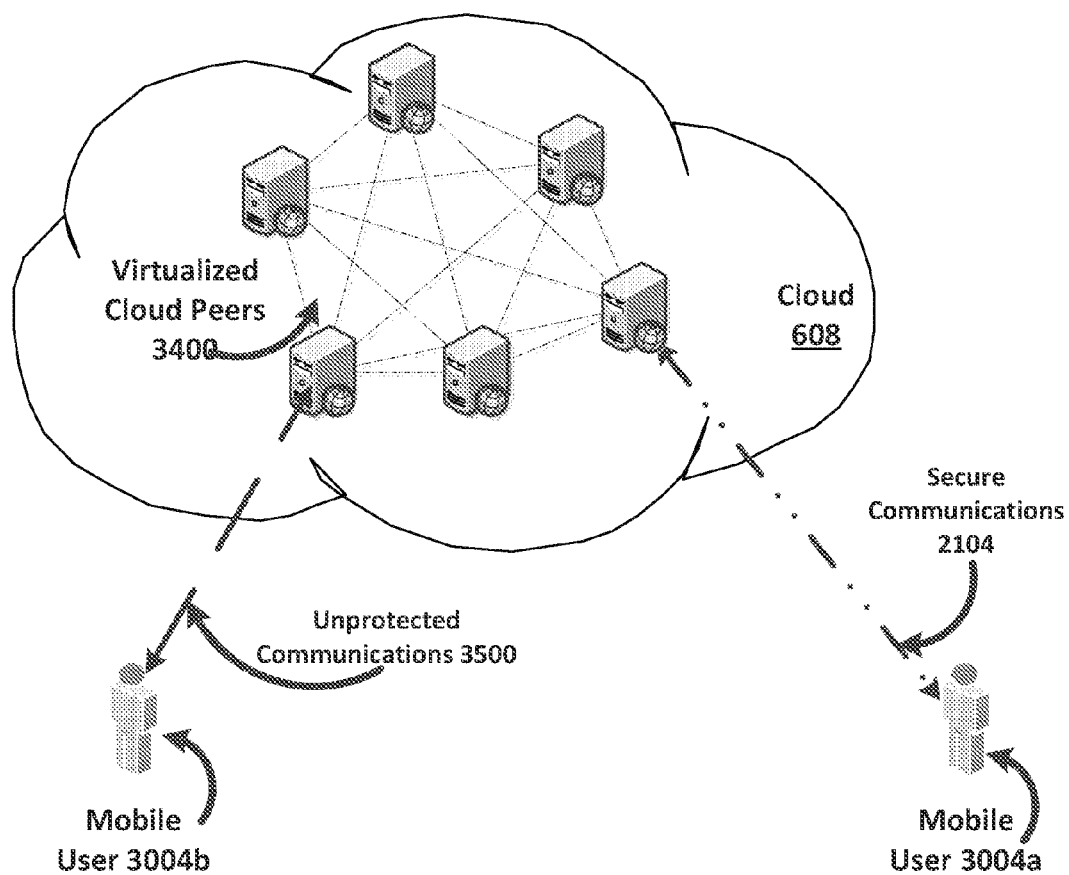

Other embodiments may only utilize a cloud-based path as is shown in FIG. 35. While mobile user 3004b is shown with unprotected communications 3500, that is for the sake of explanation and does not denote any sort of restriction. By using a cloud 604 path, users can obtain a greater degree of anonymity than they might otherwise obtain through direct communications. As one example, the virtualized cloud peers 3400 can act in numerous roles from authenticating client 2300 to authenticating peer 2000 to a proxy server. In this latter regard, a user might be able to appear to a target device 202 as if they are in a location different from their physical location. In these embodiments, a user may wish to appear as if they are visiting a given device 202 from England when they are actually physically located in the United States. If the cloud 604, which can be comprised of a global network, has virtualized cloud peers 3400 in England, then a given communication path from the mobile user 3004 can be routed through that peer in England acting in the role of a proxy server.

This latter role, however, can extend beyond that of a traditional proxy server where the proxy server utilizes pre-existing fields to denote its presence. Instead, based on the virtualization layer's 210 ability to completely unwind and rewind a packet, the cloud peer 3400 can change the actual source IP address in a transparent manner. Then, using an operation manager 1104 with access, either directly or via static pointers or other similar options, to sufficient memory resources, the virtualization layer 210 can store sufficient information about the communication stream to perform a reverse translation process for responses back from the target device 202.

FIG. 35 demonstrates another type of communication that can be enabled, which is referred to herein as a "partially protected communication." In this case, mobile user 3004b is not an active user device 1706 and does not have a virtualization layer 210. As such, this mobile user 3004b is not able to handle any communications secured using a virtualization layer 210, which prevents direct secure communications. That stated, using virtualized cloud peers 3400, which are any device running in a cloud that contain the virtualization layer 210, the mobile user 3004a can participate in partially protected communications and even generate communication control protection and encryption modulations based on this type of communication. The main advantage to this system is the reduction in the amount of traffic that is susceptible to infiltration. Instead of participating in completely unprotected communications, only the final transmission to the mobile user 3004b is susceptible to attack. Given that even direct communications are often routed through various intermediate systems, this is a significant enhancement over unprotected communications 3500.

Additionally, from an administrative perspective, the virtualized cloud peers 3400 can act in a deep packet inspection role, either as part of a gateway server or separate, in order to provide an additional layer of security. Other embodiments may use either centrally- or user-generated policies to control modulation charts or communication control lists 2600 to restrict partially protected communications both in terms of what is allowed into a given active user device 1706 and what resources any application 208 is allowed to utilize when participating in a communications session and can differentiate based on the level of protection.

In terms of interacting with either a virtualized gateway 3300 or a virtualized cloud peer 3400, the virtualization layer 210 on the gateway or peer 3300, 3400 can transparently redirect an incoming request based on the presence of a virtualization layer 210 on the participating device 202 (e.g., a device of mobile user 3004). If a request is coming from an unknown device 202, for example, the gateway or peer 3300, 3400 might present a general marketing site asking the user to register their device or some such general audience message or the request might be rejected outright as one example. If the same gateway or peer 3300, 3400 receives a communication from an active user device 1706, on the other hand, it might respond with secure extranet data or direct access to an intended active user device 1706 elsewhere in the system.

Figure 36:
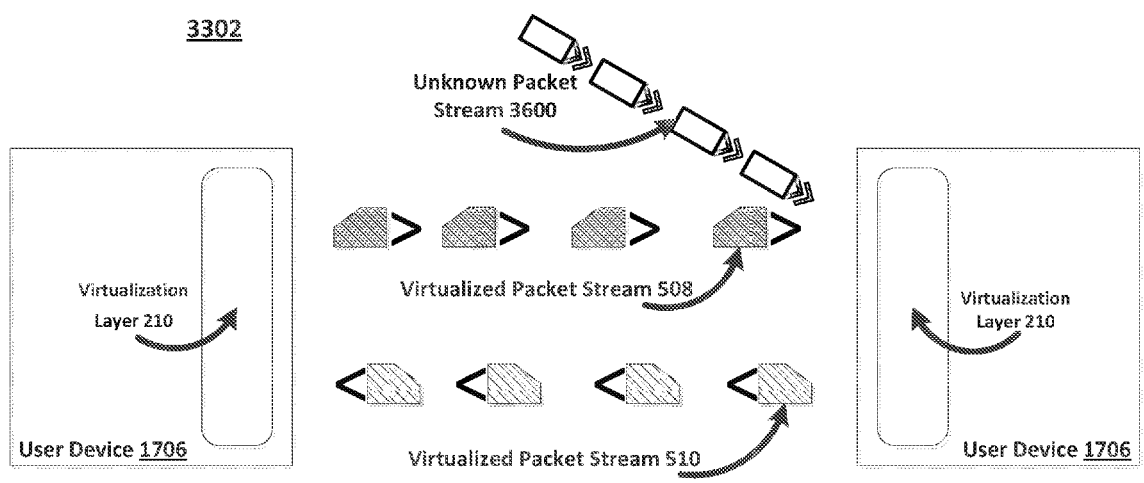
FIG. 36 shows a communication system in accordance with various embodiments.

While the described pattern of session initiation, as well as the communication control list 2600, provides the ability to identify other active user devices 1706, FIG. 36 demonstrates a closed system 3302 that enjoys another level of protection from intrusion. In a closed system 3302, only the virtualized gateways 3300 would ever handle unknown packet streams 3600. In some embodiments, even the initial session initiation request between two active user devices 1706 can be encrypted based on a modulation chart. Even in embodiments where the session initiation is not encrypted, the format of such a request is defined and thus unprotected communications coming into an active user device 1706 that does not follow that format can be proactively identified prior to that communication ever reaching the operating system. This feature supports a powerful counter-intrusion capability which aims to both prevent the spread of unauthorized data, such as malware, and to stop zero day network infiltration.

Figure 37:
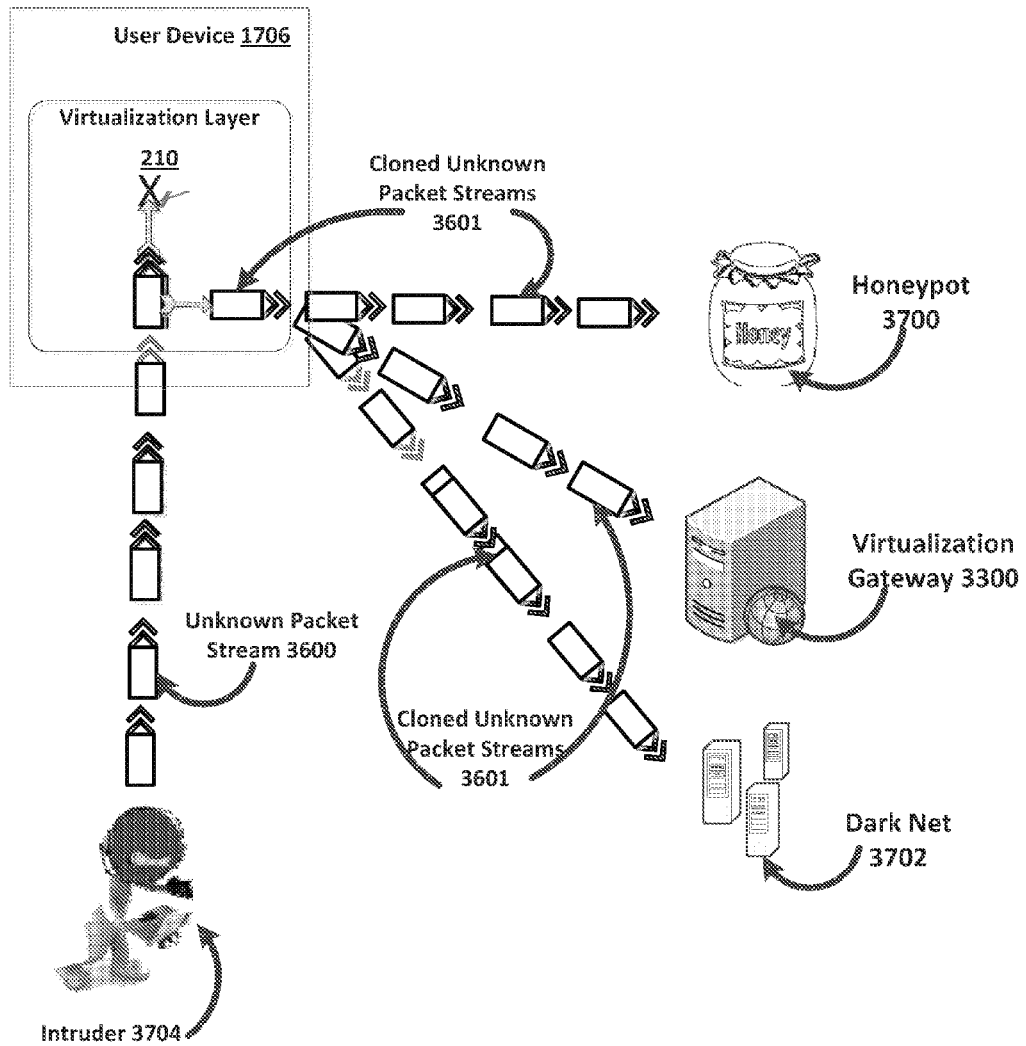
FIGS. 37-38 shows a redirection scheme in accordance with various embodiments.

Previously, networks 214 had limited options in terms of responding to attacks and, for the most part, those responses were limited to defense. Although subsequent forensic activities can be utilized to identify and respond to hackers, the upfront response is, for the most part, never offensive in nature. By removing the operating system from the response equation, embodiments of the present disclosure provide the ability to effect offensive retaliations to intrusion attempts. This is based on the fact that, even as low as the TCP level, operating system-dependent responses are always visible as network hops. Thus, an intruder can see in real time that they are no longer on a targeted device and they can escape prior to any actions taking place. The presently disclosed virtualization layer 210, on the other hand, can transparently redirect traffic without ever incurring a network hop, due to its ability to modify a TCP packet while still keeping the packet structurally intact. The ability to unwind a packet—which is disclosed as being used to perform operations on the base datagram 110 at least in some embodiments—can also be used to clone and send incoming packets to other locations as described previously. In this regard, FIG. 37 shows the main packet can be deleted an unknown packet stream 3600, which originates from intruder 3704, being received at a user device 1706. The virtualization layer 210 of the user device 1706, in accordance with various embodiments, may delete these incoming packets while generating clones of the unknown packet stream 3600 to be transparently sent to any other location desired (e.g., honeypot 3700, dark net 3702, or virtualization gateway 3300). To the would-be intruder 3704, there is no evidence that any redirection is occurring and thus they have no ability to detect any counter responses. The present disclosure does not specifically relate to actual counter-intrusion techniques, such as honeypots 3700, dark nets 3702 and reverse trace back efforts, rather these are provided as examples with which the disclosed framework of redirection for the purpose of implementing a counter-intrusion technique can be utilized.

Figure 38:
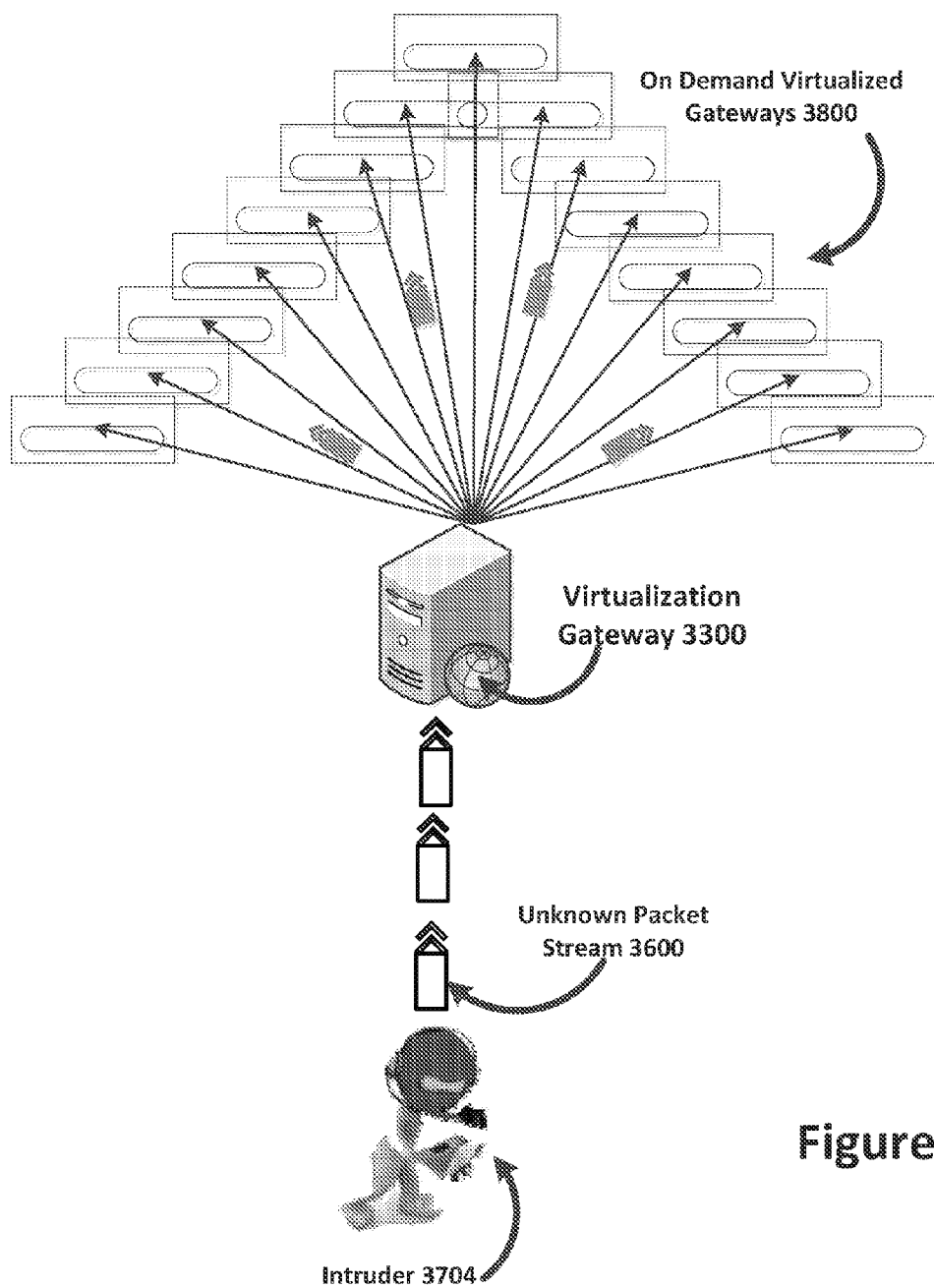

FIG. 38 demonstrates another example of redirection in accordance with various embodiments. In particular, FIG. 38 shows a distributed denial of service (DDoS) protection option. The challenge in current defenses is that even options such as load balancers are visible and thus susceptible to DDoS attacks based on TCP handshake weaknesses. Given that the virtualization layer 210 (included in the virtualization gateway 3300 shown) is logically situated below the TCP layer, it both overcomes handshake limitations and can transparently spin up on demand servers 3800 to overcome saturation attempts. Since the redirection is invisible to the attackers 3704, each on demand virtualized gateway 3800 is invisible to attackers 3704 and thus will not become a new target. In this manner, a DDoS attack can be rendered harmless while still maintaining full service capabilities. When combined with the cloud 604 disclosures, this DDoS defense can be further distributed making an effective DDoS attack virtually impossible.

The ability to provide transparent redirection is not just restricted to counter-intrusion applications and can, in fact, help to address a fundamental flaw in accounting systems. To this end, current accounting operations are resource provider-centric with the general principle being that a resource provider sends a notification to an accounting server whenever it starts and stops providing a resource to a given user. Some accounting systems will also utilize intermediate accounting messages to overcome issues such as service disruption. That stated, there is currently no concept of guaranteed delivery, which is becoming more important as more intermittent/mobile environments are being employed and central resources are spread ever further from the central accounting/resource centers.

Figure 39:
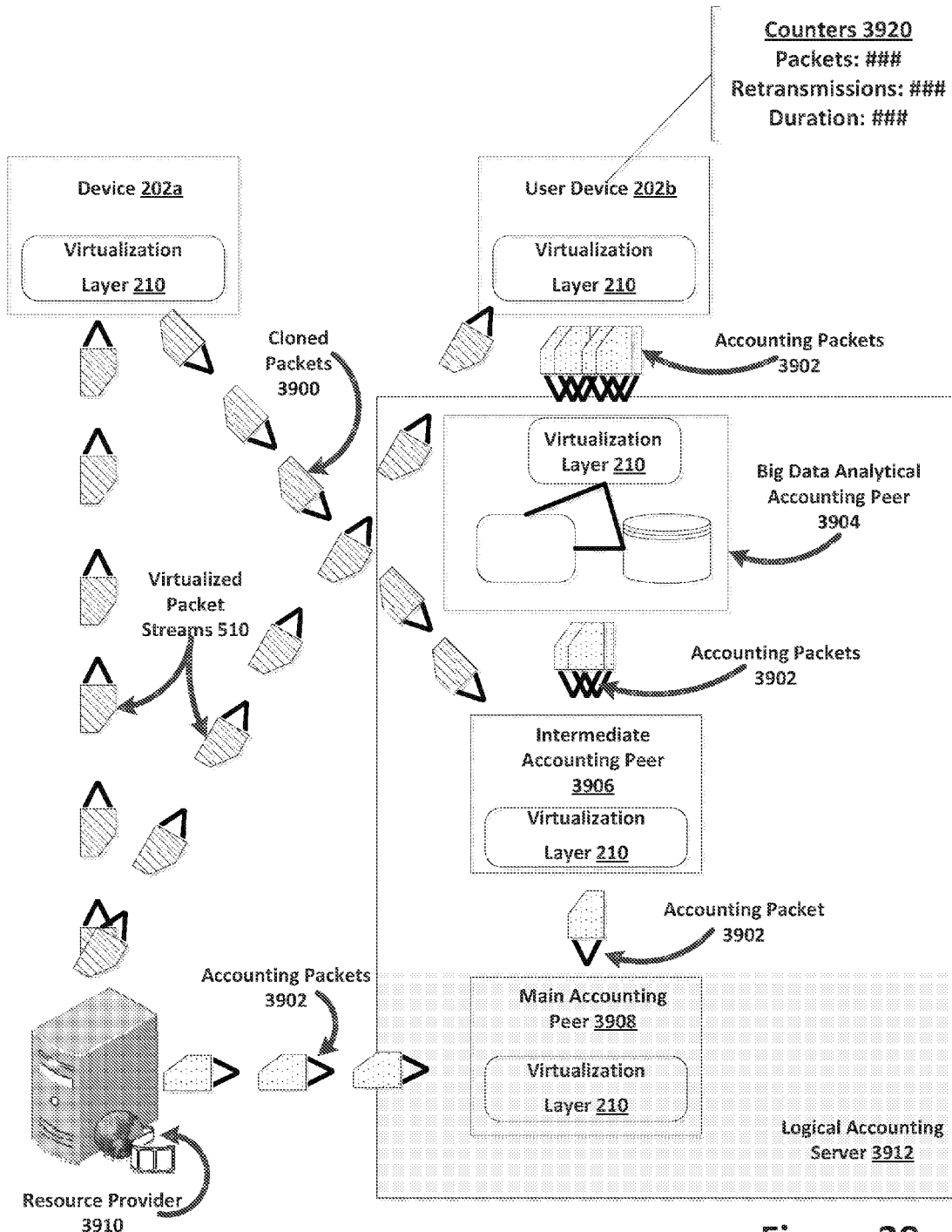
FIG. 39 shows an exemplary accounting system in accordance with various embodiments.

To this end, a prior example focused on how quality of service (QoS) might be recorded in one manner by a resource provider such as a streaming server and yet received in a completely different manner by a resource consumer due to issues such as network saturation. While current accounting issues cannot accommodate this guaranteed delivery requirement, embodiments of the present disclosure can be utilized to this end in a variety of possible ways. First, as shown in FIG. 39, a user device 1706*a* may clone all incoming traffic and send those cloned packets 3900 to either an accounting server 3912 or, as in the case of packet pointer security, to a big data analytics system 3904 for processing. In terms of the accounting server 3912 target itself, given that every user and device can be combined together using the new authentication approach, multiple devices 3904, 3906, 3908 can comprise one logical accounting server 3912. This enables a distributed accounting system where data can be optionally rolled up as it progresses from outer to inner accounting boundaries. Using distinct modulation charts and communication control lists 2600, the entire logical accounting server 3912 construct can be logically isolated with tightly controlled input and output options.

Other embodiments might utilize the operation manager 1104 in each active user device 1706*b* described previously to perform some level of upfront processing. In the QoS example, the rate at which packets successfully enter the device, filtering out and/or recording retransmission packets, might be directly measured in real time. The counters provided in FIG. 39 are exemplary. Any aspect of the communication stream 510 can be analyzed in any way required for accounting purposes. The virtualization layer 210 in device 202*b* can then send out accounting messages 3902 to the logical accounting server construct 3912.

Another challenge faced by accounting systems relates to limitations in provable accounting between authorities. As more and more devices interact with resources, for example bandwidth, on remote authority networks, home authorities are increasingly reliant on these remote authorities for accurate accounting. That stated, if a given user 1702 disagrees with the resources charged, total number of minutes as one example, the home authority has no resource to prove this usage. The home authority has no independent mechanism in place to verify how accurate remote authority accounting is and, even if accurate, the way in which a remote authority accounts for various resources might differ from the home authority's own accounting. As one possible issue, a delineation between data versus voice traffic might be defined by one authority based on the ports used by the other authority based on application.

As described previously in FIG. 29, two authenticating peers 2900 and 2902 are able to maintain long-running communications and can act as a bridge thus extending the logical accounting server construct defined herein even across authority boundaries. In this latter embodiment, the device 202*b* is able to directly transmit accounting messages to an accounting peer at some level through other accounting peers. This is not to suggest that the accounting peers 2900 and 2902 cannot themselves be authenticating peers; indeed, they may be since these references are logical, rather than physical, definitions.

When considering embodiments for accounting where the device 202*a* sends cloned packets 3900 to an accounting peer 3902, it is noted that these encrypted packets would need to be potentially decrypted before any analytics can be applied. Further, in many larger networks, system and network administrative tools require full access to data flowing between devices and, as such, require data to be unencrypted. In fact, numerous current technologies—including VPN solutions and IPsec transport mode—typically involve significant one-off integration efforts. In the case of IPsec transport mode, even integration efforts fail and administrators are forced to turn off encryption in order to use network and system administrative tools. Considering that encryption changes system and network dynamics, system and network administrators are often unable to gain accurate pictures of their networks.

Figure 41A:
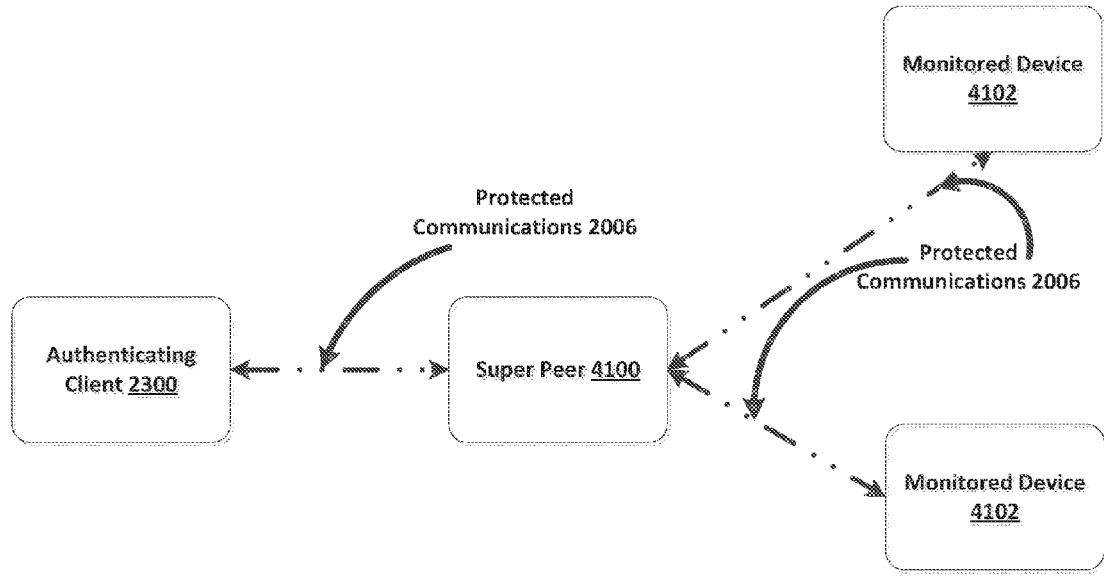
Figure 41B:
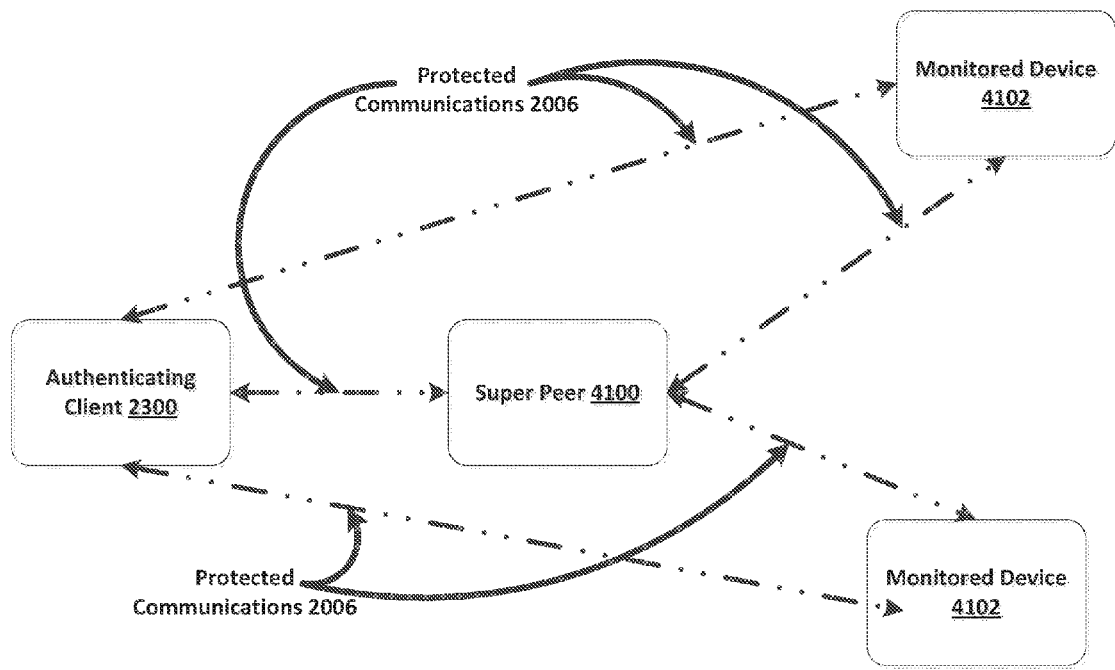

In order to support these needs, FIG. 40 shows certain embodiments that utilize an option that is referred to herein as a super peer 4000, 4006. Super peers 4100 in general as shown in FIGS. 41*a* and 41*b*, are able to decrypt all communications flowing between any two monitored devices. In FIG. 41*a*, the super peer 4100 is logically situated between all communications with an authenticating client 2300 (which could optionally be an authenticating peer 2300) in order to monitor all traffic. Other embodiments might only flow traffic directly between monitored devices 4102 as shown in FIG. 41*b*.

These super peers 4000, 4006, depending on the embodiment, can be of two general types. The first type is an open super peer 4000, which decrypts all traffic and passes that traffic to the operating system. Depending on the embodiment, the open super peer 4000 either clones the packets and send one copy to the intended active user device 1706 or wait to obtain the packets from the operating system, re-encrypt the packets, and then send those packets to the destination active user device 1706. Certain of these steps may be combined in some embodiments. To this latter point, an administrator might use cloning by default, but either apply this operation to all traffic or apply the operation for a certain subset of traffic. In terms of control and configuration, some embodiments might enable the remote administration of a super peer 4000 whereas other embodiments will only allow direct setup and configuration of a super peer 4000 on the physical device.

Depending on the embodiment, the configuration process may require a user 1702 to logically group all known processes on a given super peer 4000 and 4006. While the categorization is flexible and can be tied to any number of communication control list 2600 options, one possible set of categories is provided in FIG. 40. In this case, the open super peer 4000 has been configured such that applications are either allowed to run as active applications 4002 or are shut down and/or blocked from sending and receiving data and thus are designated inactive applications 4004. Some embodiments will enable a super peer??? 4000 to have a virtualization layer 210 that can be turned on or off, whereas others will require always-on functionality. In these latter embodiments, the inactive application 4004 designation would permanently disable and/or block communications for an application that has that label. Leveraging these features, certain embodiments might automatically categorize all unknown/new processes as inactive applications 4004 for enhanced security purposes. An interface on either a central administrative construct's system or directly on the device 202 (or user device 1706) can be used to highlight these new processes in turn.

The other type of super peer is the restricted super peer 4006, which includes a super peer manager 4008. In these peers 4006, no traffic is decrypted by default, but a user 1702 can use the super peer manager 4008 to access one or more active user device 1706 communications at any given time. Some embodiments may limit to the total number of active user devices 1706 that can be unlocked, restrict unlocking to one primary active user device 1706 and an optionally limited number of connected active user devices 1706, and so forth. Once unlocked, the optional categorization of applications as described previously can be utilized. A further embodiment might enable unlocking features by security level such that, for example, a secret clearance can only unlock secret or general access communications but not, furthering this example, top secret communications. This latter restriction can be applied alongside other described features.

In order for these peers 4000, 4006 to function as described above, access to session keys and any modulation charts for all monitored active user devices 1706 is needed. In addition, changes in dynamic user data should be updated on the super peer 4000, 4006. To this end, a super peer 4000, 4006 first needs to authenticate through the authenticating client 2300. Depending on the embodiment, the backend authenticating server 2302 might utilize a range of challenges responses to thoroughly authenticate a given super peer 4000, 4006. Once authenticated, the super peer 4000, 4006 creates a long-running session with the authenticating client 2300. Depending on the embodiment, this long-running session might utilize a distinct modulation chart, utilize protocol wrapping, and might even need to recycle after certain intervals. Given that the authenticating client or peer 2300, 2000 are providing session keys, the process for enabling a super peer 4000, 4006 can be controlled through this latter connection. Some embodiments, especially those using open super peers 4000, will provide the session key to the super peer 4000, 4006 as the keys are generated. Depending on the embodiment, a super peer 4000, 4006 public key might be used to encrypt the session key for additional security.

Other embodiments might utilize an on-demand system where a given active user device 1706 communication's session key is not released until the super peer 4000, 4006 makes an explicit request for access to that communication stream. These requests might be made using any identifying dynamic data for a given active user device 1706. Likewise, some embodiments will provide all data and encryption options for each active user device 1706 as the user devices 1706 become active. Other embodiments will send a restricted set of data, for example just the identifying dynamic data, and others will use these options in an on demand manner.

For advanced security, some embodiments might define a given super node 4000, 4006 as a series of devices 202 instead of one device. Within this context, a subset of devices might be active at any one time with some sort of rotation being used to change activations. The change in active devices 202 may occur within the configuration manager 1102 on each device, based of rules centrally administrated and enforced either on each super peer 4000, 4006 or on the connected authenticated client or peer 2300, 2000. The change in activation might be in response to resource usage, and not security or not just due to security, and can be a manual process in addition to or instead of an automated process.

In terms of determining which devices are being monitored by a given super node, some embodiments will utilize an administrative console located either on the super peer 4000, 4006, on the authenticating client or peer 2300, 2000, or on a separate server that optionally controls LDAP security. Other embodiments will utilize a nearest neighbor approach where the closest devices 202 to a given super peer 4000, 4006 are captured and assigned to that super peer 4000, 4006. Other embodiments might utilize an approach where any communications accessible by a super peer 4000, 4006 can be used to start monitoring a user device 1706. Some embodiments will use some sort of boundary system to prevent more than one super peer 4000, 4006 per user device 1706 while others will allow varying levels of overlap. In the boundary-based embodiments, options such as device proximity, device type, protocols being used and location in a network and so forth can be used to determine which of a possible plurality of super peers 4000, 4006 can monitor a given user device 1706. Yet other embodiments will treat open 4000 and restricted 4006 super nodes are separate entities and may even require at least one of each for every communications stream.

Figure 42:
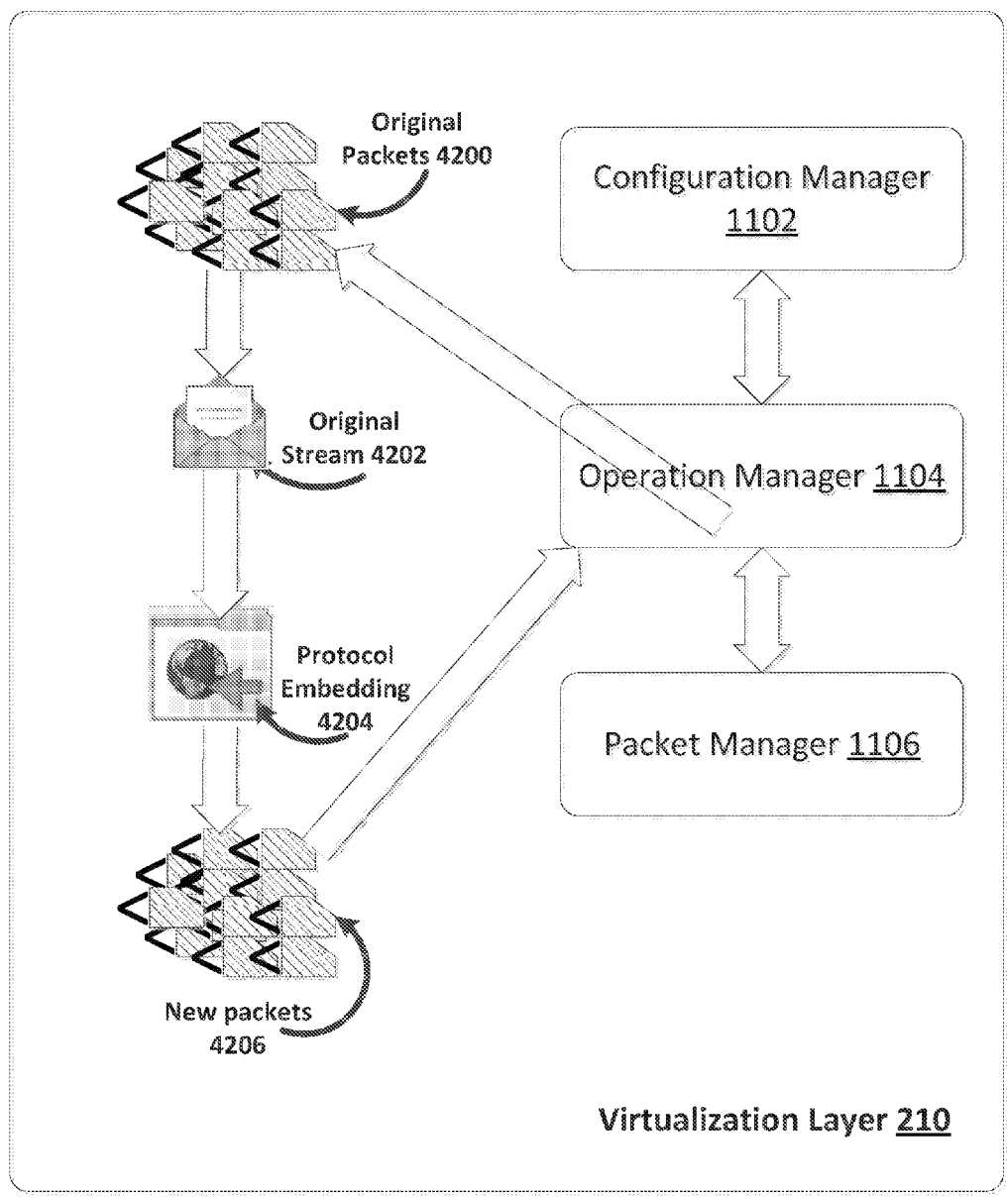
FIG. 42 shows another example of a virtualization layer in accordance with various embodiments.

When communicating over an insecure network such as the Internet, active user devices 1706 also have the ability to utilize protocol wrapping in order to further obfuscate traffic. This process is shown in FIG. 42 where the operation manager 1104 within the virtualization layer 210 first collects all of the original packets 4200 for a given original stream 4202. Each packet is unwound and its base datagram 110 is extracted. Once all of the packets have been captured for a given original stream 4202, and all base datagrams 110 extracted and appended together, the operation manager 1104 can packetize the base datagram 110 in another protocol 4204. Optional embodiments might apply encryption approaches to the base datagram either for each original packet 4200 or on the extracted and reconstructed base datagram 4200 of both. Once packetized, each the virtualized datagrams 124 might also have an encryption approach applied to it. The packetization process then returns a set of new packets 4206 that the operations manager 1104 sends back to the packet manager 1106 for transmission to a target active user device 1706 based on the destination of the original stream 4202.

On the other end, this process is reversed to obtain the original base datagram 110 and then to re-packetize the datagram using the original protocol. In order to know what streams and/or protocols to use, the active user devices 1706 might rely on modulation charts with protocol swapping as another option, the sending active user device 1706 might embed flags in its optional virtualization header 122, or some combination of these options. In these latter embodiments, flags might aid in determining the current and original protocols as well as the affected packets. Alternative embodiments might use a flag to denote the use of protocol swapping with all swapping following the same pattern based on either the current protocol, for example FTP goes with HTTP, TCP goes with SCTP, and so forth, or all protocols being statically mapped to one original protocol. In yet other embodiments, the determination of protocols might be based on options such as IP addresses, ports utilized, or even duration, message size, and time of day. A flag might indicate the use of an alternative modulation chart just for protocol swapping purposes.

In terms of ports used, a lightweight mechanism that might be used either in conjunction or instead of protocol swapping, depending on the embodiment, is the concept of port swapping. Since a virtualization layer 210 sits on both ends of the communication stream, active user devices 1706 can agree to switch ports for any communication stream for any reason. Options may include such things as time of day, protocol, location of one user device 1706 or the other (or both in some combination), and so forth. Port swapping can be randomized with a flag being sent across to denote impending switches or be based on controlled switching stemming from embedded code or modulation chart efforts.

Embodiments directed to port swapping obviate vulnerabilities found in prior port scanning and firewall technologies. Current firewalls contain two types of ports—open and closed. Given that many applications utilize the same ports across devices, would-be intruders can gain a sophisticated understanding of a given device's system by simply attempting to access every port on that device. Since the firewall will either immediately reject a request based on a closed port or eventually reject a request based on an open port with unwarranted communications, intruders use this process of port scanning to get a complete picture of the device with little risk.

Embodiments of the present disclosure include a new type of port, referred to as a "redirect port," which is capable of transparently redirecting traffic. Thus, when a would-be intruder scans a redirect port and thinks the port is open, the intruder is actually redirected in an invisible manner, as has been described above. Thus, embodiments of the present disclosure utilizing a redirect port are able to utilize three types of ports to, at the very least, obscure the ability of an outsider to gain knowledge of the internal systems and processes of a given, protected device. Some embodiments further utilize port swapping to randomly change ports, thus transforming currently static firewall pictures into a dynamic firewall design.

This dynamic firewall capability, where the disclosed redirect ports are combined with the disclosed port swapping methodology, especially when combined with communication control list 2600 features, provides an improved level of protection for each active user device 1706 relative to prior practices. Further, implementing dynamic firewalls on virtualization gateways 3300 enables highly secure defenses for entire networks. To this end, closed systems 3302 are able to extend beyond geographic and platform boundaries. By modifying protocols and ports, embedding firewall level security within each user device, and encrypting data, secure communications can be established even on previously insecure networks.

Figure 43A:
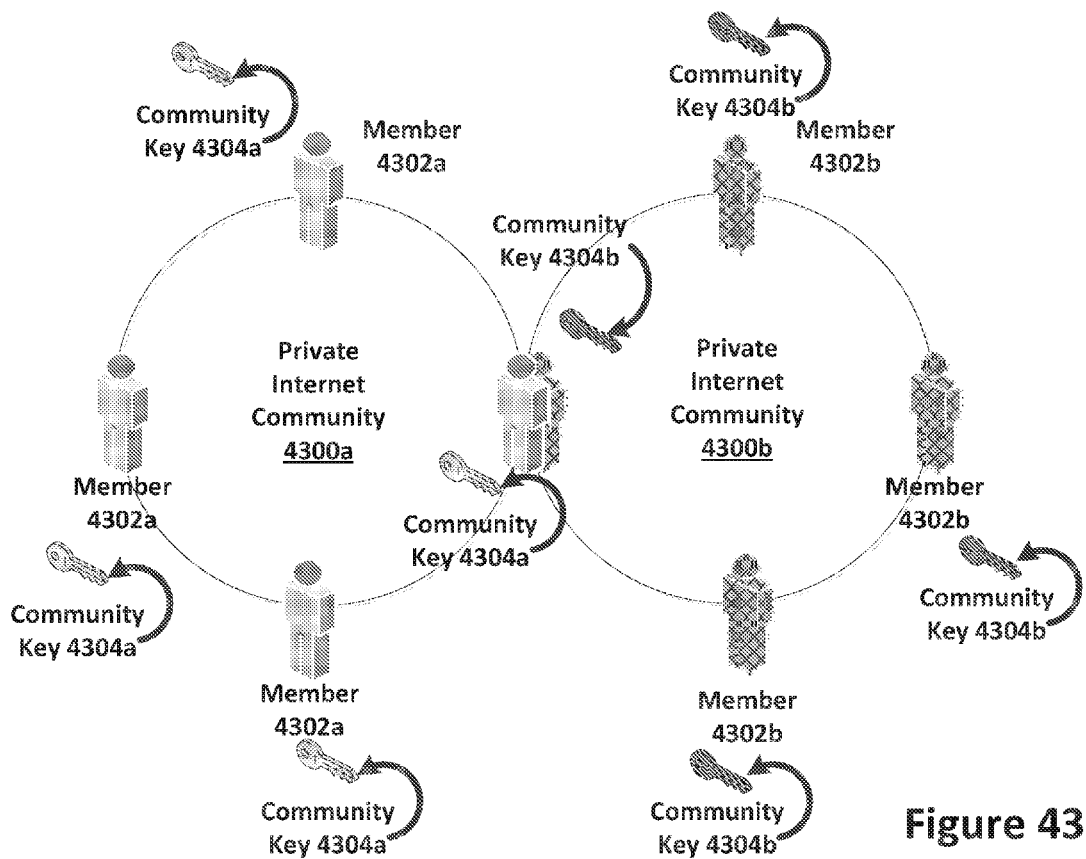
FIG. 43 shows an exemplary communication community in accordance with various embodiments.
Figure 43B:
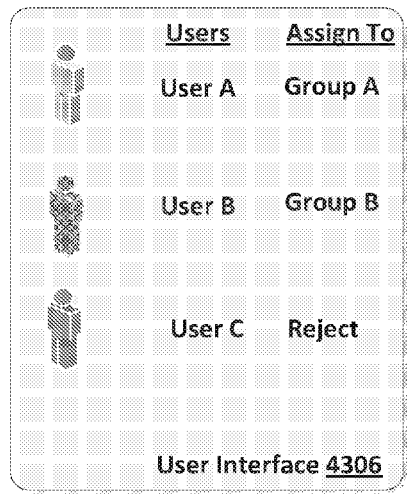

Certain embodiments relate to a private Internet community 4300 as shown in FIG. 43*a*. By utilizing a group-level shared secret, represented as a community key 4304, members 4302 can participate in numerous groups without fear of data being shared across communities 4300. Although some embodiments anticipate sufficient protection based on point-to-point communications security, the embodiments of FIGS. 43*a*, 43*b* leverage the ability to generate community keys 4304 to provide an additional layer of protection. To this end, during the authentication process described previously, the authenticating client 2300 (or peer 2000) can utilize a range of optional rules in order to generate and distribute community keys 4304. Alternatively, in those embodiments where the virtualization layer 210 is extended to provide a user interface, the formation of a new group in the interface may enable the creation of a community key 4304 as shown in FIG. 43*b*.

The user interface 4306 shows the hypothetical result of a user (not shown) assigning user devices 1706 to different communities 4300 or rejecting an incoming request. This interface 4306 is exemplary and does not restrict what the interface 4306 may or may not include. The interface 4306 may exist on any viable device and, by itself, be presented through any desktop, mobile, web, or other technology utilized to present interactive features to a user. The communities 4300, depending on the embodiment, might be generated through a central system, such as a controlling extranet server or authenticating peer 2000 (client 2300). Other embodiments might utilize a controlling peer approach where one user device 1706 is allowed to make the communities 4300. This might be useful, as one example, when a subscriber obtains a subscription allowing a variable number of users. The purchaser would then be able to control the groups and even the memberships depending on the embodiment. Other embodiments could allow peer-based communities 4300 to be created such that a new user device 1706 connection also includes a community invitation or an automatic community 4300 creation.

Other embodiments may generate communities 4300 without any user device 1706 interaction or even awareness. As such, communities 4300 might be assigned as attributes to a first-class authentication member and/or assigned through business rules that can be run at any point including, but not limited to, authentication, session initiation, ongoing session handling, and so forth. These latter embodiments can support a system such as the one described in FIG. 44. In this figure, a hypothetical enterprise is configured along the lines of business units (e.g. accountant 4408) and a hierarchy (e g manager 4410 and VP 4412). It should be noted that communication control lists 2600 can be used to handle these types of delineations and, in fact, communications control lists 2600 can be further used to require, authorize, and determine/control the generation of various keys.

Figure 44:
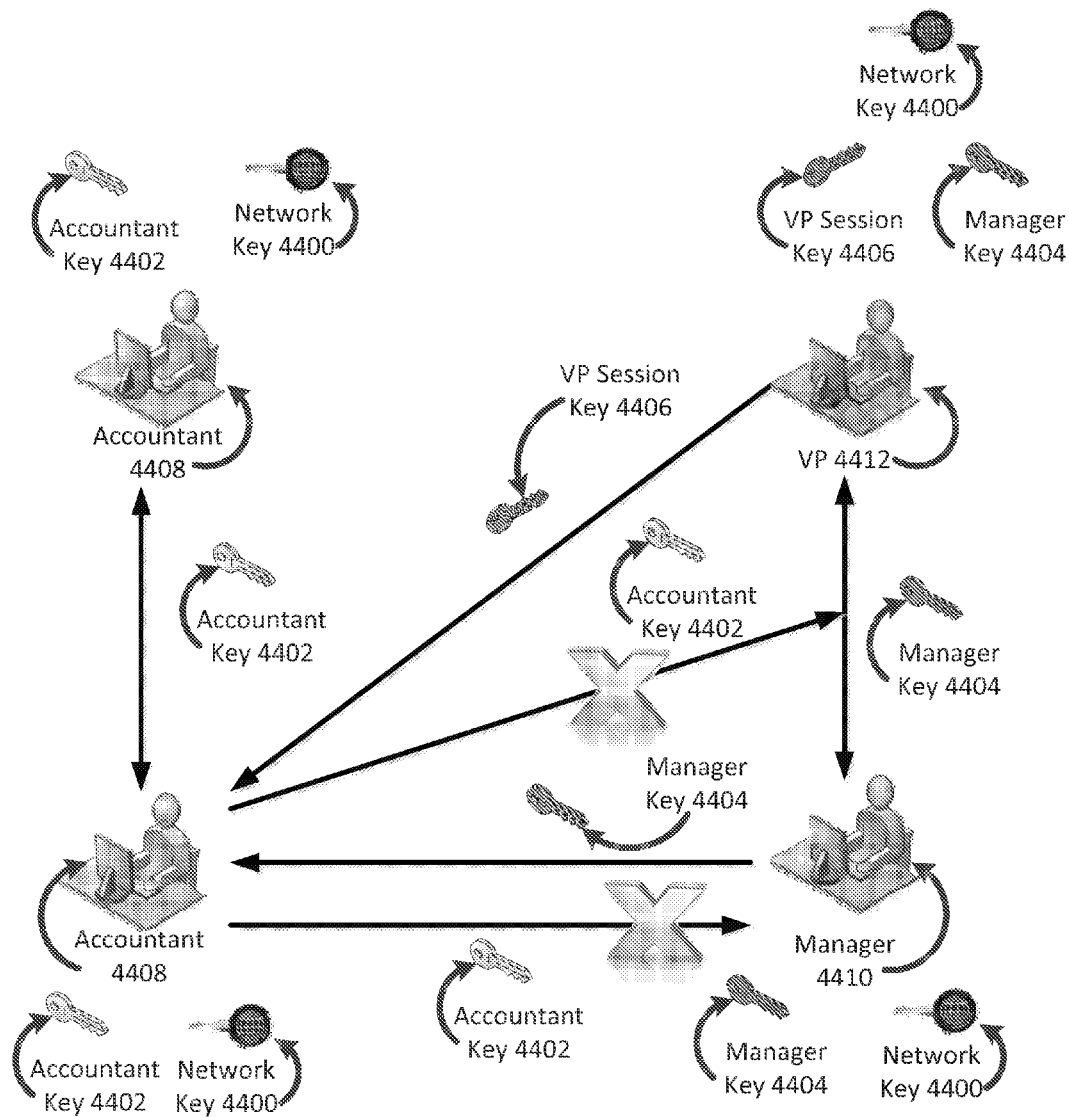
FIG. 44 shows an exemplary enterprise communication system in accordance.

Still referring to FIG. 44, the explanatory embodiment—either through a communications control list 2600, authentication/initiation rules processing, and so forth—may require up to two keys in order to authorize and secure communications. In this latter regard, the keys themselves might be required by the virtualization layer 210, for example to enable its underlying encryption approaches. These latter requirements might then result in authentication processes and virtualization layer 210 encryption working together to more fully secure an enterprise. As shown, the network key 4400 represents a general key that identifies the entire enterprise and would be equivalent to the community keys 4304 described in FIG. 43*a*. In these cases, the keys might be generated using a private function on any one of the devices involved in modulation chart management, session initiation, user device authentications, and so forth. In some of these embodiments, the network key 4400 itself is a range of entries into a formula that can generate a key at runtime. This latter feature enables the dynamic insertion of data points such as subnets, domain names, and so forth to further protect the actual key and open validation options accordingly. As one example, a device in one domain might generate a network key 4400 and send that key 4400 to a device in the same domain. The receiving device might then generate the same network key 4400 and compare its results to the incoming key 4400 to validate the remote device.

Alternatively, the network key 4400 might be generated by a third party and used without modification through the community or enterprise or the key might by generated only by the authenticating client (2300) or server (2302) and controlled centrally. Regardless of the point of origin, this key 4400 is used to uniquely identify and secure communications as warranted across the enterprise or community. As shown, the two accountants 4408 are then able to communicate because both have an accountant key 4402. The bottom accountant 4408, however, is unable to initiate a session with the manager 4410 and is unable to read the communication between the manager 4410 and the VP 4412 due to a lack of a sufficient key.

The manager 4410, however, is able to initiate a session with the accountant 4408 due to the manager key 4404. This ability introduces the concept of a key hierarchy, in which lower order keys are used to create higher level keys. By including one key within the context of another, the lower key can thus be generated from the higher level key. Alternative embodiments may utilize a lookup process where the keys are used to look up data to either be used in place of the keys (e.g., for an encryption approach) or used once the incoming key has been cleared for use. In an example of the latter embodiment, the accountant 4408 might send the incoming manager key 4404 to an authenticating client 2300 and, once the authenticating client 2300 authenticates the manager 4410, a session key might be sent back to the accountant 4408 and the manager 4410 as part of the previously described session initiation process.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   receiving an Ethernet data packet comprising a header having a structure from an operating system at a virtualization layer, the virtualization layer being above a physical layer and below all other layers;
   performing an operation on a portion of the Ethernet data packet other than the header, thereby creating a modified data packet and maintaining the original header structure;
   accessing, by the virtualization layer, an encryption modulation chart;
   updating the virtualization layer to apply a first encryption algorithm to a first portion of the Ethernet data packet and to apply a second encryption algorithm to a second portion of the Ethernet data packet;
   selecting, by the virtualization layer, an encryption algorithm from the encryption modulation chart;
   applying different encryption algorithms, by the virtualization layer to the Ethernet data packet at the same point in time;
   transmitting the modified data packet, including the original header structure, to the physical layer.

2. The method of claim 1 further comprising: receiving at least a first and a second Ethernet data packet;
   applying a first encryption algorithm to a portion of the first Ethernet data packet; and
   applying a second encryption algorithm to a portion of the second Ethernet data packet.

3. The method of claim 1 further comprising applying a first encryption algorithm to an Ethernet data packet received at a first time and applying a second encryption algorithm to an Ethernet data packet received at a second time, wherein the virtualization layer alters the encryption algorithm applied to one or more packets at different points in time.

4. The method of claim 1 further comprising accessing, by the virtualization layer, the encryption modulation chart and applying an encryption algorithm to an Ethernet data packet based on the encryption modulation chart.

5. A method for device authentication, the method comprising:
   sending a request from a device to an authentication client;
   receiving a response including a virtualization client,
   obtaining, by the virtualization client, unique device identification information from the device;
   sending the unique device identification information to the authentication client, thereby authenticating the device at the authentication client;
   sending a request for user authentication information from the authentication client to the virtualization client;
   sending user authentication information from the device to the authentication client, thereby authenticating a user of the device at the authentication client; and
   authenticating the user by using the user authentication information and unique device identification information to authenticate the user;
   receiving an Ethernet data packet comprising a header having a structure from an operating system at a virtualization layer; and
   performing an operation on a portion of the Ethernet data packet, other than the header, thereby creating a modified data packet and maintaining the original header structure, wherein the operation comprises:
   encrypting the portion of the data packet while not encrypting the original packet header structure;
   updating the virtualization layer to apply a different encryption algorithm to the portion of the Ethernet data packet; and
   selecting and applying different encryption algorithms, by the virtualization layer, to the Ethernet data packet at the same point in time;

transmitting the modified data packet, including the original header structure, to a physical layer of the device.

6. The method of claim 5 further comprising installing a virtualization layer with the virtualization client, and using the virtualization layer to secure further communications between the device and the authentication client.

7. The method of claim 6 wherein using the virtualization layer to secure communications further comprises:
receiving an Ethernet data packet comprising a header having a structure from an operating system executing on the device at the virtualization layer, the virtualization layer being above a physical layer and below all other layers.

8. The method of claim 5 further comprising sending the user authentication information in a multiple-step authentication process.

9. The method of claim 5 further comprising encrypting data being sent to the authentication client by the device using a key.

\* \* \* \* \*

UNITED STATES PATENT AND TRADEMARK OFFICE
CERTIFICATE OF CORRECTION

PATENT NO. : 10,382,595 B2
APPLICATION NO. : 15/115209
DATED : August 13, 2019
INVENTOR(S) : Kenneth C. Tola, Jr. and Keith Withington Page 1 of 1

It is certified that error appears in the above-identified patent and that said Letters Patent is hereby corrected as shown below:

On the Title Page

Item (72) should read:
-- (75) Inventor: Kenneth C. Tola, Jr., Westfield, NJ (US)
Keith Withington, Carmine, TX (US) --

Signed and Sealed this
Thirteenth Day of October, 2020

Andrei Iancu
*Director of the United States Patent and Trademark Office*